(12) United States Patent
Kobayashi

(10) Patent No.: US 6,449,395 B1
(45) Date of Patent: Sep. 10, 2002

(54) IMAGE ENCODING APPARATUS, IMAGE ENCODING METHOD, AND RECORDING MEDIUM IN WHICH IMAGE ENCODING PROGRAM IS RECORDED

(75) Inventor: Yoshikazu Kobayashi, Higashihiroshima (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 0 days.

(21) Appl. No.: 09/176,531

(22) Filed: Oct. 21, 1998

(30) Foreign Application Priority Data

Oct. 22, 1997 (JP) .............................. 9-289730

(51) Int. Cl.[7] .................................. G06K 9/46
(52) U.S. Cl. ...................... 382/251; 382/238
(58) Field of Search .................... 382/232, 251, 382/238, 245, 246, 248, 250, 253; 375/240.03, 240.12, 240.16, 240.18, 240.2, 240.22

(56) References Cited

U.S. PATENT DOCUMENTS 5,073,820 A * 12/1991 Nakagawa et al. ......... 358/133
5,291,282 A    3/1994 Nakagawa et al.
5,608,654 A    3/1997 Matsunoshita
5,822,463 A * 10/1998 Yokose et al. ............. 382/251

FOREIGN PATENT DOCUMENTS

| EP | 493130 | 7/1992 |
| JP | 4167868 | 6/1992 |
| JP | 4179371 | 6/1992 |

* cited by examiner

Primary Examiner—Phuoc Tran
Assistant Examiner—Amir Alavi
(74) Attorney, Agent, or Firm—Price and Gess

(57) ABSTRACT

The block reducing unit 201 reads one block out of each block group. The pixel reducing unit 202 reads pixels on one-out-four basis. The block reading unit 203 sequentially reads out images. The orthogonal transformation unit 205 performs orthogonal transformation. The quantization unit 206 performs a quantization. The encode amount predicting unit 207 calculates predicted encode amounts. The quantization width calculating unit 208 determines an optimum quantization width. The quantization table generating unit 209 generates an optimum quantization table. The block-assignment encode amount setting unit 210 calculates an encode amount to be assigned to each block.

28 Claims, 33 Drawing Sheets

FIG. 10

| SIGN | COLOR COMPONENT | QUANTIZATION WIDTH(×1000) |
|---|---|---|
| Y4 | BRIGHTNESS Y | 70 |
| Y8 | | 240 |
| Y16 | | 780 |
| U4 | COLOR DIFFERENCE Cb | 70 |
| U8 | | 240 |
| U16 | | 780 |
| V4 | COLOR DIFFERENCE Cr | 70 |
| V8 | | 240 |
| V16 | | 780 |

FIG. 11

STANDARD QUANTIZATION TABLE
209d

| 16 | 11 | 10 | 16 | 24 | 40 | 51 | 61 |
|---|---|---|---|---|---|---|---|
| 12 | 12 | 14 | 19 | 26 | 58 | 60 | 55 |
| 14 | 13 | 16 | 25 | 40 | 57 | 69 | 56 |
| 14 | 17 | 22 | 29 | 51 | 87 | 80 | 62 |
| 18 | 22 | 37 | 56 | 68 | 109 | 103 | 77 |
| 24 | 35 | 55 | 64 | 81 | 104 | 113 | 92 |
| 49 | 64 | 78 | 87 | 103 | 121 | 120 | 101 |
| 72 | 92 | 95 | 98 | 112 | 100 | 103 | 99 |

FIG. 14

| QUANTIZATION WIDTH (×1000) | ENCODE AMOUNT A(BIT) | ENCODE AMOUNT B(BIT) |
|---|---|---|
| 20 | 308960 | 173121 |
| 40 | 249821 | 119566 |
| 60 | 217065 | 96278 |
| 80 | 191572 | 79674 |
| 100 | 175205 | 68899 |
| 120 | 160760 | 59820 |
| 140 | 151127 | 54493 |
| 160 | 143153 | 50332 |
| 180 | 134477 | 45451 |
| 200 | 128545 | 42934 |
| 220 | 123045 | 40420 |
| 240 | 117765 | 38499 |
| 260 | 112783 | 35665 |
| 280 | 109057 | 33811 |
| 300 | 105202 | 32378 |
| 320 | 101556 | 30672 |
| 340 | 98081 | 28888 |
| 360 | 95411 | 28114 |
| 380 | 92648 | 26768 |
| 400 | 90333 | 26279 |
| 420 | 87461 | 25246 |
| 440 | 84908 | 23870 |
| 460 | 82528 | 23047 |
| 480 | 81052 | 22450 |
| 500 | 80246 | 22403 |
| 520 | 77086 | 21005 |
| 540 | 75929 | 20776 |
| 560 | 73829 | 20126 |
| 580 | 72437 | 19660 |
| 600 | 70989 | 19191 |
| 620 | 69517 | 18538 |
| 640 | 68032 | 18145 |
| 660 | 67254 | 18002 |
| 680 | 66044 | 17592 |
| 700 | 64774 | 17326 |

QUANTIZATION WIDTH CORRESPONDENCE TABLE 1300

FIG. 15

| QUANTIZATION WIDTH (×1000) | ENCODE AMOUNT A(BIT) | ENCODE AMOUNT B(BIT) |
|---|---|---|
| 720 | 63615 | 16790 |
| 740 | 62735 | 16559 |
| 760 | 61426 | 16307 |
| 780 | 60682 | 16114 |
| 800 | 59943 | 15875 |
| 820 | 58959 | 15629 |
| 840 | 57781 | 15159 |
| 860 | 56990 | 15052 |
| 880 | 56476 | 14982 |
| 900 | 55915 | 14897 |
| 920 | 54837 | 14468 |
| 940 | 54087 | 14226 |
| 960 | 53485 | 14143 |
| 980 | 53141 | 14126 |
| 1000 | 53000 | 14116 |
| 1050 | 50872 | 13659 |
| 1100 | 49216 | 13152 |
| 1150 | 48108 | 12856 |
| 1200 | 46689 | 12623 |
| 1250 | 45894 | 12524 |
| 1300 | 44455 | 12188 |
| 1350 | 43428 | 11838 |
| 1400 | 42509 | 11697 |
| 1450 | 41514 | 11517 |
| 1500 | 40760 | 11448 |
| 1550 | 39745 | 11132 |
| 1600 | 38812 | 10985 |
| 1650 | 38059 | 10867 |
| 1700 | 37535 | 10651 |
| 1750 | 36815 | 10533 |
| 1800 | 36049 | 10436 |
| 1850 | 35479 | 10224 |
| 1900 | 34817 | 10145 |
| 1950 | 34265 | 10055 |
| 2000 | 33986 | 10045 |

FIG. 16

| QUANTIZATION WIDTH (×1000) | ENCODE AMOUNT A(BIT) | ENCODE AMOUNT B(BIT) |
|---|---|---|
| 2100 | 32659 | 9733 |
| 2200 | 31570 | 9469 |
| 2300 | 30562 | 9333 |
| 2400 | 29907 | 9180 |
| 2500 | 29043 | 9056 |
| 2600 | 28234 | 8887 |
| 2700 | 27455 | 8763 |
| 2800 | 26777 | 8668 |
| 2900 | 26179 | 8559 |
| 3000 | 25623 | 8465 |
| 3100 | 24913 | 8358 |
| 3200 | 24332 | 8285 |
| 3300 | 23778 | 8200 |
| 3400 | 23305 | 8141 |
| 3500 | 22866 | 8089 |
| 3600 | 22292 | 8009 |
| 3700 | 21844 | 7976 |
| 3800 | 21523 | 7938 |
| 3900 | 21051 | 7866 |
| 4000 | 20694 | 7810 |
| 4100 | 20353 | 7785 |
| 4200 | 19876 | 7717 |
| 4300 | 19448 | 7673 |
| 4400 | 19138 | 7634 |
| 4500 | 18948 | 7626 |
| 4600 | 18592 | 7573 |
| 4700 | 18220 | 7533 |
| 4800 | 17992 | 7512 |
| 4900 | 17720 | 7469 |
| 5000 | 17481 | 7442 |
| 5200 | 16928 | 7374 |
| 5400 | 16406 | 7329 |
| 5600 | 15952 | 7264 |
| 5800 | 15512 | 7210 |
| 6000 | 15156 | 7168 |

FIG. 17

| QUANTIZATION WIDTH (×1000) | ENCODE AMOUNT A(BIT) | ENCODE AMOUNT B(BIT) |
|---|---|---|
| 6200 | 14719 | 7118 |
| 6400 | 14393 | 7080 |
| 6600 | 14030 | 7037 |
| 6800 | 13756 | 7013 |
| 7000 | 13463 | 6978 |
| 7200 | 13145 | 6945 |
| 7400 | 12844 | 6914 |
| 7600 | 12537 | 6880 |
| 7800 | 12354 | 6853 |
| 8000 | 12174 | 6830 |
| 8500 | 11655 | 6774 |
| 9000 | 11174 | 6718 |
| 9500 | 10773 | 6674 |
| 10000 | 10316 | 6624 |

IMAGE ENCODING APPARATUS, IMAGE ENCODING METHOD, AND RECORDING MEDIUM IN WHICH IMAGE ENCODING PROGRAM IS RECORDED

This application is based on an application No. H09-289730 filed in Japan, the content of which is hereby incorporated by reference.

BACKGROUND OF THE INVENTION (1) Field of the Invention

This invention relates to an image encoding apparatus and an image encoding method which perform an orthogonal transformation, quantization, and entropy coding, and relates to a recording medium in which an image encoding program is recorded.

(2) Description of the Prior Art

Recently, great efforts have been made to develop efficient techniques for coding/compressing images. Among these techniques, JPEG is an international standard for coding and decoding still pictures; MPEG1 Video is an international standard for coding and decoding moving pictures.

According to these image coding/compressing methods, images are encoded and converted into compressed data as follows. Image data is first divided into blocks. Each block is subjected to an orthogonal transformation process to output orthogonal transformation coefficients. The obtained orthogonal transformation coefficients are subjected to a quantization process to output quantized orthogonal transformation coefficients. The obtained quantized orthogonal transformation coefficients are entropy-encoded, resulting in variable-length encoded/compressed data.

Digital still cameras, digital video cassette recorders and the like have been developed using such image compressing techniques. These products have their own numbers of recordable images or recording times. However, in case of variable-length encoding methods, the assigned number of recordable images or the assigned recording time may not be ensured since the amount of encoded data for each image is different from each other.

The following method is known as a method of ensuring the assigned number of recordable images or the assigned recording time. According to this method, quantization widths used for the quantization process are temporarily determined. Using the determined quantization widths, the quantization process and the subsequent processes are performed as described earlier. In doing so, a total amount of encoded data of an image is compared to a target encode amount of the image to predict a suitable quantization width for achieving an amount which is close to the target amount. When the predicted quantization width is close to a quantization width of the preceding image encoding and when the current total encode amount is less than a target encode amount, the variable-length encode data is output. Otherwise, another quantization width is used to repeat the same processes.

Japanese Laid-Open Patent Application No. 4-207266 "Image Data Encoding Apparatus and Method" discloses an encoding/compressing method in which different quantization tables for respective colors are used to encode/compress color images. With this construction, it is possible for this method to encode each image in a certain process time by assigning a different encode amount for each color and each block.

However, the former method has a problem that each encoding takes a different encode time, and that each encoding takes a long time since the encode process is repeated at least twice, though each encode amount is equal to or less than a target amount.

Also, the latter method has a problem that each encoding takes a long time since the encode process is repeated at least twice, though a constant encode time is kept.

SUMMARY OF THE INVENTION

It is therefore an object of the present invention to provide an image encoding apparatus, an image encoding method, and a recording medium storing an image encoding program which encode an image with a certain process time so that a certain error or less is produced between the generated encode amount and a target encode amount, that is, use a less process time than conventional ones and obtain a high-quality image.

The above object is achieved by an image encoding apparatus for generating encoded images which have encode amounts close to corresponding target encode amounts, the image encoding apparatus comprising: a relationship storage unit for storing relationships, for each of one or more standard images, between a group of a plurality of quantization widths and one or more groups of a plurality of encode amounts, where each of the one or more groups of the plurality of encode amounts is obtained by encoding each of the one or more standard images using the plurality of quantization widths respectively; a quantization width determining unit for obtaining a target encode amount and referring to the relationship storage unit to obtain one or more quantization widths which correspond to one or more encode amounts which each are closest to the obtained target encode amount in a corresponding one of the one or more groups of the plurality of encode amounts; and an encoding unit for obtaining an image and encoding the obtained image using the one or more quantization widths obtained by the quantization width determining unit.

With the above construction, it is possible to have an effect that each image is encoded with an encode amount close to the target encode amount since each image is encoded with a quantization width which corresponds to an encode amount closest to the target encode amount in the relationships the apparatus holds.

In the above image encoding apparatus, the encoding unit may include: a predicted encode amount calculating unit for obtaining an image, generating one or more quantization tables using the one or more quantization widths obtained by the quantization width determining unit, and calculating one or more predicted encode amounts for the obtained image using the generated one or more quantization tables; an optimum quantization width determining unit for reading the relationships from the relationship storage unit, obtaining a quantization width corresponding to the target encode amount using the one or more predicted encode amounts and using the read relationships, and determining the obtained quantization width as the optimal quantization width; and an image encoding unit for generating a quantization table using the optimal quantization width, and encoding the obtained image using the generated quantization table.

With the above construction, it is possible to have an effect that each image is encoded with an encode amount closer to the target encode amount than before since one or more predicted encode amounts are calculated using the one or more quantization tables, a quantization width corresponding to the target encode amount is obtained using the one or more predicted encode amounts and using the read relationships, the obtained quantization width is determined as the optimal quantization width, and the image is encoded with the optimal quantization width.

In the above image encoding apparatus, each image to be obtained by the encoding unit may include a plurality of block groups which each include a predetermined number of blocks, and the image obtaining unit obtains a predetermined number of blocks from predetermined positions in each of the plurality of block groups.

With the above construction, it is possible to have an effect that the process time is reduced since a smaller amount of image data is read to be used for predicting the relationship between the quantization width and the encode amount.

In the above image encoding apparatus, each image to be obtained by the encoding unit may include a plurality of block groups which each include a predetermined number of blocks, each block includes a predetermined number of pixels, and the image obtaining unit obtains a predetermined number of pixels from predetermined positions in each of the plurality of block groups.

With the above construction, it is possible to have an effect that the process time is reduced since a smaller amount of image data is read to be used for predicting the relationship between the quantization width and the encode amount. It is also possible to have an effect that the relationship between the quantization width and the encode amount is predicted accurately even if the current block has an edge component since pixels are selected at certain intervals (e.g., on a one-out-of-four basis), the edge component is a portion having a radical change of an image.

In the image encoding apparatus, each of the one or more quantized orthogonal transformation images generated by the quantization unit may include a plurality of blocks, each block includes one direct current component coefficient and (n-1) alternating current component coefficients, the predetermined formula used by the predicted encode amount calculating unit is represented as:

$$V_e = \alpha_{dc} * \log_2 |S_{q0}| + \alpha_{ac} * \sum_{i=1}^{n-1} L(S_{qi}) + \alpha_{zn} * \sum_{i=1}^{n-1} d(S_{qi}) + \beta,$$

where $V_e$ represents a predicted encode amount of one block, n represents the number of pixels included in one block, $S_{q0}$ represents a difference between quantized orthogonal transformation coefficients (direct current components) of the current and preceding blocks, $S_{qi}$ represents a quantized orthogonal transformation coefficient (alternating current component, where i="1" to "63"), $\alpha_{dc}$ represents a conversion coefficient, $\alpha_{ac}$ represents a conversion coefficient, $\alpha_{zn}$ represents a conversion coefficient, $\beta$ represents a constant, L(X) represents a function which provides a result value "0" when X=0 and a result value of $\log_2 |X|$ when X≠0, and d(X) represents a function which provides a result value "0" when X=0 and a result value "1" when X≠0.

With the above construction, it is possible to have an effect that the process time is reduced since the encode amount is predicted without performing the variable-length encoding.

In the above image encoding apparatus, the relationship storage unit may store a first group of a plurality of encode amounts and a second group of a plurality of encode amounts, where the plurality of encode amounts of each of the first and second groups respectively correspond to the plurality of quantization widths, the quantization width determining unit obtains a quantization width $\alpha_{e1}$ and a quantization width $\alpha_{e2}$ the predicted encode amount calculating unit calculates a predicted encode amount $V_{p1}$ and a predicted encode amount $V_{p2}$ respectively using the quantization width $\alpha_{e1}$ and the quantization width $\alpha_{e2}$, the optimum quantization width determining unit include: an encode amount obtaining unit for obtaining a first encode amount $V_{b1}$ and a second encode amount $V_{a1}$ corresponding to the quantization width $\alpha_{e1}$ and obtaining a first encode amount $V_{b2}$ and a second encode amount $V_{a2}$ corresponding to the quantization width $\alpha_{e2}$; and a quantization width calculating unit for calculating a target encode amount using the following formula:

$$V_{p1} - V_{a1} V_{p2} - V_{a2} V_{p1} - V_{a1} \alpha_q - \alpha_{e1}$$

$$V_q = V_a + \left\{ \frac{V_{p1} - V_{a1}}{V_{b1} - V_{a1}} + \left( \frac{V_{p2} - V_{a2}}{V_{b2} - V_{a2}} - \frac{V_{p1} - V_{a1}}{V_{b1} - V_{a1}} \right) * \frac{\alpha_q - \alpha_{e1}}{\alpha_{e2} - \alpha_{e1}} \right\} * (V_b - V_a),$$

where $V_q$ represents an encode amount of an image generated with an arbitrary quantization width $\alpha_q$, and determining a quantization width corresponding to the calculated target encode amount as an optimum quantization width, where a second encode amount corresponding to the arbitrary quantization width $\alpha_q$ is obtained from the relationship storage unit and the obtained second encode amount is regarded as $V_a$, and a first encode amount corresponding-to the arbitrary quantization width $\alpha_q$ is obtained from the relationship storage unit and the obtained first-encode amount is regarded as $V_b$.

With the above construction, it is possible to have an effect that the relationship between the quantization width and the encode amount is predicted more accurately than before since an image with a large encode amount and an image with a small encode amount are encoded with a certain number of quantization widths to obtain the first and second encode amounts. The obtained first and second encode amounts are used together with the quantization widths and read image to predict the relationship between the quantization width and the encode amount.

In the above image encoding apparatus, each image to be obtained by the encoding unit may include a plurality of blocks which each include a predetermined number of pixels, the optimum quantization width determining unit obtains a predicted encode amount corresponding to the optimum quantization width, the image encoding unit includes: a block-assignment encode amount calculating unit for obtaining a block of the obtained image, generating a quantization table using the optimum quantization width based on the predicted encode amount and the target encode amount, and calculating a block-assignment encode amount for the obtained block using the one or more quantization tables generated by the predicted encode amount calculating unit; a block encoding unit for generating a quantization table using the optimum quantization width and encoding each block using the generated quantization table so that an encode amount of the obtained block does not exceed the block-assignment encode amount.

With the above construction, it is possible to have an effect that the performance of the compression/encoding is improved since it is possible to encode the image with a certain error or less between the generated encode amount and the target encode amount with only one encoding by predicting the encode amount, while in conventional techniques, the encoding process is performed at least once to check the generated encode amount of the image.

In the above image encoding apparatus, the block-assignment encode amount calculating unit may include: an image obtaining unit for obtaining a block of the obtained image; an orthogonal transformation unit for performing an orthogonal transformation on the obtained block to generate an orthogonal transformation block; a quantization unit for quantizing the orthogonal transformation block using the one or more quantization tables to generate one or more quantized orthogonal transformation blocks; a block predicted encode amount calculating unit for calculating a predicted encode amount of the obtained block using the one or more quantized orthogonal transformation blocks; and a secondary block-assignment encode amount calculating unit for calculating a block-assignment encode amount by substituting into a predetermined formula the one or more predicted encode amounts for the obtained image, the target encode amount, and the predicted encode amount of the obtained block.

With the above construction, it is possible to have an effect that the encode amount of the entire image does not exceed the target encode amount since the block-assignment encode amount is determined for each block for this purpose and each block is encoded not to exceed the block-assignment encode amount.

In the above image encoding apparatus, the block-assignment encode amount calculating unit may include: an image obtaining unit for obtaining a block of the obtained image; an orthogonal transformation unit for performing an orthogonal transformation on the obtained block to generate an orthogonal transformation block; a quantization unit for generating a quantization table, and quantizing the orthogonal transformation block to generate a quantized orthogonal transformation block; an entropy-encoding unit for encoding the quantized orthogonal transformation block so that the quantized orthogonal transformation block does not exceed the block-assignment encode amount.

With the above construction, it is possible to have an effect that the encode amount of the entire image does not exceed the target encode amount since the block-assignment encode amount is determined for each block for this purpose and each block is encoded not to exceed the block-assignment encode amount.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 10 shows sample data used in FIGS. 7–9;

FIG. 11 shows a standard quantization table;

FIG. 14 shows a quantization width correspondence table;

FIG. 15 shows the quantization width correspondence table continued from FIG. 14;

FIG. 16 shows the quantization width correspondence table continued from FIG. 15;

FIG. 17 shows the quantization width correspondence table continued from FIG. 16;

DESCRIPTION OF THE PREFERRED EMBODIMENTS

Table of Contents

Embodiment 1
1. Structure of Digital Still Camera
2. Structure of Encoding Circuit 108
   2.1 Block Reducing Unit 201
   2.2 Pixel Reducing Unit 202
   2.3 Block Reading Unit 203
   2.4 Data Selector 204
   2.5 Orthogonal Transformation Unit 205
   2.6 Quantization Unit 206
   2.7 Encode Amount Predicting Unit 207
   2.8 Quantization Width Calculating Unit 208
      (1) Quantization Width
      (2) Principle of Calculating Optimal Quantization Width
      (3) Quantization Width Calculating Unit 208
   2.9 Quantization Table Generating Unit 209
   2.10 Block-Assignment Encode Amount Setting Unit 210
   2.11 Entropy-Encoding Unit 211
   2.12 Encode Control Unit 213
3. Operation of Digital Still Camera
   3.1 Summarized Encoding Process
   3.2 Summarized Encoding Operation
   3.3 Creating Quantization Tables for Encode Amount Prediction
   3.4 Predicting Encode Amounts for Entire Image
   3.5 Predicting Encode Amounts for Each Block Group
   3.6 Encoding
   3.7 Entropy-Encoding
4. Conclusion Embodiment 2
1. Structure of Digital Still Camera
2. Structure of Encoding Circuit 121
   2.1 Data Selector 221
3. Operation of Digital Still Camera
   3.1 Summarized Encoding Process
   3.2 Summarized Encoding Operation
   3.3 Creating Quantization Tables for Encode Amount Prediction
   3.4 Predicting Encode Amounts for Entire Image
   3.5 Predicting Encode Amounts for Each Block Group
   3.6 Encoding
   3.7 Entropy-Encoding
4. Conclusion Other Embodiments

Embodiment 1

A digital still camera 100, which is an image encoding apparatus as one embodiment of the present invention, is described in terms of its structure and operations.

1. Structure of Digital Still Camera

The structure of the digital still camera 100 as one embodiment of the present invention is described with reference to a block diagram shown in FIG. 1.

Figure 1:
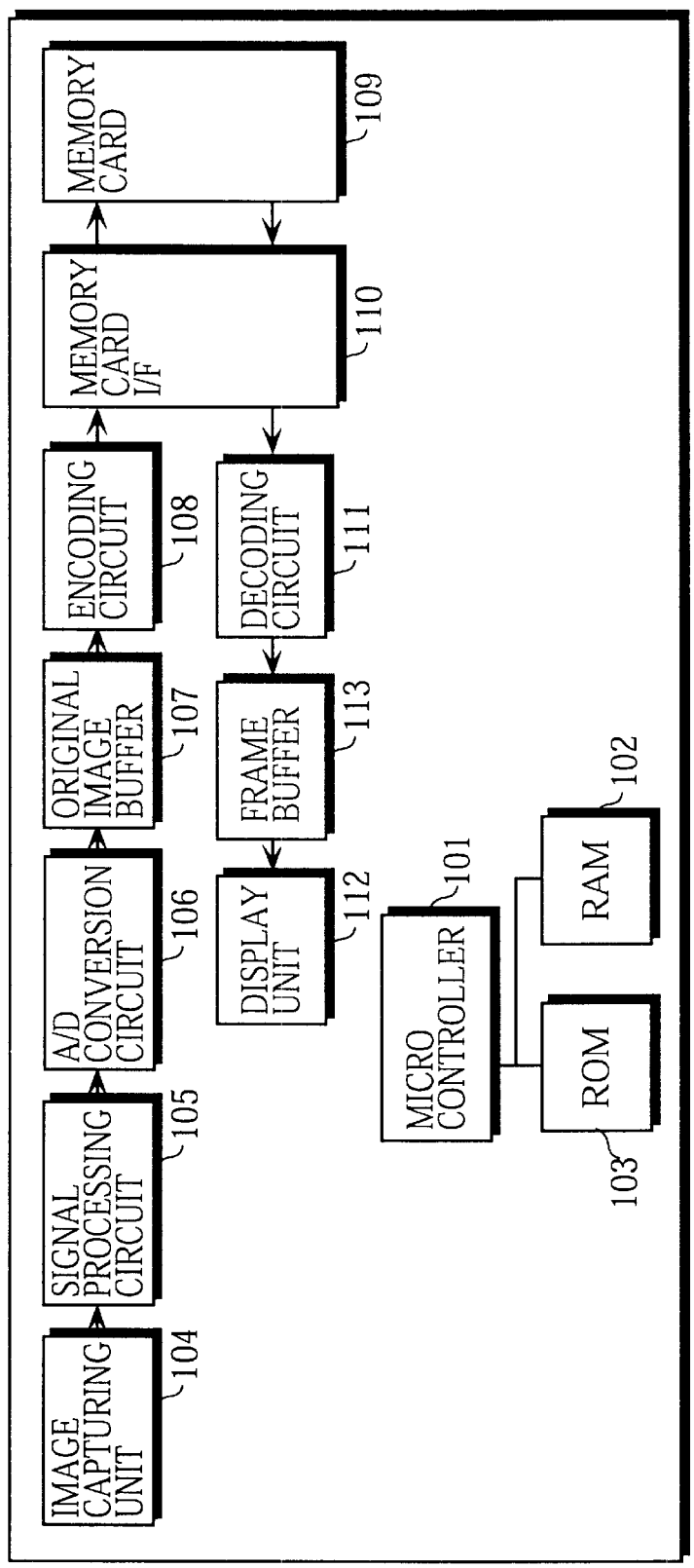
FIG. 1 is a block diagram showing the structure of the image encoding apparatus as one embodiment of the present invention.

As shown in FIG. 1, the digital still camera 100 is composed of a micro controller 101, a RAM 102 used as a work memory of the micro controller 101, a ROM 103 storing a program for activating the micro controller 101, an image capturing unit 104, being achieved by a CCD or the like, for converting images into electric signals, a signal processing circuit 105 for performing a gamma correction on the converted electric signals, an A/D conversion circuit 106 for converting the converted electric signals into digital signals, an original image buffer 107 for temporarily storing the converted digital signals, an encoding circuit 108 for encoding/compressing images, a memory card 109 for storing encoded/compressed images, a memory card I/F 110 for controlling reading and writing of data from/onto the memory card 109, a decoding circuit 111 for decoding and reproducing the encoded/compressed images, a display unit 112, being achieved by an LCD or the like, for displaying the images having been recorded or images to be recorded, and a frame buffer 113 for temporarily storing the images displayed on the display unit 112.

The micro controller 101 controls the entire camera.

Also, the micro controller 101 outputs an instruction of "image encoding start" and a target encode amount $V_o$ to an encode control unit 213 which will be described later, and receives a notification of "image encoding end" from the encode control unit 213.

2. Structure of Encoding Circuit 108

The structure of the encoding circuit 108 of the digital still camera 100 shown in FIG. 1 is described with reference to a block diagram shown in FIG. 2. FIG. 3 shows information transferred between the components of the encoding circuit 108.

The encoding circuit 108 is composed of a block reducing unit 201, a pixel reducing unit 202, a block reading unit 203, a data selector 204, an orthogonal transformation unit 205, a quantization unit 206, an encode amount predicting unit 207, a quantization width calculating unit 208, a quantization table generating unit 209, a block-assignment encode amount setting unit 210, an entropy-encoding unit 211, and an encode control unit 213.

The above components of the encoding circuit 108 are described in detail.

2.1 Block Reducing Unit 201

Figure 4:
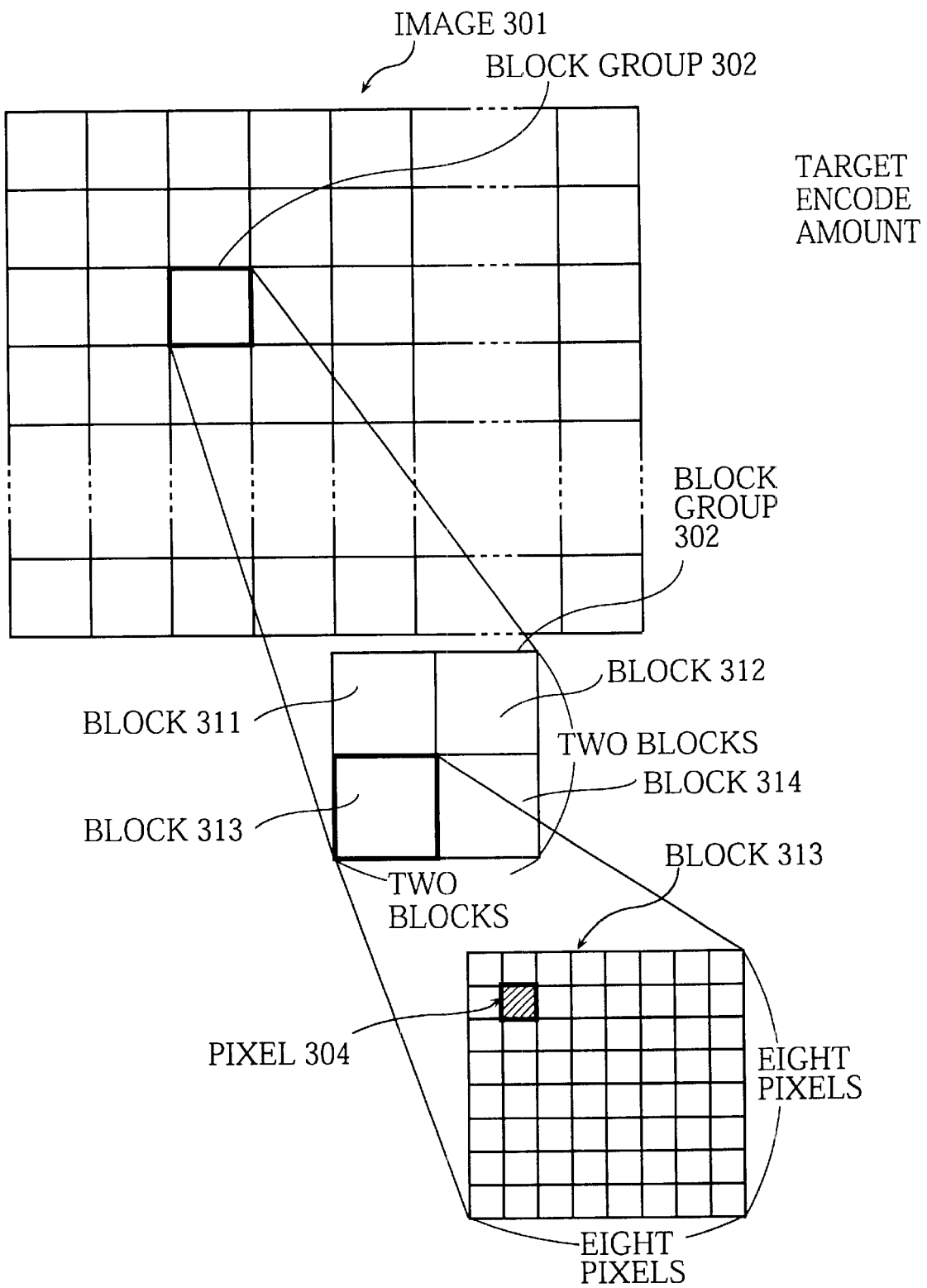
FIG. 4 shows relationships between images, block groups, blocks, and pixels.

As shown in FIG. 4, each block is composed of 64 pixels with eight pixels arranged in each row and column, where the pixel is the minimum unit of digital images. As shown in FIG. 4, the block 313 is composed of 8×8 pixels. Each group of four blocks which are arranged in two-block rows and two-block columns is called "block group." In FIG. 4, the block group 302 is composed of four blocks, blocks 311, 312, 313, and 314.

The block reducing unit 201 picks up block groups one by one under a certain rule from an image stored in the original image buffer 107.

The block reducing unit 201 further selects the upper-25 left block from each of the picked-up block groups as a representative of each block group. The block reducing unit 201 then reads out whole pixel values of the selected blocks. For example, the block reducing unit 201 selects a block group 302 shown in FIG. 4, then out of the four blocks 311, 312, 313, and 314 included in the block group 302, selects the upper-left block 311. The block reducing unit 201 reads out all the 64 pixel values that make up the selected block 311. The block reducing unit 201 then outputs the 64 pixel values to the data selector 204.

Figure 5:
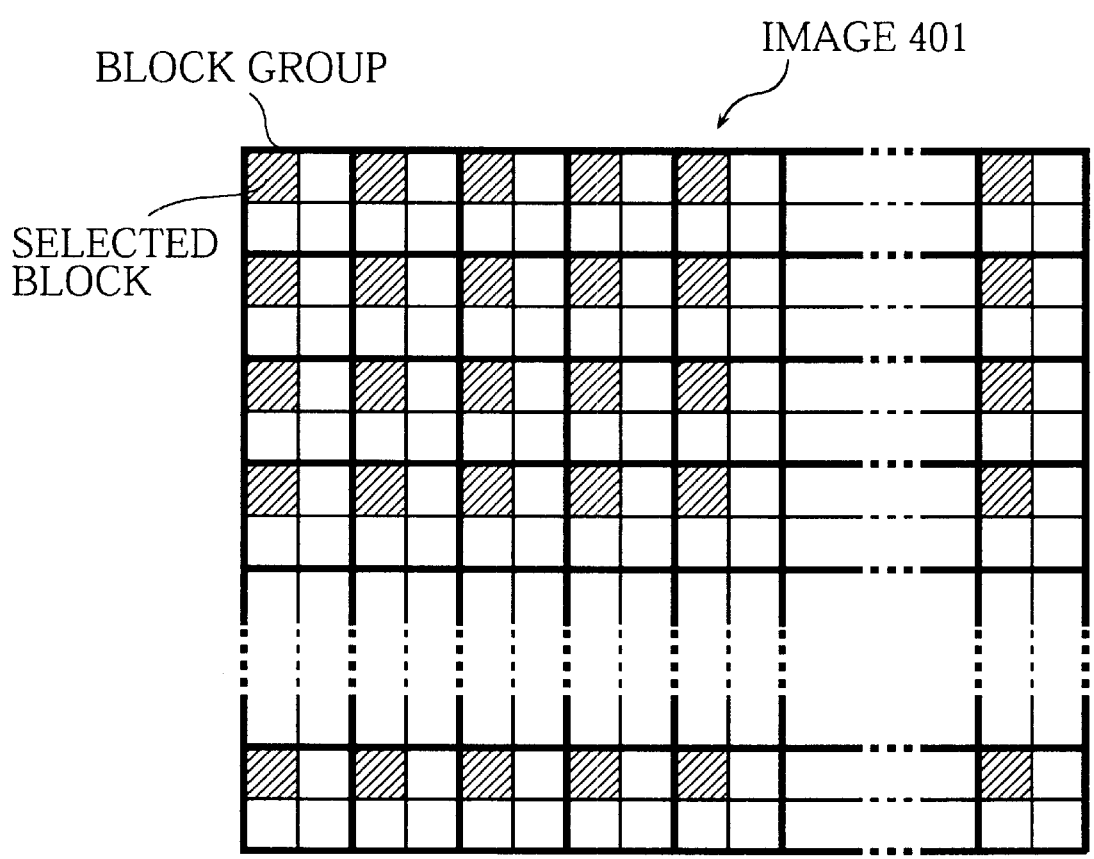
FIG. 5 shows the block reduction in which a block is selected from each block group of an image.

FIG. 5 shows an image stored in the original image buffer 107, block groups, and blocks selected from each block group. In the drawing, the image 401 is an image stored in the original image buffer 107. Boxes enclosed in thick lines are block groups. Boxes with slanted lines are blocks selected from each block group.

2.2 Pixel Reducing Unit 202

The pixel reducing unit 202 selects block groups one by one in order from an image stored in the original image buffer 107.

Each block group is composed of 64 sub-blocks arranged in rows and columns, each row and column consisting of eight sub-blocks. Each sub-block is composed of four pixels arranged in rows and columns, where each row and column consists of two pixels.

The pixel reducing unit 202 then selects the upper-left pixel from each sub-block. That means, 64 pixels are selected from each block group. The pixel reducing unit 202 reads out 64 pixel values of the 64 selected pixels, and outputs the read-out pixel values to the data selector 204.

Figure 6:
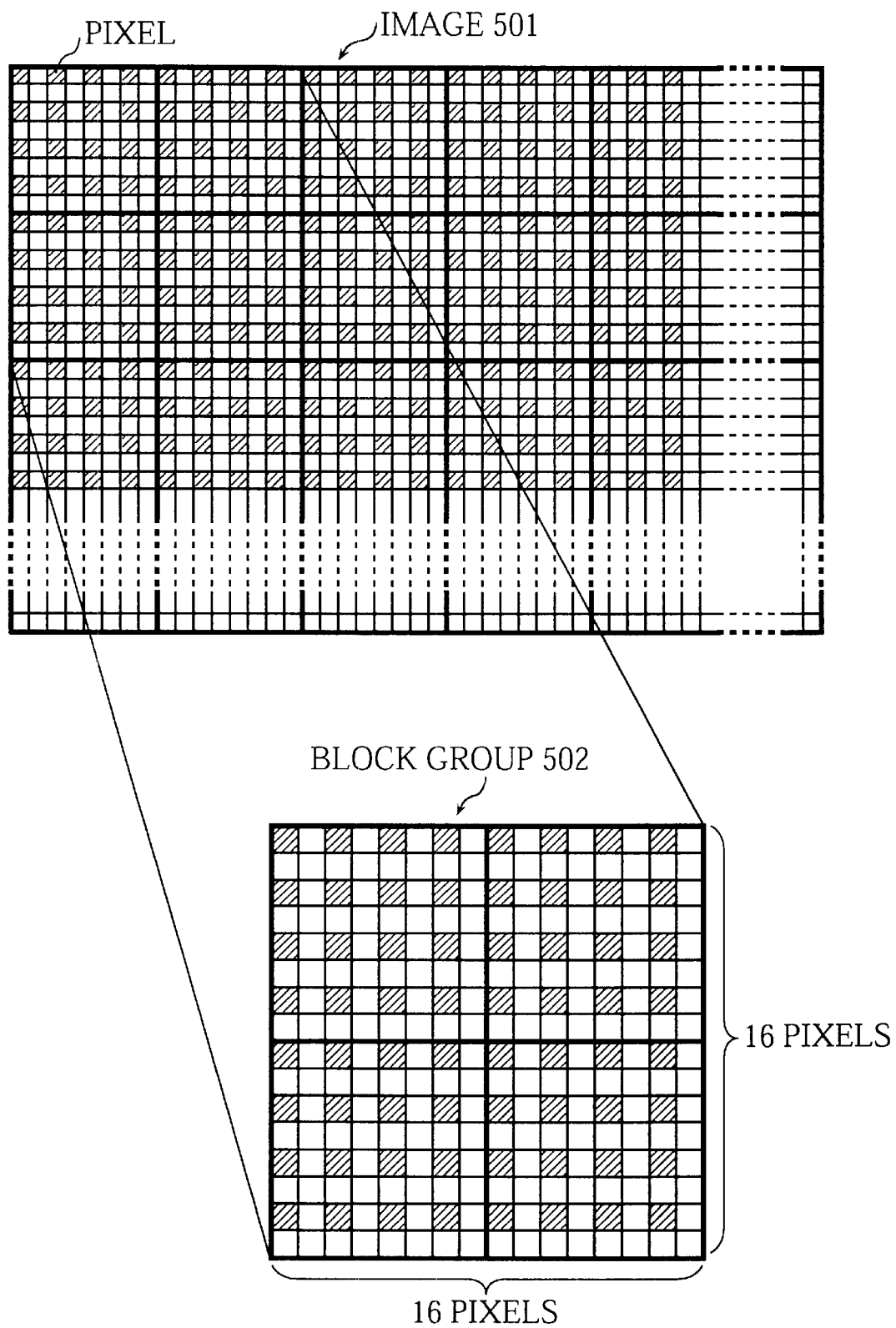
FIG. 6 shows the pixel reduction in which a pixel is selected on a one-out-of-four basis for each block group of an image.

FIG. 6 shows an image stored in the original image buffer 107, block groups, and pixels selected from each block group. In the drawing, the image 501 is an image stored in the original image buffer 107. Boxes enclosed in thick lines are blocks. Boxes with slanted lines are pixels selected from each block group.

2.3 Block Reading Unit 203

The block reading unit 203 reads out 64 pixel values per one block from the image stored in the original image buffer 107, and outputs the read-out 64 pixel values to the data selector 204.

2.4 Data Selector 204

The data selector 204 receives one of a "whole prediction," a "pixel reduction," and a "block read-out" instruction from the encode control unit 213.

On receiving the "whole prediction" instruction, the data selector 204 selects the 64 pixel values output from the block reducing unit 201. On receiving the "pixel reduction" instruction, the data selector 204 selects the 64 pixel values output from the pixel reducing unit 202. On receiving the "block read-out" instruction, the data selector 204 selects the 64 pixel values output from the block reading unit 203. The data selector 204 then outputs the selected 64 pixel values to the orthogonal transformation unit 205.

2.5 Orthogonal Transformation Unit 205

The orthogonal transformation unit 205 performs an orthogonal transformation on the 64 pixel values output from the data selector 204. The orthogonal transformation unit 205 then outputs 64 orthogonal transformation coefficients $S_i$ (i="0" to "63") obtained from the transformation to the quantization unit 206, where $S_i$ represents the $i^{th}$ orthogonal transformation coefficient.

The orthogonal transformation process is already known and no further explanation concerning this process is given.

2.6 Quantization Unit 206

The quantization unit 206 receives one of a "whole prediction," a "pixel reduction," and a "block read-out" instruction from the encode control unit 213.

Receiving "Whole Prediction" Instruction

On receiving the "whole prediction" instruction, the quantization unit 206 performs two types of quantization processes as follows.

In the first quantization process, the quantization unit 206 reads 64 element values $Qmax_i$ (i="0" to "63") from a maximum quantization table 209b which is, as will be described later, created and held by the quantization table generating unit 209. The quantization unit 206, using Formula 1 shown below, divides each of the 64 orthogonal transformation coefficients Si output from the orthogonal transformation unit 205 by a corresponding one of the 64 element values $Qmax_i$, rounds up each result to an integer, and obtains 64 maximum orthogonal transformation coefficients $Smax_{qi}$ (i="0" to "63"). The quantization unit 206 then outputs the obtained 64 maximum orthogonal transformation coefficients $Smax_{qi}$ to the encode amount predicting unit 207.

$$Smax_{qi}=round(S_i/Qmax_i)(i=\text{"0" to "63"}) \quad \text{Formula 1}$$

In Formula 1, $Smax_{qi}$ represents the $i^{th}$ maximum quantized orthogonal transformation coefficient, $S_i$ the $i^{th}$ orthogonal transformation coefficient, $Qmax_i$ the $i^{th}$ element value in the maximum quantization table 209b, and round ( ) rounding up of a value in the parenthesis to an integer closest to the value.

In the second quantization process, the quantization unit 206 reads 64 element values $Qmin_i$ (i="0" to "63") from a minimum quantization table 209c which is, as will be described later, created and held by the quantization table generating unit 209. The quantization unit 206, using Formula 2 shown below, divides each of the 64 orthogonal transformation coefficients Si output from the orthogonal transformation unit 205 by a corresponding one of the 64 element values $Qmin_i$, rounds up each result to an integer, and obtains 64 minimum orthogonal transformation coefficients $Smin_{qi}$ (i="0" to "63"). The quantization unit 206 then outputs the obtained 64 minimum orthogonal transformation coefficients $Smin_{qi}$ to the encode amount predicting unit 207.

$$Smin_{qi}=round(S_i/Qmin_i)(i=\text{"0" to "63"}) \quad \text{Formula 2}$$

In Formula 2, $Smin_{qi}$ represents the $i^{th}$ minimum quantized orthogonal transformation coefficient, $S_i$ the $i^{th}$ orthogonal transformation coefficient, $Qmin_i$ the $i^{th}$ element value in the minimum quantization table 209c, and round ( ) rounding up of a value in the parenthesis to an integer closest to the value.

Receiving "Pixel Reduction" or "Block Read-Out" Instruction

On receiving the "pixel reduction" or "block read-out" instruction from the encode control unit 213, the quantization unit 206 performs the quantization process as follows.

The quantization unit 206 reads 64 element values $Q_i$ (i="0" to "63") from an optimum quantization table 209a which is, as will be described later, created and held by the quantization table generating unit 209. The quantization unit 206, using Formula 3 shown below, divides each of the 64 orthogonal transformation coefficients Si output from the orthogonal transformation unit 205 by a corresponding one of the 64 element values $Q_i$, rounds up each result to an integer, and obtains 64 quantized orthogonal transformation coefficients $S_{qi}$ (i="0" to "63"). The quantization unit 206 then outputs the obtained 64 quantized orthogonal transformation coefficients $S_{qi}$ to the encode amount predicting unit 207 when having received the "pixel reduction" instruction. The quantization unit 206 outputs the obtained 64 quantized orthogonal transformation coefficients $S_{qi}$ to the entropy-encoding unit 211 when having received the "block read-out" instruction.

$$S_{qi}=round(S_i/Q_i)(i=\text{"0" to "63"}) \quad \text{Formula 3}$$

In Formula 3, $S_{qi}$ represents the $i^{th}$ quantized orthogonal transformation coefficient, $S_i$ the $i^{th}$ orthogonal transformation coefficient, $Q_i$ the $i^{th}$ element value in the optimum quantization table 209a, and round ( ) rounding up of a value in the parenthesis to an integer closest to the value.

2.7 Encode Amount Predicting Unit 207

The encode amount predicting unit 207 calculates, using Formula 4 shown below, a predicted encode amount $V_e$ which is a predicted amount to be generated by entropy-encoding each of the 64 quantized orthogonal transformation coefficients output from the quantization unit 206.

In Formula 4, the first term represents a predicted amount of entropy-encoding of the direct current component in the target quantized orthogonal transformation coefficients. The second term represents a predicted amount of entropy-encoding of alternating current components having values other than "0" in the target quantized orthogonal transformation coefficients. The third term corrects an increase in the predicted encode amount which occurs due to consecutive "0"s when the consecutive "0" s and a subsequent alternating current component are entropy-encoded.

Each of the "$\log_2|X|$" of the first term and the "L(X)" of the second term represents the number of digits in the binary notation of value "X," where X≠0 in the "L(X)" of the second term.

Formula 4

$$V_e = \alpha_{dc} * \log_2|S_{q0}| + \alpha_{ac} * \sum_{i=1}^{63} L(S_{qi}) +$$

$$\alpha_{zn} * \sum_{i=1}^{63} d(S_{qi}) + \beta$$

In Formula 4, $V_e$ represents a predicted encode amount of one block, $S_{q0}$ a difference between quantized orthogonal transformation coefficients (direct current components) of the current and preceding blocks, $S_{qi}$ a quantized orthogonal transformation coefficient (alternating current component, where i="1" to "63"), $\alpha_{dc}$ a conversion coefficient, $\alpha_{ac}$ a conversion coefficient, $\alpha_{zn}$ a conversion coefficient, $\beta$ a constant, L(X) a function which provides a result value "0" when X=0 and a result value of $\log_2|X|$ when X≠0, and d(X) a function which provides a result value "0" when X=0 and a result value "1" when X≠0.

Figure 7:
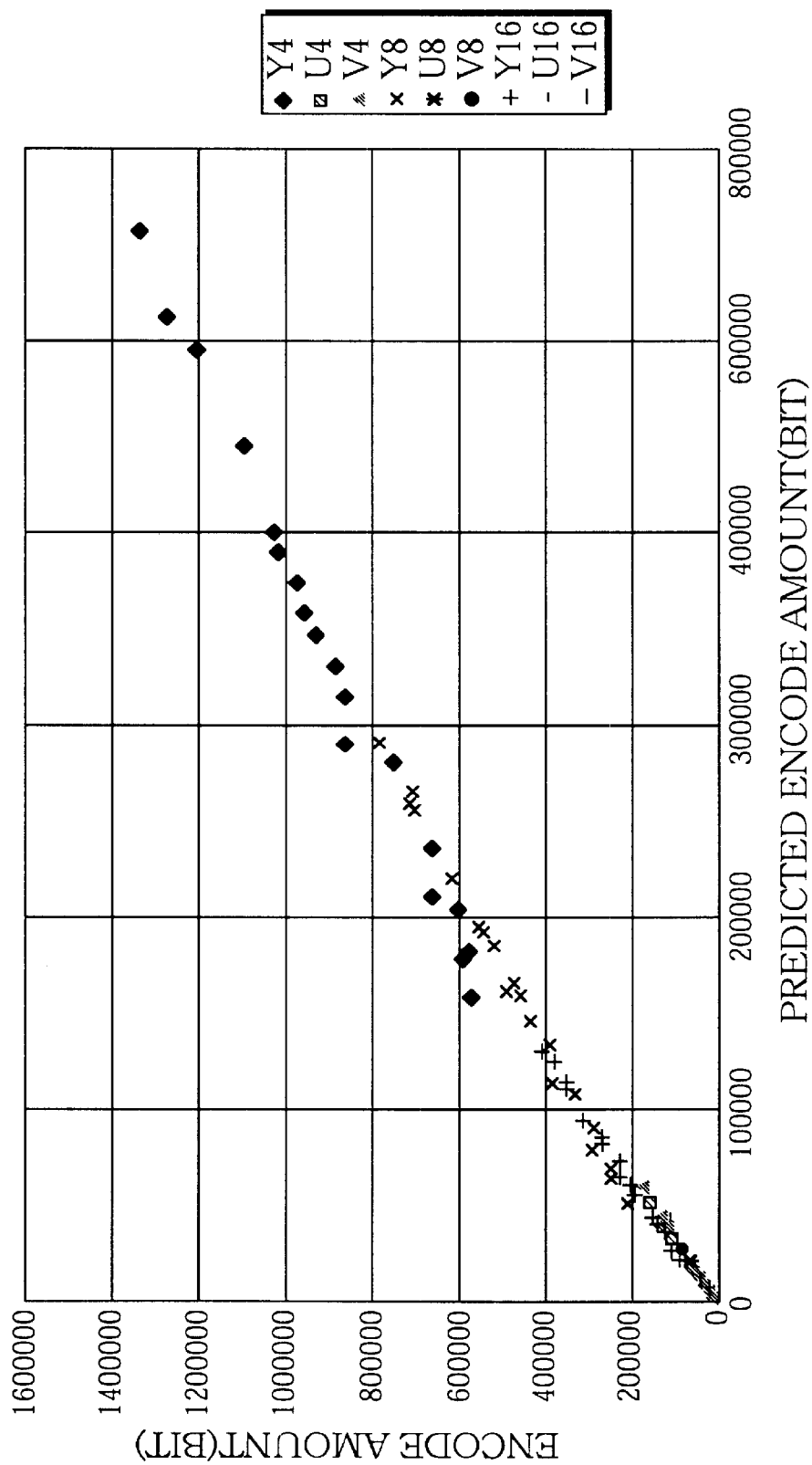
FIG. 7 shows relation between predicted encode amounts and encode amounts.
Figure 8:
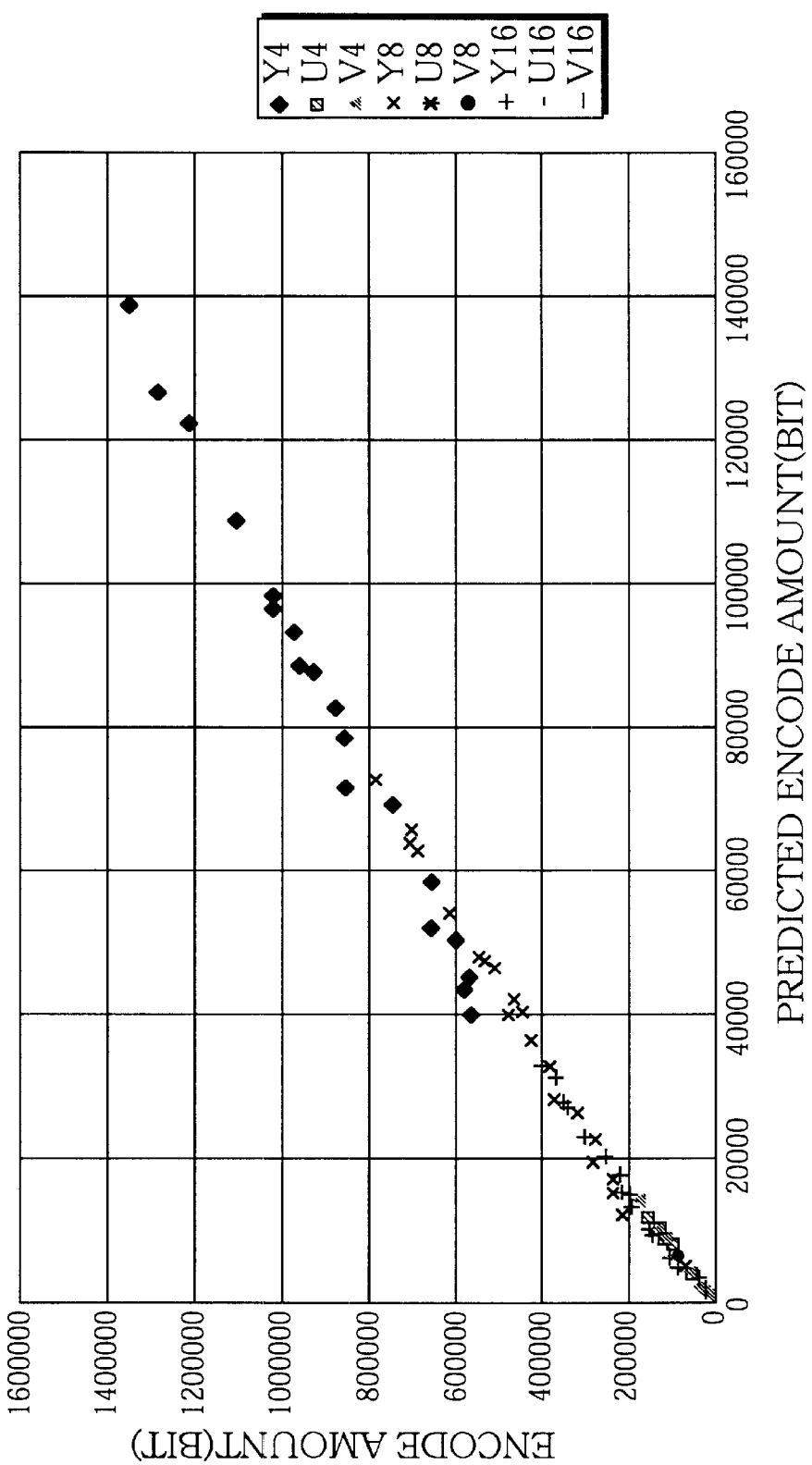
FIG. 8 shows relation between predicted encode amounts and encode amounts.
Figure 9:
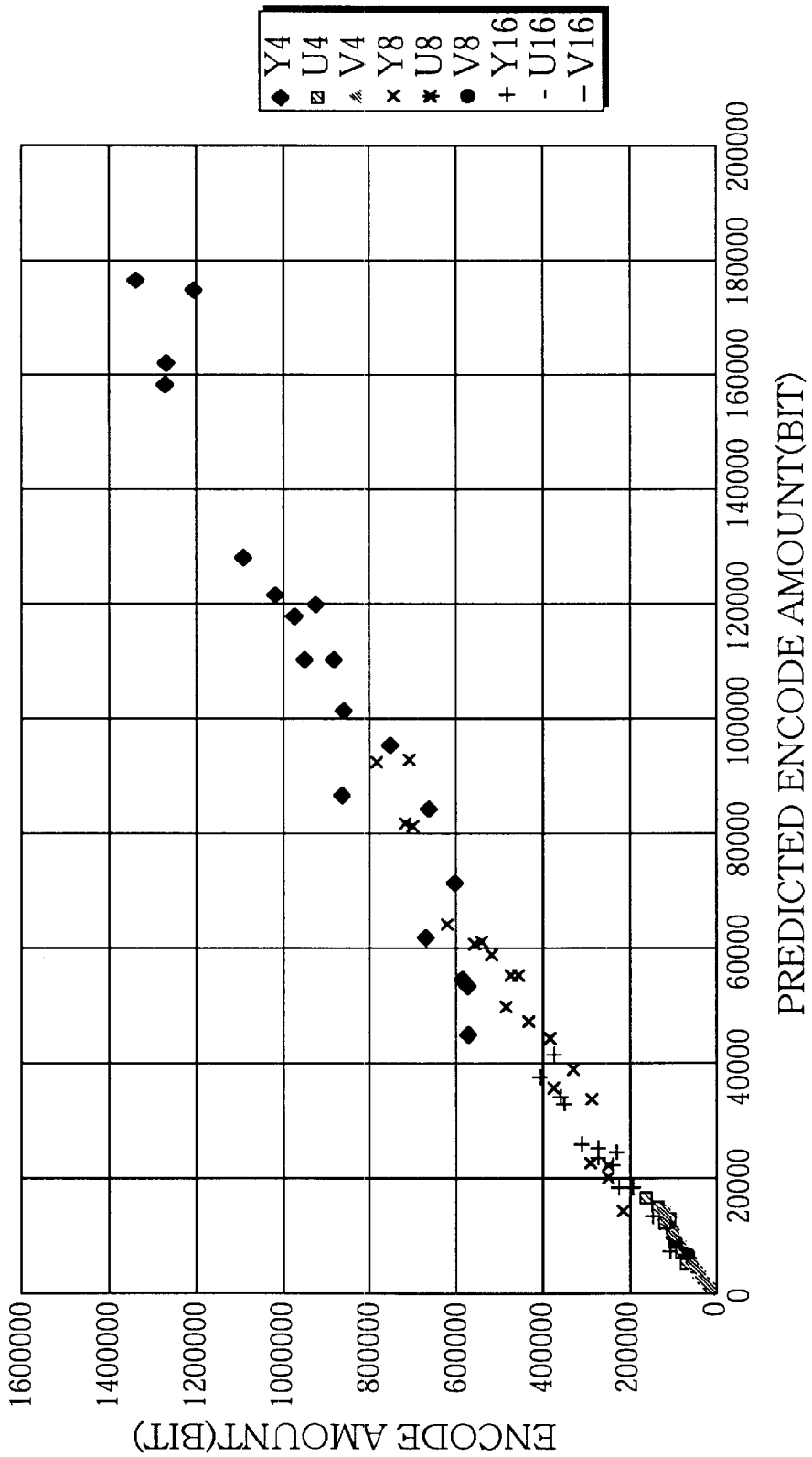
FIG. 9 shows relation between predicted encode amounts and encode amounts.

FIGS. 7, 8, and 9 each show relationships between the actual encode amounts of 20 types of images and predicted encode amounts of the same images calculated with Formula 4.

In each of FIGS. 7, 8, and 9, the vertical axis represents the actual encode amounts and the horizontal ax, represents the predicted encode amounts calculated with the second term of Formula 4. Each of FIGS. 7, 8, and 9 shows the above values plotted for each of the nine patterns shown in FIG. 10. The nine patterns are composed of three types of quantization widths 903 "70," and "240," and "780" set for each of three color difference Cr. The nine patterns are represented by signs 901: Y4, Y8, and Y16 (brightness Y), U4, U8, and U16 (color difference Cb), and V4, V8, and V16 (color difference Cr). The quantization width will be described later.

The predicted encode amounts shown in FIG. 7 are calculated using all the pixel values of an entire image. The predicted encode amounts shown in FIG. 8 are calculated using the pixel values of the pixels picked up in units of blocks from the entire image, as explained in "2.1 Block Reducing Unit 201." predicted encode amounts shown in FIG. 9 are calculadted using the pixel valuew of ethe pixels picked up in units of pixels from the ebture umage, as explained in "2.2 Pixel Reducing Unit 202."

As understood from FIGS. 7, 8, and 9, there are strong correlations between the actual encode amounts and predicted encode amounts calculated with the second term of Formula 4. This shows that the prediction of encode amounts made by the calculation with Formula 4 has high accuracy.

Also, it is found by comparison that FIG. 8 shows stronger correlations than FIG. 9. It shows that for an entire image, the prediction of encode amounts made for the pixel values picked up in units of blocks has higher accuracy than those picked up in units of pixels. However, the predicted encode amounts calculated with the second term of Formula 4 may not reflect a large amount of encoding included in not-selected blocks. This happens when an edge component of an image is included in a block not selected for the prediction, for example. As a result, for a block group, the prediction of encode amounts made for the pixel values picked up in units of pixels has higher accuracy than those picked up in units of blocks. For this reason, in the present embodiment, these two types of methods are used for reducing pixels as targets of the encode amount calculation.

The encode amount predicting unit 207 receives a "whole prediction" or a "pixel reduction" instruction from the encode control unit 213.

On receiving the whole prediction instruction, the encode amount predicting unit 207 calculates a maximum predicted encode amount $Vmax_e$ for each block group with Formula 4 from 64 maximum quantized orthogonal transformation coefficients $Smax_{qi}$ output from the quantization unit 206. The encode amount predicting unit 207 then accumulates the calculated maximum predicted encode amounts $Vmax_e$ to obtain a cumulative maximum predicted encode amount $V_{p2}$ which corresponds to one entire image. The encode amount predicting unit 207 outputs the cumulative maximum predicted encode amounts $V_{p2}$ to the quantization width calculating unit 208. The encode amount predicting unit 207 also calculates a minimum predicted encode amount $Vmin_e$ for each block group with Formula 4 from 64 minimum quantized orthogonal transformation coefficients $Smin_{qi}$ output from the quantization unit 206. The encode amount predicting unit 207 then accumulates the calculated minimum predicted encode amounts $Vmin_e$ to obtain a cumulative minimum predicted encode amount $V_{p1}$ which corresponds to one entire image. The encode amount predicting unit 207 outputs the cumulative minimum predicted encode amounts $V_{p1}$ to the quantization width calculating unit 208. The encode amount predicting unit 207 also sends a notification of "whole prediction end" to the encode control unit 213 after completing the calculations of the maximum predicted encode amount $Vmax_e$ and the minimum predicted encode amount $Vmin_e$ for each block group except the last one.

On receiving the pixel reduction instruction from the encode control unit 213, the encode amount predicting unit 207 calculates a predicted encode amount $V_e$ for each block group with Formula 4 from 64 quantized orthogonal transformation coefficients $S_{qi}$ output from the quantization unit 206. The encode amount predicting unit 207 then accumulates the calculated predicted encode amounts $V_e$ to obtain a cumulative predicted encode amount $V_p$ which corresponds to one entire image. The encode amount predicting unit 207 outputs the calculated predicted encode amount $V_e$ and cumulative predicted encode amount $V_p$ to the block-assignment encode amount setting unit 210. After this, the encode amount predicting unit 207 sends a notification of "pixel reduction end" to the encode control unit 213.

2.8 Quantization Width Calculating Unit 208

This section describes the quantization width, the principle of calculating the quantization width, and quantization width calculating unit 208.

(1) Quantization Width

The quantization width is multiplied by 64 element values making up the standard quantization table 209d which will be described later. This generates a quantization table composed of the values obtained from the above multiplication.

The quantization table is used to quantize the orthogonal conversion coefficients. The quantized orthogonal conversion coefficients are used for the entropy encoding. As a result, by adjusting the quantization width, it is possible to change the compression rate of encoded images.

Each element $Q_i$ of the quantization table is represented by the following Formula 5.

$$Q_i = \text{round}(B_i * \alpha)(i = \text{"0" to "63"}) \quad \text{Formula 5}$$

In Formula 5, $B_i$ represents each element of the standard quantization table 209d, and $\alpha$ the quantization width. Hence, the following Formula 6 is obtained from Formulas 3 and 5.

$$S_{qi} = \text{round}(S_i / \text{round}(B_i * \alpha))(i = \text{"0" to "63"}) \quad \text{Formula 6}$$

As understood from Formula 6, it is possible to change the 64 orthogonal conversion coefficients by changing one quantization width. This is convenient.

(2) Principle of Calculating Optimal Quantization Width

For the prediction of encode amount, quantized orthogonal conversion coefficients are used. Therefore, it is possible to predict an encode amount with a high accuracy by adjusting the quantization width so as to obtain an encode amount being closest to a target encode amount.

Here, the principle of calculating the optimal quantization width is described. With the optimal quantization width, the image is encoded to generate an encode amount closest to a target encode amount.

In an encoding including the orthogonal conversion process and the entropy encoding process, the generated encode amount varies depending on the type and content of the image.

Figure 12:
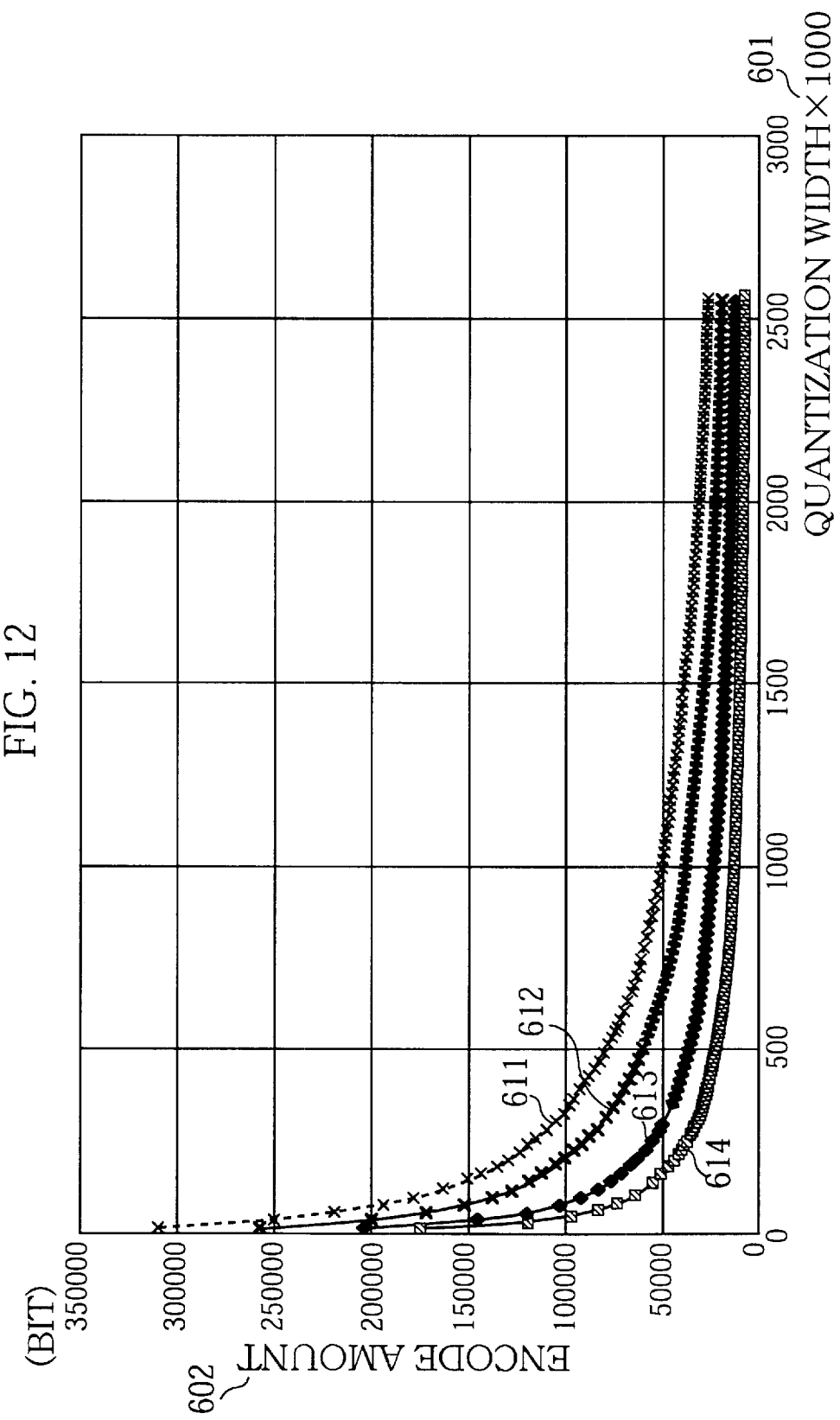
FIG. 12 shows relation between the quantization widths and generated encode amounts.

The correlation between the quantization width and the generated encode amount was measured for four images A, B, C, and D. The images A, B, C, and D show birds, a farm and the like. For this encoding, the DCT conversion was used as the orthogonal conversion, the table shown in FIG. 11 was used as the standard quantized table 209d, and the Huffman encoding method was used as the entropy encoding, the Huffman encoding method being used in JPEG. Each image has a size of 640×480 pixels. FIG. 12 shows the relation between the quantization width and the encode amount which has been actually measured for each of the four images.

In FIG. 12, the horizontal axis represents "quantization width×1000" 601; the vertical axis represents the encode amount 602 as a result of entropy encoding. The encode amount 602 is represented in units of bits. The curves 611, 612, 613, and 614 respectively correspond to images A, B, C, and D.

By observing FIG. 12, it is understood that the curves 611, 612, 613, and 614 are arranged in the order of the largeness of the encode amount. This order of largeness of the encode amount for these curves does not change with any quantization widths. It is deduced from this that the relation between the encode amounts of two arbitrary images does not change regardless of the quantization width. This characteristic is called Characteristic 1.

Also, regardless of the image types, the encode amount increases as the quantization width decreases; the encode amount decreases as the quantization width increases. The encode amount gradually approaches zero as the quantization width increases, and gradually approaches the infinite as the quantization width decreases. This characteristic is called Characteristic 2.

The difference between the encode amounts of two arbitrary images decreases as the quantization width increases, and increases as the quantization width decreases. This characteristic is called Characteristic 3.

It is possible to predict the encode amount of a target image for each quantization width by using the above-described characteristics when the encode amounts of two images for each quantization width and the encode amount of the target image for one quantization width have already been known.

The encode amount of a target image for each quantization width predicted with the above method will have a high accuracy when images respectively having a relatively large encode amount and a relatively small encode amount are used as the two images whose generated encode amounts have already been known.

By using the encode amount of a target image for each quantization width predicted with the above method, it is possible to predict a quantization width with which the target image generates an encode amount close to a target encode amount.

Figure 13:
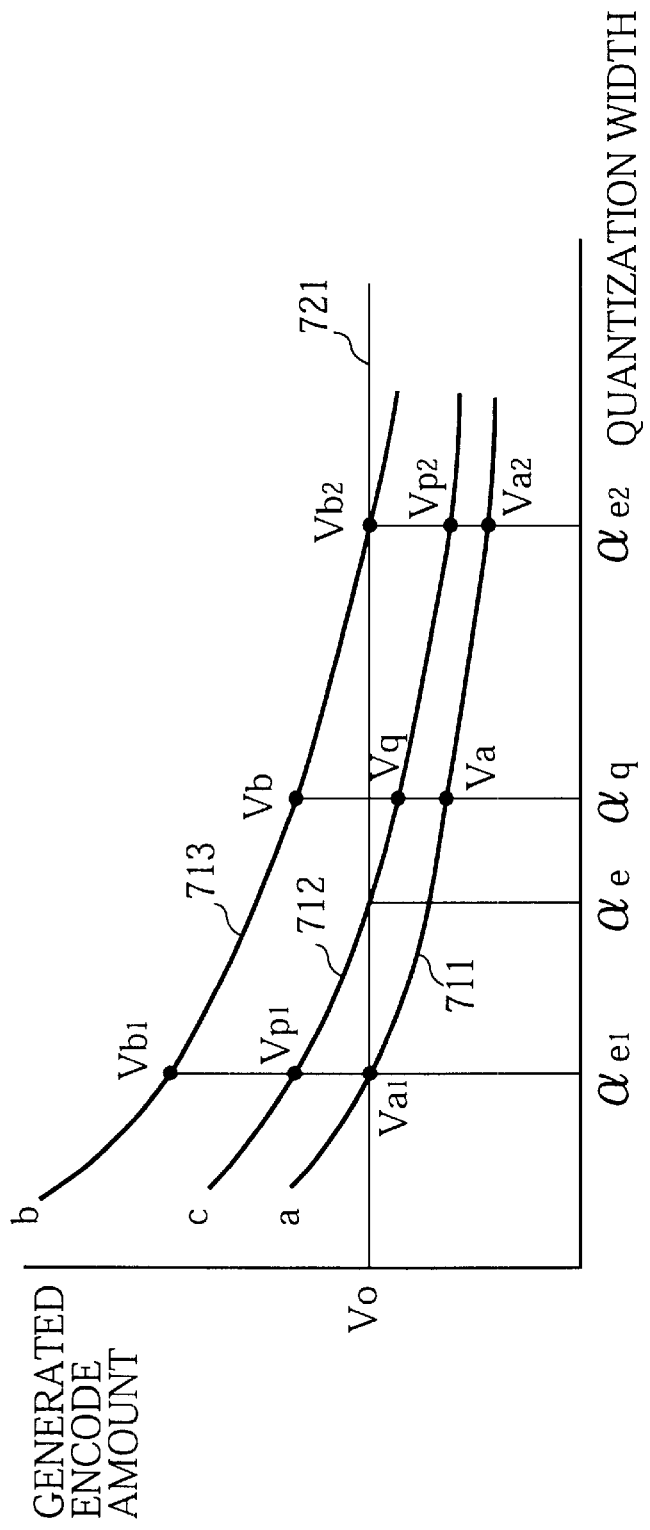
FIG. 13 shows relation between the quantization widths and generated encode amounts.

FIG. 13 is a schematic representation of the relation between the quantization width and the encode amount shown in FIG. 12. In FIG. 13, the horizontal axis represents the quantization width, and the vertical axis represents the encode amount. The curve 711 shows encode amounts of an image for given quantization widths, the encode amounts being small. The curve 713 shows encode amounts of another image for given quantization widths, the encode amounts being large. It is presumed that the encode amounts for each quantization width of the curves 711 and 713 have already been known. The curve 712 shows encode amounts of a target image for the quantization widths.

Here, it is presumed that $\alpha_e$ represents a quantization width with which a target encode amount $V_o$ is generated by encoding a target image which has encode amounts represented by the curve 712, the curve 712 existing between the curves 711 and 713. Also, it is presumed that $\alpha_{e1}$ represents a quantization width with which a target encode amount $V_o$ is generated by encoding the image corresponding to the curve 711, and that $\alpha_{e2}$ represents a quantization width with which a target encode amount $V_o$ is generated by encoding the image corresponding to the curve 713.

In the above-described conditions, it is doubtless that the quantization width $\alpha_e$ exists between the quantization widths $\alpha_{e1}$ and $\alpha_{e2}$.

In accordance with Characteristic 1, the encode amount of a target image which is an intermediate image between an image with a large encode amount and an image with a small encode amount is an intermediate between two encode amounts of these images regardless of the quantization width. From this fact, the following formula is established.

$$V_q = V_a + \gamma_q * (V_b - V_a)(0 \leq \gamma_q \leq 1) \quad \text{Formula 7}$$

In Formula 7, $V_a$ represents an encode amount of an image with small encode amounts generated with quantization width $\alpha_q$, $V_b$ represents an encode amount of an image with large encode amounts generated with quantization width $\alpha_q$, and $\gamma_q$ represents a numeral which is equal to or more than 0 and is equal to or less than 1.

The encode amount $V_q$ generated with quantization width $\alpha_{e1}$ is represented by the following formula.

$$V_q = V_{p1} = V_{a1} + \gamma_1 * (V_{b1} - V_{a1})(0 \leq \gamma_1 \leq 1) \quad \text{Formula 8}$$

Also, the encode amount $V_q$ generated with quantization width $\alpha_{e2}$ is represented by the following formula.

$$V_q = V_{p2} = V_{a2} + \gamma_2 * (V_{b2} - V_{a2})(0 \leq \gamma_2 \leq 1) \quad \text{Formula 9}$$

In Formulas 8 and 9:

$V_{p1}$ represents a predicted encode amount of the target image generated with quantization width $\alpha_{e1}$;

$V_{p2}$ represents a predicted encode amount of the target image generated with quantization width $\alpha_{e2}$;

$V_{a1}$ represents an encode amount of the image with small encode amounts generated with quantization width $\alpha_{e1}$;

$V_{b1}$ represents an encode amount of the image with large encode amounts generated with quantization width $\alpha_{e1}$;

$V_{a2}$ represents an encode amount of the image with small encode amounts generated with quantization width $\alpha_{e2}$;

$V_{b2}$ represents an encode amount of the image with large encode amounts generated with quantization width $\alpha_{e2}$;

$\gamma_1$ represents a numeral which is equal to or more than 0 and is equal to or less than 1; and $\gamma_2$ represents a numeral which is equal to or more than 0 and is equal to or less than 1.

In accordance with Characteristic 3, the difference between the encode amounts of two arbitrary images decreases as the quantization width increases, and increases as the quantization width decreases. From this fact, the following formula is established.

$$\gamma_q = \gamma_1 + (\gamma_2 - \gamma_1) * (\alpha_q - \alpha_{e1})/(\alpha_{e2} - \alpha_{e1}) \qquad \text{Formula 10}$$

From these facts described above, an encode amount of the target image generated with an arbitrary quantization width $\alpha_q$ is obtained from the following formula.

Formula 11

$$V_q = V_a + \left\{ \frac{V_{p1} - V_{a1}}{V_{b1} - V_{a1}} + \left( \frac{V_{p2} - V_{a2}}{V_{b2} - V_{a2}} - \frac{V_{p1} - V_{a1}}{V_{b1} - V_{a1}} \right) * \frac{\alpha_q - \alpha_{e1}}{\alpha_{e2} - \alpha_{e1}} \right\} * (V_b - V_a) \qquad \text{Formula 11}$$

(3) Quantization Width Calculating Unit 208

The quantization width calculating unit 208 includes a quantization width correspondence table 1300 which shows quantization widths which are each related to an encode amount of an image from which small encode amounts are generated and to an encode amount of an image from which large encode amounts are generated. FIGS. 14–17 show the quantization width correspondence table 1300.

The image with small encode amounts and the image with large encode amounts are regarded as the standard images of the quantization width correspondence table 1300 since the table 1300 is generated based on these images.

The quantization width correspondence table 1300 includes columns QUANTIZATION WIDTH 1301, ENCODE AMOUNT A 1302, and ENCODE AMOUNT B 1303. The quantization width column. 1301 includes values obtained by multiplying each quantization width by 1000. The ENCODE AMOUNT A column 1302 includes encode amounts which are obtained by encoding the image with large encode amounts using a quantization table, where the quantization table is obtained by multiplying a value in the quantization width column 1301 by each element of the standard quantization table 209d. The ENCODE AMOUNT B column 1303 includes encode amounts which are obtained by encoding the image with small encode amounts using the same quantization table as the one used for the ENCODE AMOUNT A column 1302.

As apparent from the above description, the quantization width correspondence table 1300 shows relationships between a plurality of quantization widths and encode amounts for at least one standard image. In other words, the quantization width calculating unit 208 includes these relationships. Note that FIGS. 14 to 17 are in continuity in the order.

The quantization width calculating unit 208 receives a target encode amount $V_o$ from the encode control unit 213. The quantization width calculating unit 208 then refers to the quantization width correspondence table 1300 to extract a quantization width corresponding to an encode amount equivalent to the target encode amount $V_o$ detected from the ENCODE AMOUNT A column 1302. When no encode amount equivalent to the target encode amount $V_o$ is found in the ENCODE AMOUNT A column 1302, the quantization width calculating unit 208 extracts a quantization width corresponding to an encode amount in the ENCODE AMOUNT A column 1302 which is closest to the target encode amount $V_o$. The quantization width calculating unit 208 recognizes the extracted quantization width as quantization width $\alpha_{e2}$.

Similarly, the quantization width calculating unit 208 extracts a quantization width corresponding to an encode amount equivalent or closest to the target encode amount $V_o$ detected from the ENCODE AMOUNT B column 1303, and recognizes the extracted quantization width as quantization width $\alpha_{e1}$.

The quantization width calculating unit 208 then calculates the predicted encode amount $V_q$ of the target image using Formula 11 while changing the quantization width $\alpha_q$ in the range of $\alpha_{e1}$ to $\alpha_{e2}$. This calculation is performed based on the extracted quantization widths $\alpha_{e1}$ and $\alpha_{e2}$, and the cumulative maximum predicted encode amounts $V_{p2}$ and cumulative minimum predicted encode amounts $V_{p1}$ output from the encode amount predicting unit 207. The quantization width calculating unit 208 then obtains a quantization width $\alpha_q$ with which the calculated predicted encode amount $V_q$ is closest to the target encode amount $V_o$. The obtained quantization width $\alpha_q$ is determined to be $\alpha_e$.

As described above, the quantization width calculating unit 208, holding the relationships between a plurality of quantization widths and encode amounts, obtains a quantization width $\alpha_q$ corresponding to the target encode amount $V_o$ by calculating predicted encode amounts using the relationships, and determines the obtained quantization width $\alpha_q$ as the optimal quantization width $\alpha_e$.

The quantization width calculating unit 208 outputs to the quantization table generating unit 209 the extracted quantization widths $\alpha_{e1}$ and $\alpha_{e2}$ and the calculated quantization width $\alpha$.

After outputting the above values, the quantization width calculating unit 208 outputs the notification of "whole prediction end" to the encode control unit 213.

2.9 Quantization Table Generating Unit 209

The quantization table generating unit 209 stores the standard quantization table 209d shown in FIG. 11 which is the standard for the quantization table.

The quantization table generating unit 209 receives quantization widths $\alpha$, $\alpha_{e1}$, and $\alpha_{e2}$ from the quantization width calculating unit 208. The quantization table generating unit 209 then obtains 64 elements $Q_i$ by multiplying the quantization widths $\alpha$ received from the quantization width calculating unit 208 by the elements $B_i$ (i="0" to "63") of the standard quantization table 209d, as shown in Formula 5, and rounding up the obtained multiplication results. The quantization table generating unit 209 then creates the optimum quantization table 209a by the obtained 64 elements $Q_i$, and outputs the created optimum quantization table 209a to the quantization unit 206.

Similarly, the quantization table generating unit 209 creates the maximum quantization table 209b and the minimum quantization table 209c respectively using the quantization widths $\alpha_{e2}$ and $\alpha_{e1}$ received from the quantization width calculating unit 208, then outputs the created tables 209b and 209c to the quantization unit 206.

2.10 Block-Assignment Encode Amount Setting Unit 210

The block-assignment encode amount setting unit 210 calculates encode amount $V_b$ to be assigned to each block using the predicted encode amount $V_e$ for each block group, predicted encode amount for an entire image $V_p$, and target encode amount $V_o$ output from the encode control unit 213, and outputs the calculated block-assignment encode amount $V_b$ to the entropy-encoding unit 211.

The method of calculating the block-assignment encode amount $V_b$ is described below.

First, the block-assignment encode amount setting unit 210 calculates the encode amount to be assigned to each block group by prorating the target encode amount $V_o$ at the ratio of the predicted encode amount $V_e$ for the block group to the predicted encode amount $V_p$ for the entire image. Secondly, the block-assignment encode amount setting unit 210 assigns the same encode amount to each block in the encode-amount-assigned block group. This is because it is considered that each block in a block generates almost the same encode amount due to the local similarity which is a characteristic of images.

Some blocks may end up generating an encode amount less than the assigned encode amount in the entropy-encoding. In this case, the difference between the actually generated encode amount and the assigned encode amount is carried to the next block. With this arrangement, it is possible to minimize the deterioration of the image quality which is caused by an encoding stop.

The above calculation of the encode amount $V_b$ to be assigned to each block is represented by the following formula.

$$V_b = V_o * V_e / (V_p * N_b) + E \qquad \text{Formula 12}$$

In Formulas 12:

$V_b$ represents an encode amount assigned to a block;

$V_o$ represents the target encode amount of the entire image;

$V_e$ represents a predicted encode amount of a block group including the current block;

$V_p$ represents the predicted encode amount of the entire image;

$N_b$ represents the number of blocks included in the current block group; and

E represents an encode amount carried from the preciously encoded block.

2.11 Entropy-Encoding Unit 211

The entropy-encoding unit 211 entropy-encodes the quantized orthogonal transformation coefficients output from the quantization unit 206, and outputs the encoded image data to the memory card I/F 110.

The entropy-encoding unit 211 entropy-encodes each element of a quantized orthogonal transformation coefficient in sequence and calculates the generated encode amount for each element, and accumulates the calculated encode amounts. The entropy-encoding unit 211 compares the cumulative encode amounts at each stage of the accumulation with the block-assignment encode amount. The entropy-encoding unit 211 stops encoding of the current block before the cumulative encode amounts exceeds the block-assignment encode amount. By stopping encoding a block halfway, high-frequency components of the block are not encoded.

The entropy-encoding unit 211 sends a notification of "block read-out end" d to the encode control unit 213 after completing the entropy-encoding of a block.

2.12 Encode Control Unit 213

The encode control unit 213 receives the "image encoding start" instruction and the target encode amount $V_o$ from the micro controller 101.

The encode control unit 213 outputs one of the "whole prediction," "pixel reduction," and "block read-out" instruction to the data selector 204. The encode control unit 213 also outputs one of the "whole prediction," "pixel reduction," and "block read-out" instruction to the quantization unit 206. The encode control unit 213 also outputs the "whole prediction" or "pixel reduction" instruction to the encode amount predicting unit 207. The encode control unit 213 outputs the target encode amount $V_o$ received from the micro controller 101 to the block-assignment encode amount setting unit 210 and the quantization width calculating unit 208.

The encode control unit 213 receives the "whole prediction end" or "pixel reduction end" notification one at a time from the encode amount predicting unit 207, receives the "whole prediction end" notification from the quantization table generating unit 209, and receives the "block read-out end" notification from the entropy-encoding unit 211.

Figure 18:
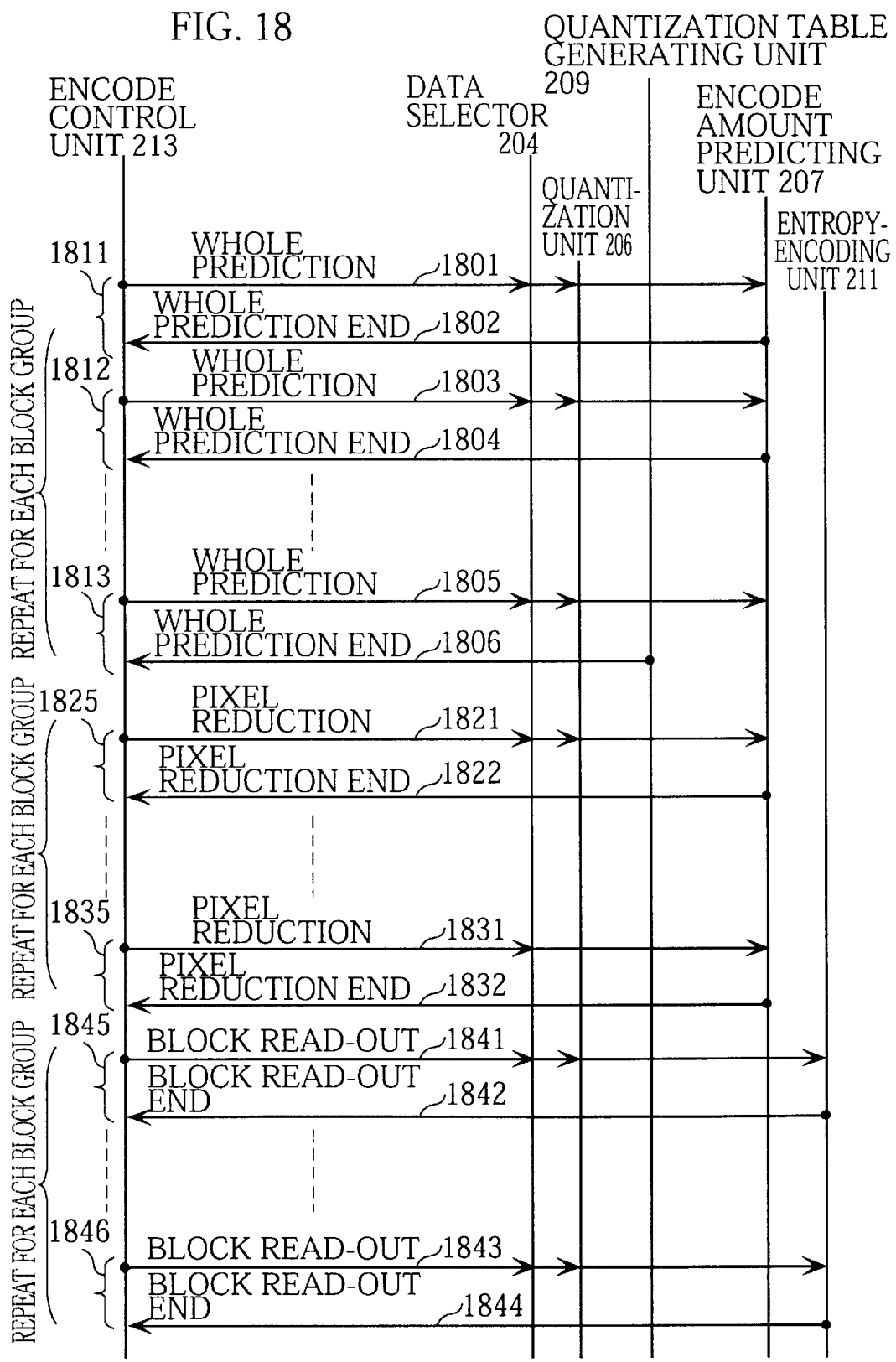
FIG. 18 shows instructions and notifications transferred between the encode control unit and other components.

The "whole prediction," "pixel reduction," and "block read-out" instructions and the "whole prediction end," "pixel reduction end," and "block read-out end" notifications are described with reference to FIG. 18 in terms of their issuance timing and relationships between them.

In the drawing, on receiving the "encoding start" instruction from the micro controller 101, the encode control unit 213 outputs the "whole prediction" instruction 1801 to the data selector 204, quantization unit 206, and encode amount predicting unit 207. After the block reduction process ends, the encode control unit 213 receives the "whole prediction end" notification 1802 from the encode amount predicting unit 207. The encode control unit 213 repeats this pair of actions 1811 for as many times as there are block groups. The encode control unit 213 receives the last "whole prediction end" notification 1806 in the current cycle from the quantization table generating unit 209.

In the next cycle, the encode control unit 213 outputs the "pixel reduction" instruction 1821 to the data selector 204, quantization unit 206, and encode amount predicting unit 207. After the pixel reduction process ends, the encode control unit 213 receives the "pixel reduction end" notification 1822 from the encode amount predicting unit 207. The encode control unit 213 repeats this pair of actions 1825 for as many times as there are block groups.

On receiving the last "pixel reduction end" notification 1832, the encode control unit 213 outputs the "block read-out" instruction 1841 to the data selector 204, quantization unit 206, and entropy-encoding unit 211. After the block read-out process ends, the encode control unit 213 receives the "block read-out end" notification 1842 from the entropy-encoding unit 211. The encode control unit 213 repeats this pair of actions 1845 for as many times as there are block groups.

On receiving the last "block read-out end" notification 1844 from the entropy-encoding unit 211, the encode control unit 213 outputs the "image encoding end" notification to the micro controller 101, judging that the entire image has been encoded.

3. Operation of Digital Still Camera 3.1 Summarized Encoding Process

Figure 2:
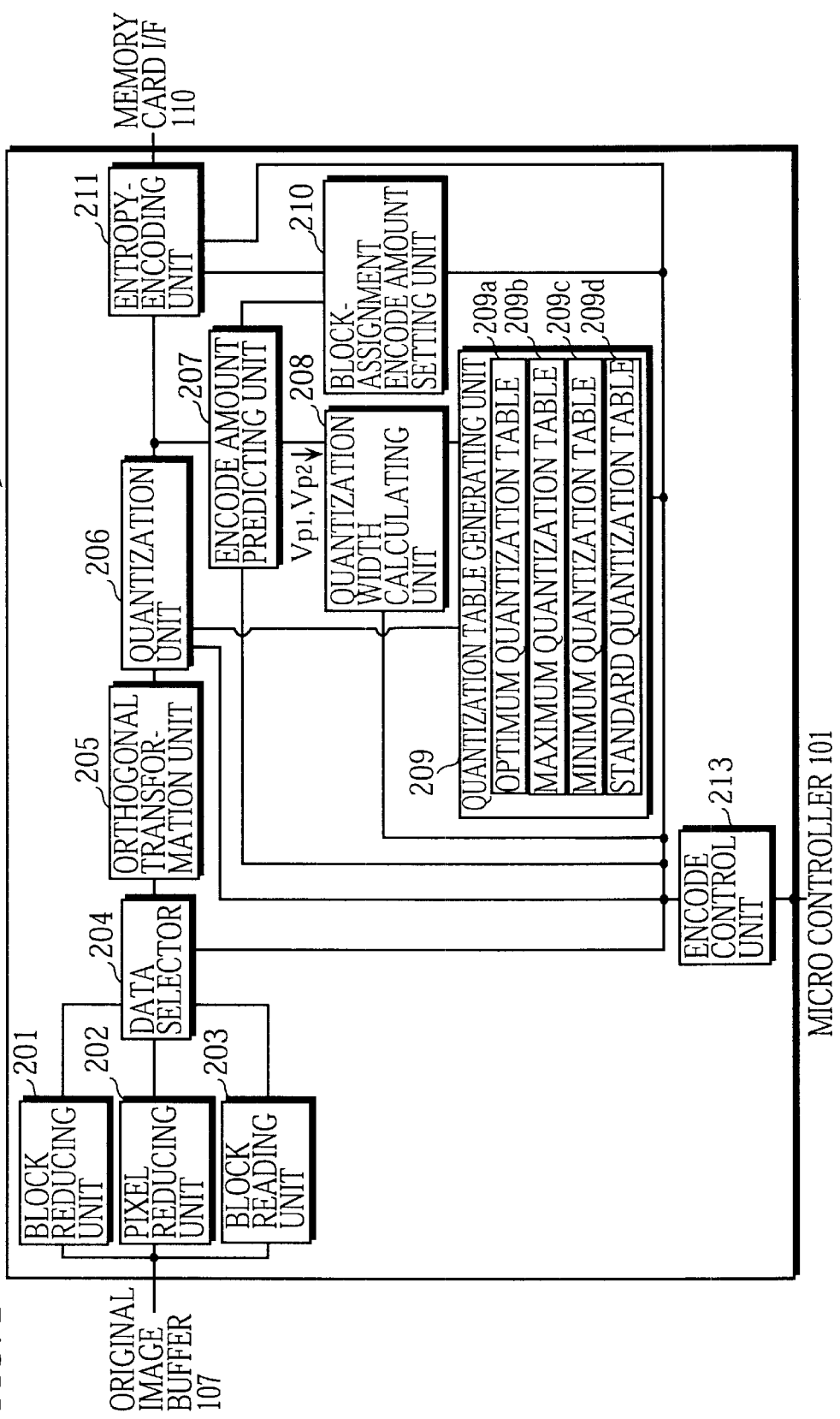
FIG. 2 is a block diagram showing the structure of the encoding circuit of the image encoding apparatus shown in FIG. 1.
Figure 3:
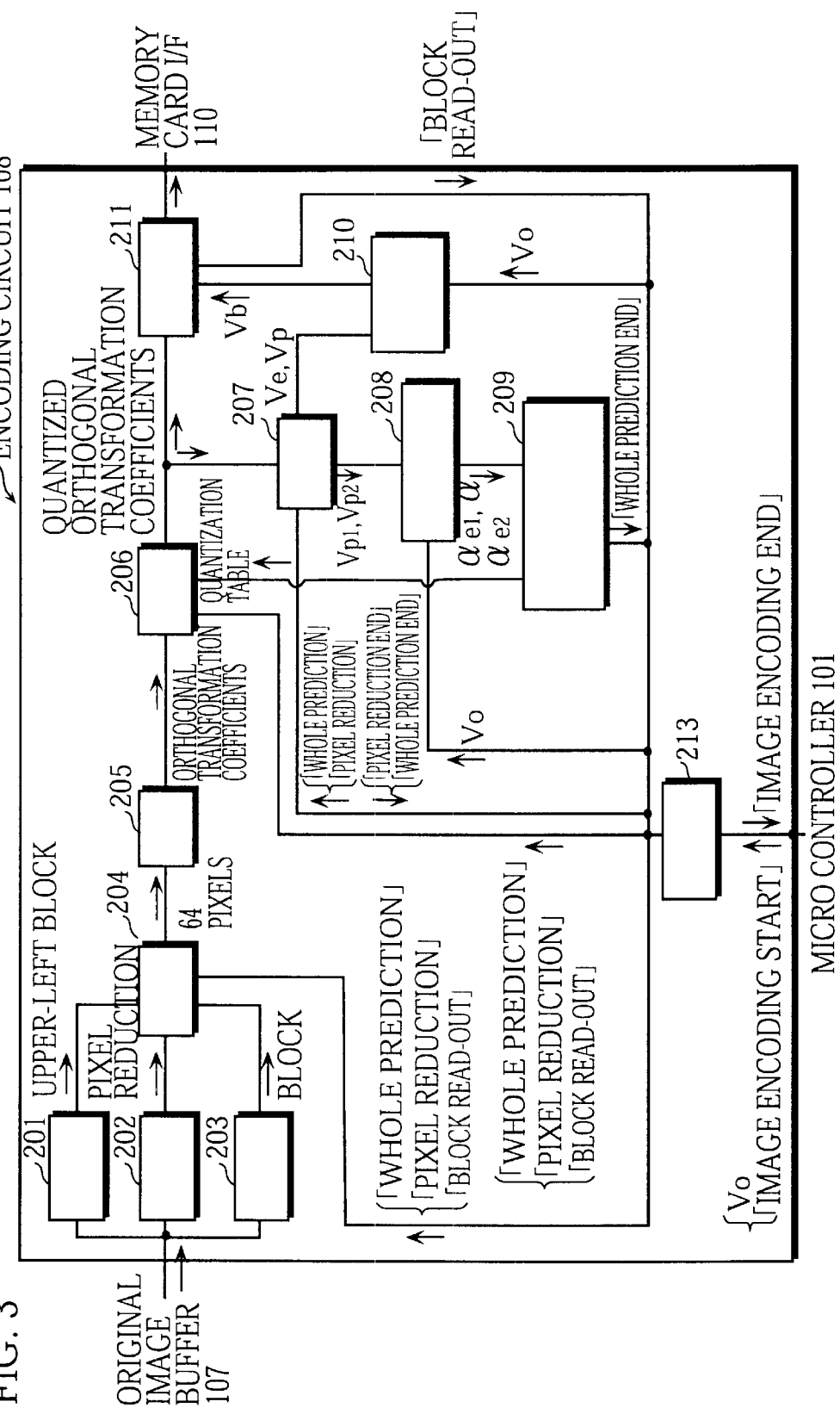
FIG. 3 shows information transferred between the components of the encoding circuit of the image encoding apparatus shown in FIG. 1.

An outline of the operation of the encoding circuit shown in FIG. 2 is described below with reference to FIGS. 19 and 20 which show an outline of the process.

The target encode amount $V_o$ is sent from the micro controller 101 to the quantization width calculating unit 208 via the encode control unit 213. The quantization width calculating unit 208 refers to the quantization width correspondence table 1300 (step S1702) and extracts a quantization width $\alpha_{e2}$ 1710 corresponding to an encode amount equivalent to or closest to the target encode amount $V_o$ detected from the ENCODE AMOUNT A column 1302 (step S1704). Similarly, the quantization width calculating unit 208 refers to the quantization width correspondence table 1300 (step S1701) and extracts a quantization width $\alpha_{e1}$ 1709 corresponding to an encode amount equivalent to or closest to the target encode amount $V_o$ detected from the ENCODE AMOUNT B column 1303 (step S1703).

The quantization table generating unit 209 creates the minimum quantization table 209c by multiplying the extracted quantization width $\alpha_{e1}$ 1709 by the 64 elements of the standard quantization table 209d held by the unit 209 (step S1724). Similarly, the quantization table generating unit 209 creates the maximum quantization table 209b by multiplying the extracted quantization width $\alpha_{e2}$ 1710 by the 64 elements of the standard quantization table 209d held by the unit 209 (step S1726).

The block reducing unit 201 performs the block reduction process in which the block reducing unit 201 reads out pixel values of each block selected from each block group, and outputs the read-out pixel values to the orthogonal transformation unit 205 via the data selector 204 (step S1732). The orthogonal transformation unit 205 performs an orthogonal transformation on the pixel values output from the data selector 204 to obtain orthogonal transformation coefficients, and outputs the obtained orthogonal transformation coefficients to the quantization unit 206 (step S1733). The quantization unit 206 quantizes the orthogonal transformation coefficients output from the orthogonal transformation unit 205 using the minimum quantization table 209c and the maximum quantization table 209b to obtain two kinds of quantized orthogonal transformation coefficients (steps S1734 and S1735). The encode amount predicting unit 207 calculates the predicted encode amount of each block using Formula 4, the quantization width $\alpha_{e2}$ 1709, and the quantized orthogonal transformation coefficients obtained in the step S1734, then calculates the cumulative minimum predicted encode amounts $V_{p1}$ for the entire image (step S1736). Similarly, the encode amount predicting unit 207 calculates the predicted encode amount of each block using Formula 4, the quantization width $\alpha_{e2}$ 1710, and the quantized orthogonal transformation coefficients obtained in the step S1734, then calculates the cumulative maximum predicted encode amounts $V_{p2}$ for the entire image (step S1737).

The quantization width calculating unit 208 calculates the predicted encode amount $V_q$ of the target image using Formula 11 while changing the quantization width in the range of $\alpha_{e1}$ 1709 to $\alpha_{e2}$ 1710. The quantization width calculating unit 208 then obtains a quantization width $\alpha_e$ 1742 with which the calculated predicted encode amount $V_q$ is closest to the target encode amount $V_o$ (step S1741).

The quantization table generating unit 209 creates the optimum quantization table 209a by multiplying the quantization widths $\alpha_e$ 1742 received from the quantization width calculating unit 208 by the 64 elements of the standard quantization table 209d held by the unit 209 (step S1744).

The pixel reducing unit 202 performs a pixel reduction process to select pixels on a one-out-of-four basis for each block group of the target image 1731 stored in the original image buffer 107. The pixel reducing unit 202 outputs the selected pixels to the orthogonal transformation unit 205 via the data selector 204 (step S1751). The orthogonal transformation unit 205 performs an orthogonal transformation on the 64 pixel values output from the data selector 204 to obtain orthogonal transformation coefficients, and outputs the obtained orthogonal transformation coefficients to the quantization unit 206 (step S1752). The quantization unit 206 obtains quantized orthogonal transformation coefficients by quantizing, with the optimum quantization table 209a, the orthogonal transformation coefficients received from the orthogonal transformation unit 205 (step S1753). The encode amount predicting unit 207 calculates, using Formula 4, a predicted encode amount $V_q$ to be generated with the quantization widths $\alpha_e$ 1742 (step S1754). The block-assignment encode amount setting unit 210 calculates, using Formula 12, the block-assignment encode amount $V_b$ using the calculated predicted encode amount $V_q$ (step S1755).

The block reading unit 203 reads out pixels included in each block group from the target image 1731 stored in the original image buffer 107, and outputs the read-out pixels to the orthogonal transformation unit 205 via the data selector 204 (step S1761). The orthogonal transformation unit 205 performs an orthogonal transformation on the pixels output from the data selector 204 to obtain orthogonal transformation coefficients, and outputs the obtained orthogonal transformation coefficients to the quantization unit 206 (step S1762). The quantization unit 206 obtains quantized orthogonal transformation coefficients by quantizing, with the optimum quantization table 209a, the orthogonal transformation coefficients received from the orthogonal transformation unit 205, and outputs the obtained quantized orthogonal transformation coefficients to the entropy-encoding unit 211 (step S1763). The entropy-encoding unit 211 entropy-encodes the quantized orthogonal transformation coefficients received from the quantization unit 206 to obtain an encoded image 1765 (step S1764). In doing so, the entropy-encoding unit 211 stops encoding of a block before the cumulative encode amounts exceeds the block-assignment encode amount $V_b$ so that the high-frequency components of the block is not encoded.

3.2 Summarized Encoding Operation

An outline of the operation of the encoding circuit shown in FIG. 2 is described below with reference to the flowchart shown in FIG. 21.

The quantization width calculating unit 208 obtains quantization widths $\alpha_{e1}$ and $\alpha_{e2}$ corresponding to the target encode amount $V_o$. The quantization table generating unit 209 creates the minimum quantization table 209c and maximum quantization table 209b using the obtained quantization widths $\alpha_{e1}$ and $\alpha_{e2}$ (step S301). The block reducing unit 201 performs a block reduction process to read out pixel values. The orthogonal transformation unit 205 performs an orthogonal transformation on the read pixel values to obtain orthogonal transformation coefficients. The quantization unit 206 quantizes the orthogonal transformation coefficients using the minimum quantization table 209c and the maximum quantization table 209b to obtain two kinds of quantized orthogonal transformation coefficients. The encode amount predicting unit 207 calculates the predicted encode amount of each block using Formula 4, the quantization widths $\alpha_{e1}$ and $\alpha_{e2}$, and the two kinds of quantized orthogonal transformation coefficients, then calculates the cumulative minimum and maximum predicted encode amounts $V_{p1}$ and $V_{p2}$ for the entire image (step S302). The quantization width calculating unit 208 calculates using Formula 11 the quantization width $\alpha_e$ with which the predicted encode amount $V_q$ is closest to the target encode amount V. The quantization table generating unit 209 creates the optimum quantization table 209a by multiplying the quantization widths $\alpha_e$ by elements of the standard quantization table 209d (step S303). The pixel reducing unit 202 performs a pixel reduction process. The orthogonal transformation unit 205 performs an orthogonal transformation on the selected pixel values to obtain orthogonal transformation coefficients. The quantization unit 206 obtains quantized orthogonal transformation coefficients by quantizing, with the optimum quantization table 209a, the orthogonal transformation coefficients. The encode amount predicting unit 207 calculates, using Formula 4 and the obtained quantized orthogonal transformation coefficients, a predicted encode amount $V_q$ to be generated with the quantization widths $\alpha_e$ (step S304). The block-assignment encode amount setting unit 210 calculates, using Formula 12, the block-assignment encode amount $V_b$ using the calculated predicted encode amount $V_q$. The block reading unit 203 reads out pixels included in each block group. The orthogonal transformation unit 205 performs an orthogonal transformation on the pixels to obtain orthogonal transformation coefficients. The quantization unit 206 obtains quantized orthogonal transformation coefficients by quantizing, with the optimum quantization table 209a, the orthogonal transformation coefficients. The entropy-encoding unit 211 entropy-encodes the quantized orthogonal transformation coefficients (step s305). In doing so, the entropy-encoding unit 211 stops encoding of a block before the cumulative encode amounts exceeds the block-assignment encode amount $V_b$ so that the high-frequency components of the block is not encoded.

3.3 Creating Quantization Tables for Encode Amount Prediction

Figure 21:
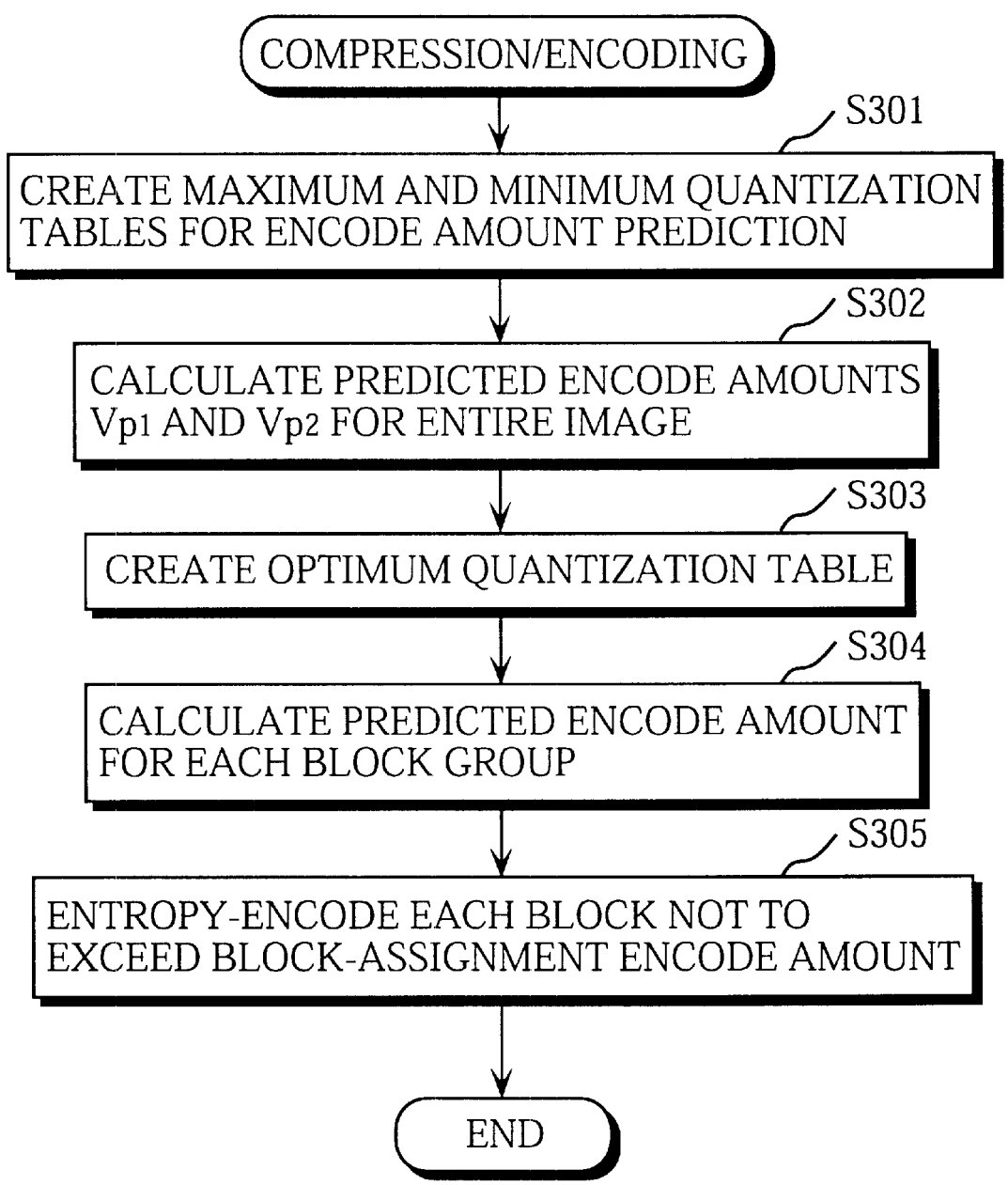
FIG. 21 is a flowchart of the outlined process performed by the image encoding apparatus shown in FIG. 1.

The operation of creating the minimum and maximum quantization tables referred to in step S301 of FIG. 21 is described in detail with reference to the flowchart shown in FIG. 22.

The quantization width calculating unit 208 receives the target encode amount $V_o$ from the micro controller 101 via the encode control unit 213, and refers to the quantization width correspondence table 1300 to extract a quantization width $\alpha_{e1}$ corresponding to an encode amount equivalent to or closest to the target encode amount $V_o$ detected from the ENCODE AMOUNT B column 1303 (step S601). The quantization table generating unit 209 creates the minimum quantization table 209c by multiplying the extracted quantization width $\alpha_{e1}$ by the 64 elements of the standard quantization table 209d held by the unit 209 and by rounding up the results to integers (step S602). Also, the quantization width calculating unit 208 refers to the quantization width correspondence table 1300 to extract a quantization width $\alpha_{e2}$ corresponding to an encode amount equivalent to or closest to the target encode amount $V_o$ detected from the ENCODE AMOUNT A column 1302 (step S603). The quantization table generating unit 209 creates the maximum quantization table 209b by multiplying the extracted quantization width $\alpha_{e2}$ by the 64 elements of the standard quantization table 209d held by the unit 209 and by rounding up the results to integers (step S604).

3.4 Predicting Encode Amounts for Entire Image

The operation of predicting encode amounts for the entire image referred to in step S302 of FIG. 21 is described in detail with reference to the flowchart shown in FIG. 23.

The encode control unit 213 initializes a loop counter which is used to count the number of repetitions of an operation of encode amount prediction so that the operation is repeated until the encode amounts for the entire image are obtained (step S801). The block reducing unit 201 performs the block reduction process in which the block reducing unit 201 selects one block from a block group corresponding to the loop counter value and reads out pixel values of the selected block (step S802). The orthogonal transformation unit 205 performs an orthogonal transformation on the pixel values of one block to obtain orthogonal transformation coefficients of the block (step S803). The quantization unit 206 obtains quantized orthogonal transformation coefficients by a quantization in which the unit 206 divides the orthogonal transformation coefficients by corresponding elements of the minimum quantization table 209c (step S804). The obtained quantized orthogonal transformation coefficients of one block are classified into the DC coefficient (coefficient #0) and the AC coefficients (coefficients #1 to #63). The encode amount predicting unit 207 performs different calculations for the DC coefficients and the AC coefficients. The encode amount predicting unit 207 calculates a logarithm of an absolute value of a difference between the DC coefficients of the current block and the preceding block, the base of the logarithm being "2" (step S805). The encode amount predicting unit 207 accumulates logarithms of the absolute values of the AC coefficients that each have a value other than "0" (such AC coefficients are also referred to as non-zero coefficients) for one block, the base of the logarithm being "2." The encode amount predicting unit 207 also calculates the number of non-zero coefficients in the block (step S806). In this way, the encode amount predicting unit 207 calculates the predicted encode amount of each block group, then calculates the cumulative minimum predicted encode amounts $V_{p1}$ for the entire image (step S807). The quantization unit 206 obtains quantized orthogonal transformation coefficients by a quantization in which the unit 206 divides the orthogonal transformation coefficients by corresponding elements of the maximum quantization table 209b (step S808). The encode amount predicting unit 207 calculates a logarithm of an absolute value of a difference between the DC coefficients of the current block and the preceding block, the base of the logarithm being "2" (step S809). The encode amount predicting unit 207 accumulates logarithms of the AC coefficients having a value other than "0" (non-zero coefficients) for one block, the base of the logarithm being "2." The encode amount predicting unit 207 also calculates the number of non-zero coefficients in the block (step S810). In this way, the encode amount predicting unit 207 calculates the predicted encode amount of each block group, then calculates the cumulative maximum predicted encode amounts $V_{p2}$ for the entire image (step S811). The encode control unit 213 updates the loop counter (step S812). The encode control unit 213 checks the loop counter value to judge whether the process for the entire image has completed (step S813). When it is judged so, the encode amount prediction process ends. Otherwise, control returns to step S802 to continue the encode amount prediction process.

3.5 Predictina Encode Amounts for Each Block Group

The operation of predicting encode amounts for each block group referred to in step S304 of FIG. 21 is described in detail with reference to the flowchart shown in FIG. 24.

The encode control unit 213 initializes a loop counter which is used to count the number of repetitions of an operation of encode amount prediction so that the operation is repeated until the encode amounts for the entire image are obtained (step S1001). The pixel reducing unit 202 performs a pixel reduction process to select pixels on a one-out-of-four basis for each block group corresponding to the loop counter value to obtain 64 pixel values corresponding to one block (step S1002). The orthogonal transformation unit 205 performs an orthogonal transformation on the 64 pixel values to obtain orthogonal transformation coefficients of one block (step S1003). The quantization unit 206 obtains quantized orthogonal transformation coefficients by a quantization in which the unit 206 divides the orthogonal transformation coefficients by corresponding elements of the optimum quantization table 209a (step S1004). The encode amount predicting unit 207 calculates a logarithm of an absolute value of a difference between the DC coefficient of the current group of selected coefficients and that of the preceding group, the base of the logarithm being "2" (step S1005). The encode amount predicting unit 207 accumulates logarithms of the absolute values of the AC coefficients that each have a value other than "0" (non-zero coefficients), the base of the logarithm being "2." The encode amount predicting unit 207 also calculates the number of non-zero coefficients in the current group of selected coefficients (step S1006). The encode amount predicting unit 207 calculates the predicted encode amount of the current block group (step S1007). The encode control unit 213 updates the loop counter (step S1008). The encode control unit 213 checks the loop counter value to judge whether the process for the entire image has completed (step S1009). When it is judged so, the encode amount prediction process ends. Otherwise, control returns to step S1002 to continue the encode amount prediction process.

3.6 Encoding

The operation of encoding referred to in step S305 of FIG. 21 is described in detail with reference to the flowchart shown in FIG. 25.

The encode control unit 213 initializes a loop counter which is used to count the number of repetitions of an operation of encode amount prediction so that the operation is repeated until the encode amounts for the entire image are obtained (step S1101). The block reading unit 203 reads out 64 pixel values of a block corresponding to the loop counter value (step S1102). The orthogonal transformation unit 205 performs an orthogonal transformation on the 64 pixel values to obtain orthogonal transformation coefficients of one block (step S1103). The quantization unit 206 obtains quantized orthogonal transformation coefficients by quantizing the orthogonal transformation coefficients (step S1104). The block-assignment encode amount setting unit 210 calculates an encode amount to be assigned to the current block using Formula 12 by substituting the target encode amount $V_o$ and the predicted encode amount of the block group including the current block into the Formula 12 (step S1105). The obtained quantized orthogonal transformation coefficients are entropy-encoded (step S1106). The encode control unit 213 updates the loop counter (step S1107). The encode control unit 213 checks the loop counter value to judge whether the process for the entire image has completed (step S1108). When it is judged so, the encode amount prediction process ends. Otherwise, control returns to step S1102 to continue the encode amount prediction process.

3.7 Entropy-Encoding

Figure 25:
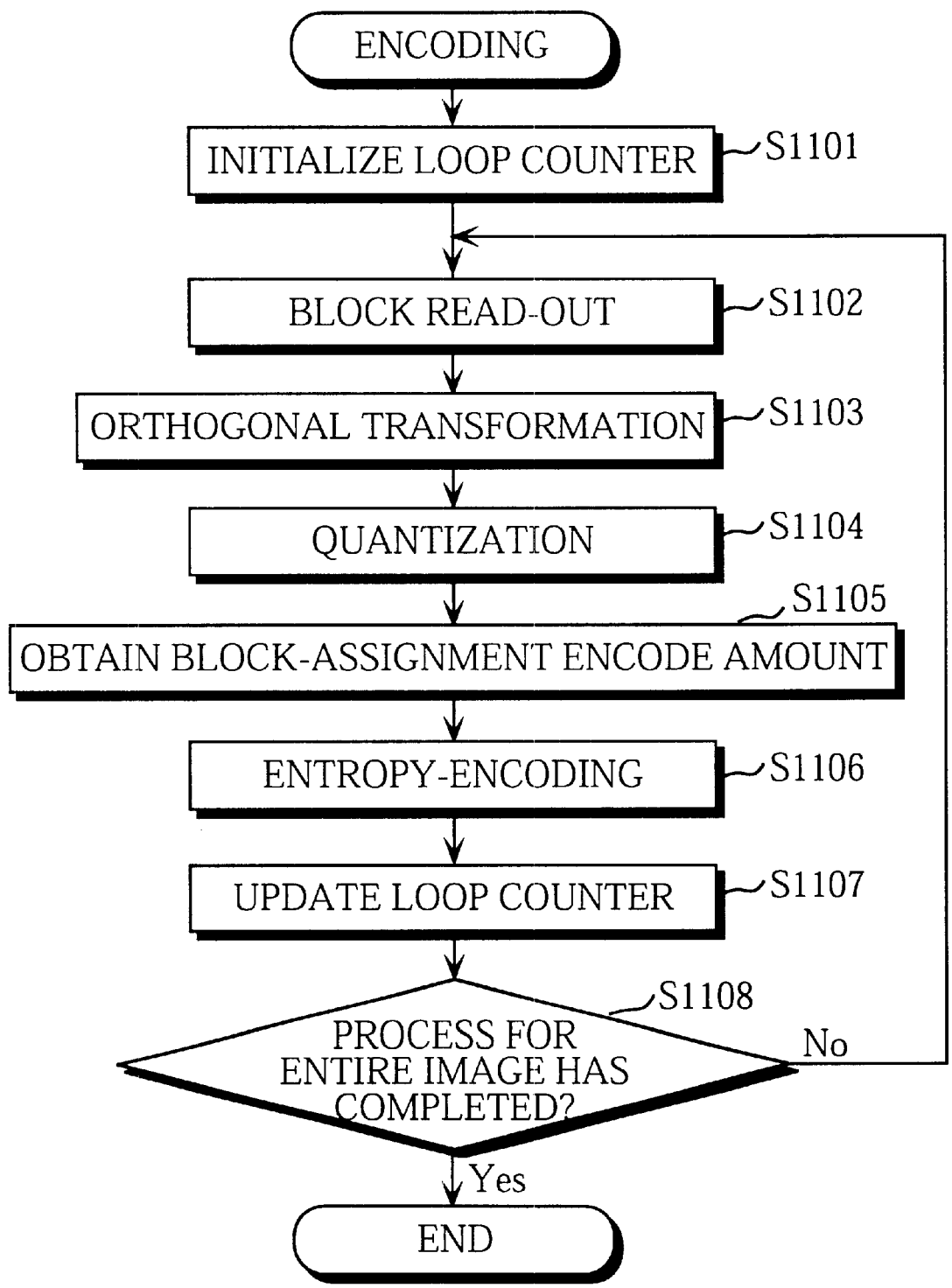
FIG. 25 is a flowchart of calculating the block-assignment encode amount for each block group performed by the image encoding apparatus shown in FIG. 1.

The operation of entropy-encoding referred to in step S1106 of FIG. 25 is described in detail with reference to the flowchart shown in FIG. 26.

The entropy-encoding unit 211 initializes a counter for output encode amount to "0" (step S1201). The entropy-encoding unit 211 subtracts the length of EOB from the encode amount assigned to the current block which is output from the block-assignment encode amount setting unit 210 (step S1202). Here, the EOB is a mark attached to each block to indicate the end of the block. The entropy-encoding unit 211 calculates a difference between the DC coefficients of the current block and the preceding block having been entropy-encoded (step S1203). The entropy-encoding unit 211 then encodes the difference between the DC coefficients and outputs the encoded difference to the memory card I/F 110 (step S1204). The entropy-encoding unit 211 adds the length of the output difference value to the output encode amount counter (step S1205). The entropy-encoding unit 211 initializes to "1" a loop counter for counting the number of processes performed on the 63 AC coefficients, and initializes to "0" a counter for counting the number of zero coefficient runs (step S1206). The entropy-encoding unit 211 obtains the order of the zigzag scan of the AC coefficients (step S1207). The entropy-encoding unit 211 takes one AC coefficient according to the order and judges whether the AC coefficient is "0" (step S1208). When it is 0, the entropy-encoding unit 211 adds "1" to the zero coefficient run counter, then proceeds to step S1215 (step S1209). When the AC coefficient is other than 0, the entropy-encoding unit 211 calculates an expected length of the encoded AC coefficient and the encoded value of the zero coefficient run counter, then adds the calculated expected length to the output encode amount counter (step S1210). The entropy-encoding unit 211 judges whether the block-assignment encode amount is equal to or greater than the value in the output encode amount counter (step S1211). When judging that the block-assignment encode amount is smaller than the value in the output encode amount counter, the entropy-encoding unit 211 stops the entropy-encoding and goes to step S1217. When judging in step S1211 that the block-assignment encode amount is equal to or greater than the value in the output encode amount counter, the entropy-encoding unit 211 encodes the AC coefficient and the value of the zero coefficient run counter, and outputs the encoded values to the memory card I/F 110 (step S1212), then initializes the zero coefficient run counter to "0" (step S1214). The entropy-encoding unit 211 updates the loop counter (step S1215). The entropy-encoding unit 211 checks the loop counter value to judge whether the process of entropy-encoding AC coefficients for one block has completed (step S1216). When it is judged as negative, control returns to step S1207 to continue the AC coefficients entropy-encoding process. Otherwise, the entropy-encoding unit 211 outputs the EOB to the memory card I/F 110 (step S1217) and ends the entropy-encoding process.

4. Conclusion

As described above, in the present embodiment, the encode amount is predicted from the image after the block reduction, and the optimum quantization table corresponding to the predicted encode amount is created. The encode amount for each block group is then predicted from the image after the pixel reduction. After this, each block is entropy-encoded. In doing so, when the generated encode amount exceeds the block-assignment encode amount, the entropy-encoding is stopped. By stopping the entropy-encoding of a block halfway, high-frequency components of the block are not encoded. With this arrangement, the image is encoded with an encode amount close to a target encode amount.

Embodiment 2

Another embodiment of the present invention, a digital still camera 200 which is an image encoding apparatus. is described in terms of its structure and operations, centered on the difference from the digital still camera 100 described in "Embodiment 1."

1. Structure of Digital Still Camera

The structure of the digital still camera 200 as another embodiment of the present invention is described with reference to the block diagram shown in FIG. 27.

Figure 27:
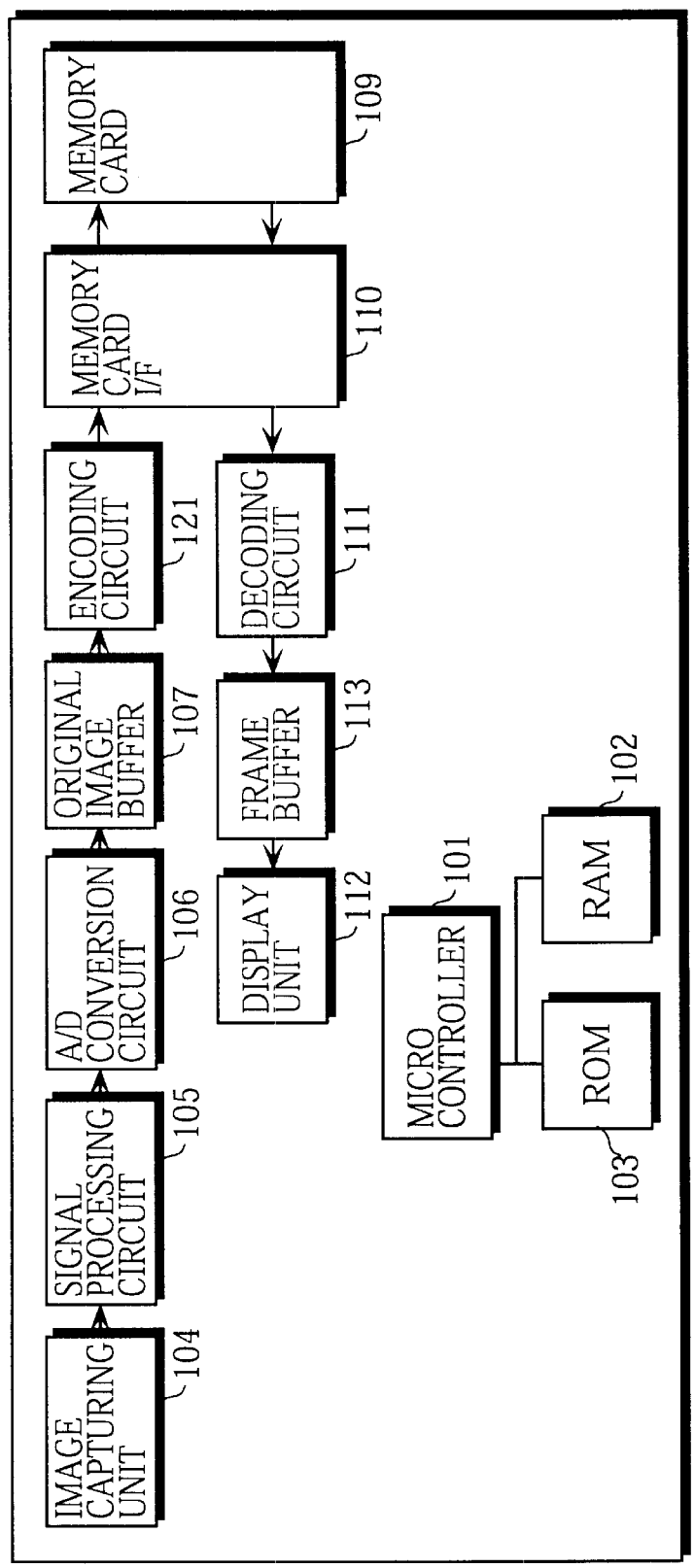
FIG. 27 is a block diagram showing the structure of the image encoding apparatus as another embodiment of the present invention.

As shown in FIG. 27, the digital still camera 200 is composed of a micro controller 101, a RAM 102, a ROM 103, an image capturing unit 104, a signal processing circuit 105, an A/D conversion circuit 106, an original image buffer 107, an encoding circuit 121 for encoding/compressing images, a memory card 109, a memory card I/F 110, a decoding circuit 111, a display unit 112, and a frame buffer 113.

Reference numerals similarly numbered as those in FIG. 1 designate like components, and a recounting of their function will be omitted from the description of this embodiment. The only difference is the encoding circuit 121 replaced with the encoding circuit 108. Accordingly, only the encoding circuit 121 is described below.

2. Structure of Encoding Circuit 121

The structure of the encoding circuit 121 of the digital still camera 200 shown in FIG. 27 is described with reference to a block diagram shown in FIG. 28. FIG. 29 shows information transferred between the components of the encoding circuit 121.

The encoding circuit 121 is composed of a pixel reducing unit 202, a block reading unit 203, a data selector 221, an orthogonal transformation unit 205, a quantization unit 206, an encode amount predicting unit 207, a quantization width calculating unit 208, a quantization table generating unit 209, a block-assignment encode amount setting unit 210, an entropy-encoding unit 211, and an encode control unit 213.

Reference numerals similarly numbered as those in FIG. 2 designate like components, and a recounting of their function will be omitted from the description of this embodiment. The only difference is the data selector 221 replaced with the data selector 204. Accordingly, only the data selector 221 is described below.

2.1 Data Selector 221

On receiving the "whole prediction" instruction, the data selector 221 selects the 64 pixel values output from the pixel reducing unit 202.

The other operations and functions are similar to those of the data selector 204, and a recounting of them will be omitted from the description of this embodiment.

3. Operation of Digital Still Camera

3.1 Summarized Encoding Process

Figure 28:
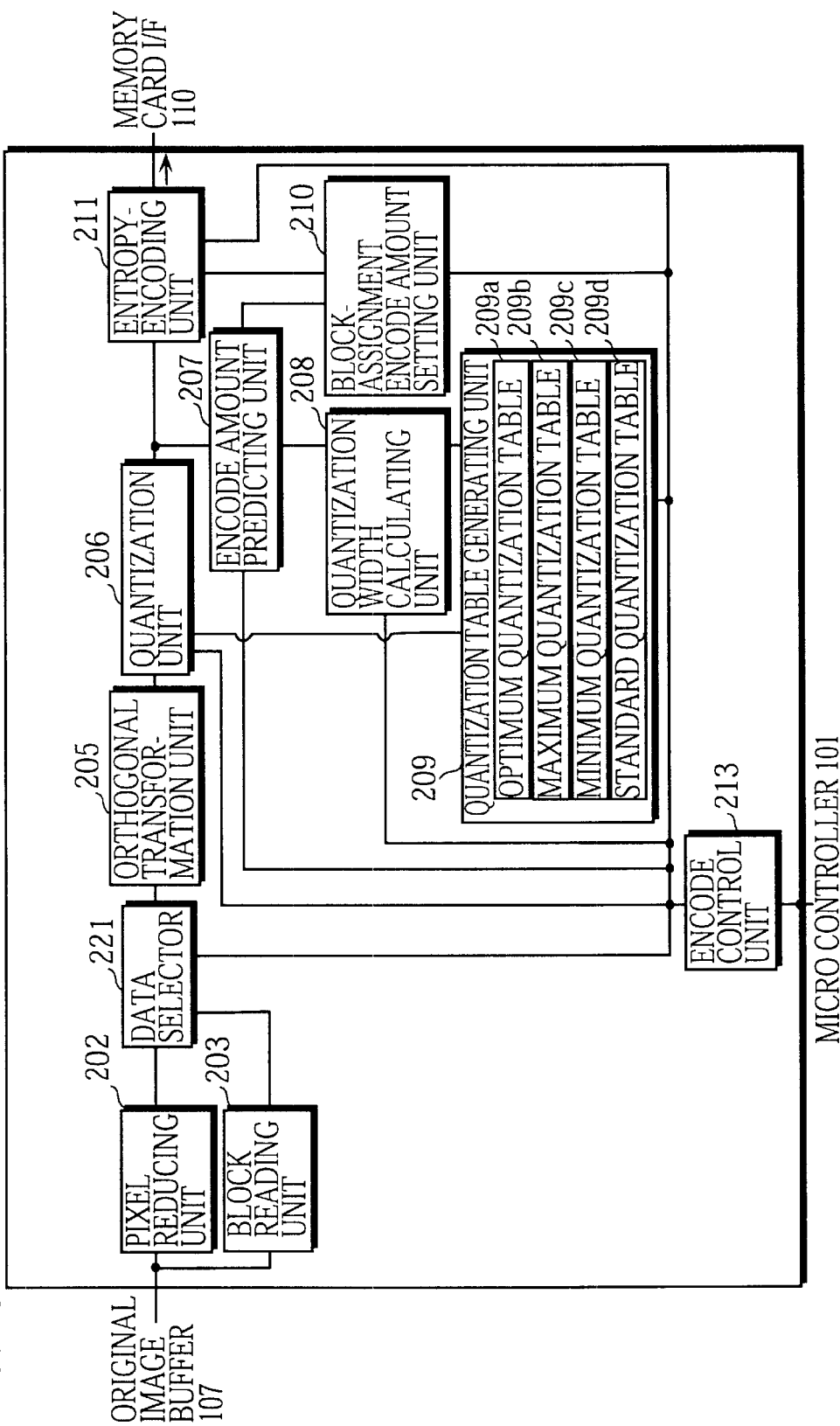
FIG. 28 is a block diagram showing the structure of the encoding circuit of the image encoding apparatus shown in FIG. 27.
Figure 29:
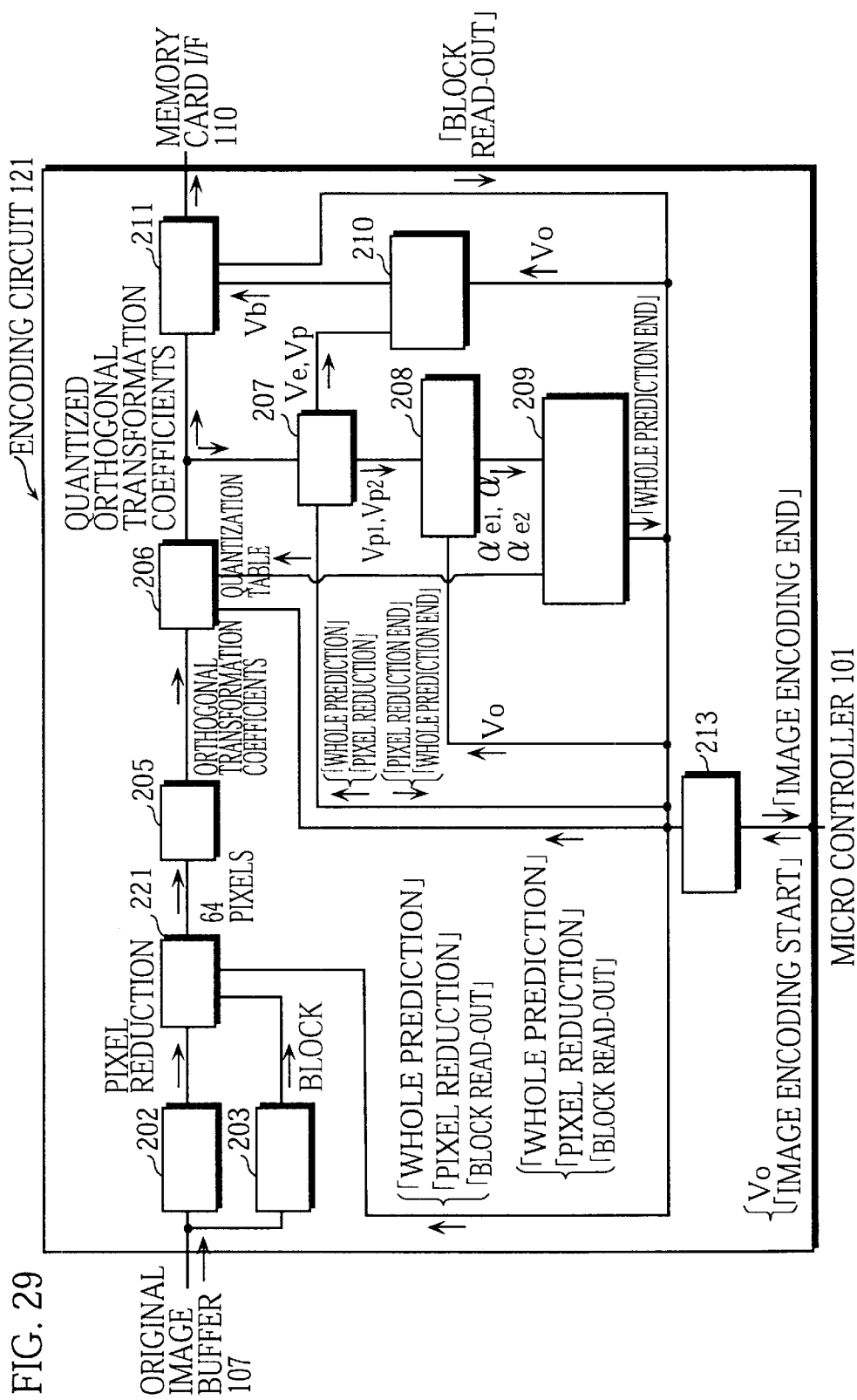
FIG. 29 shows information transferred between the components of the encoding circuit of the image encoding apparatus shown in FIG. 27.
Figure 30:
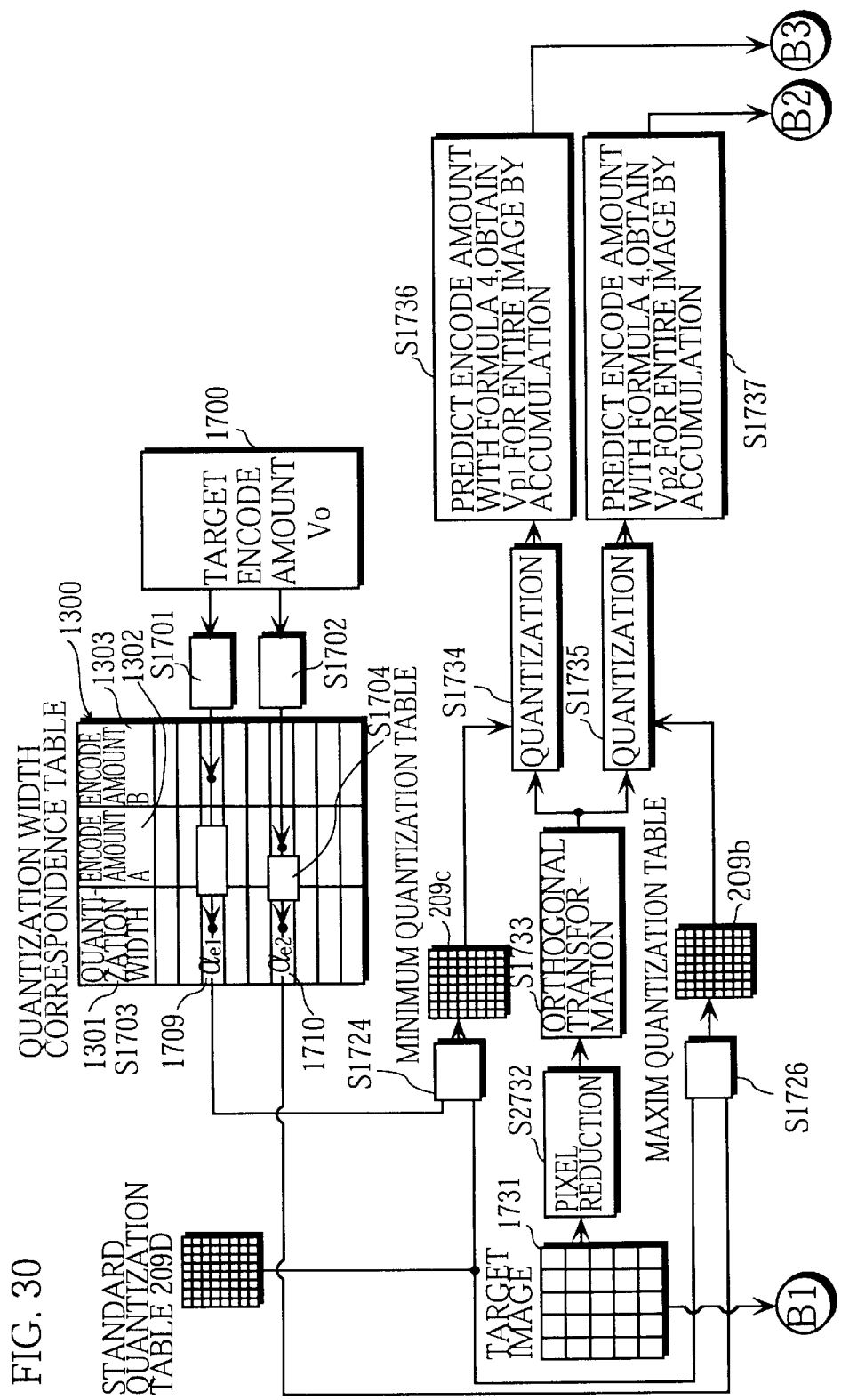
FIG. 30 shows an outline of the process performed by the image encoding apparatus shown in FIG. 27.
Figure 31:
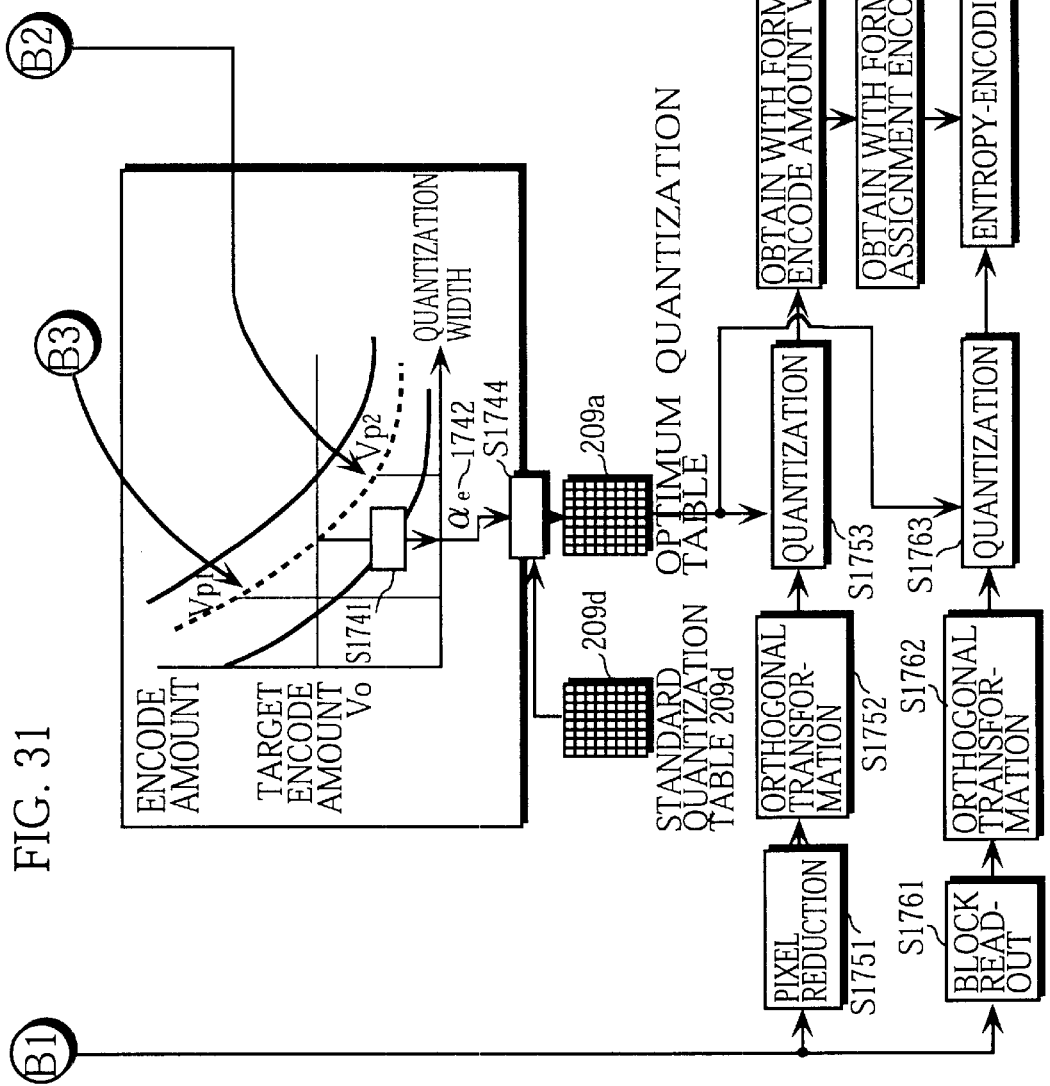
FIG. 31 shows an outline of the process performed by the image encoding apparatus shown in FIG. 27, continued from FIG. 30.

An outline of the operation of the encoding circuit shown in FIG. 28 is described below with reference to FIGS. 30 and 31 which show an outline of the process.

Figure 19:
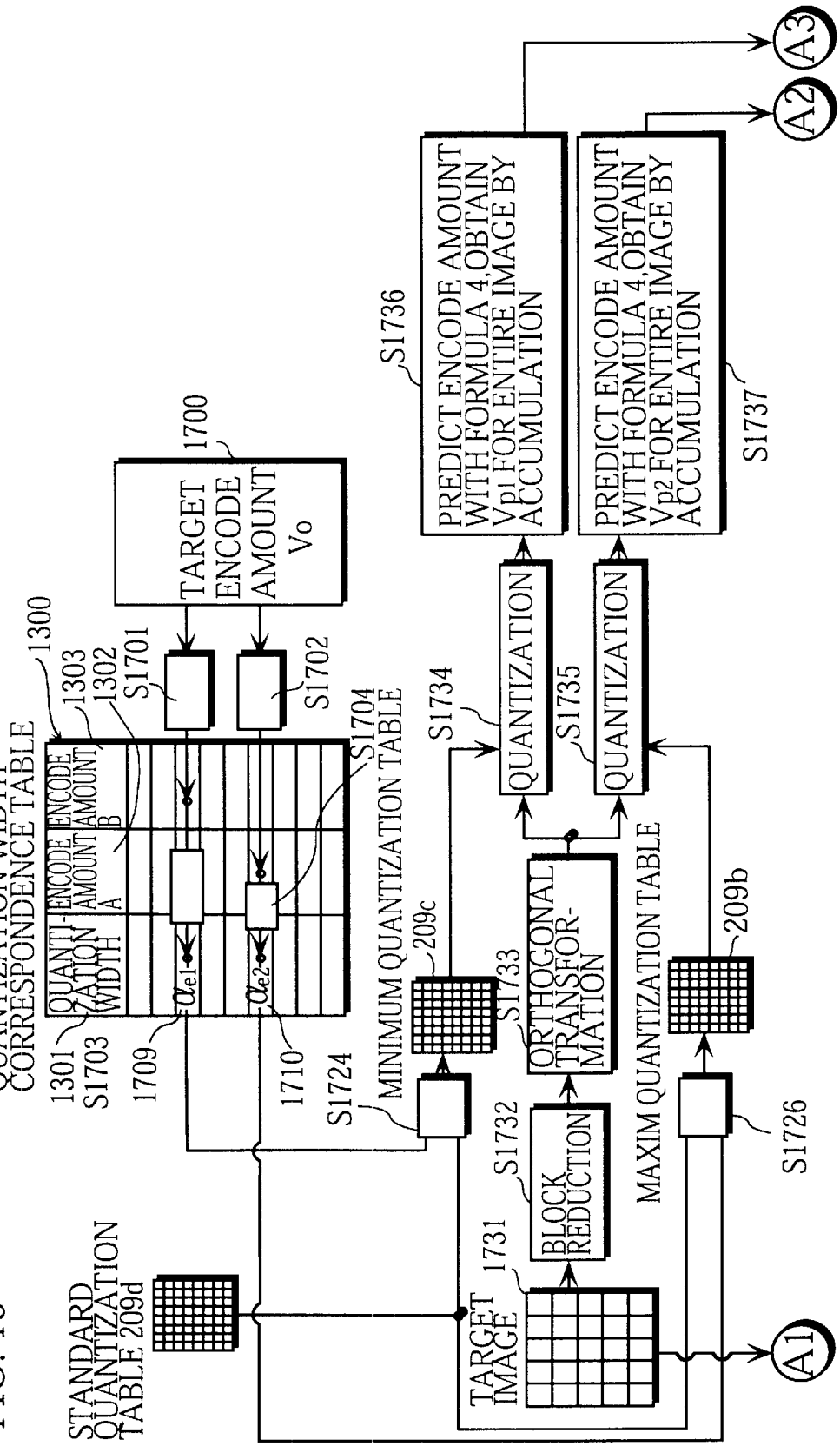
FIG. 19 shows an outline of the process performed by the image encoding apparatus shown in FIG. 1.
Figure 20:
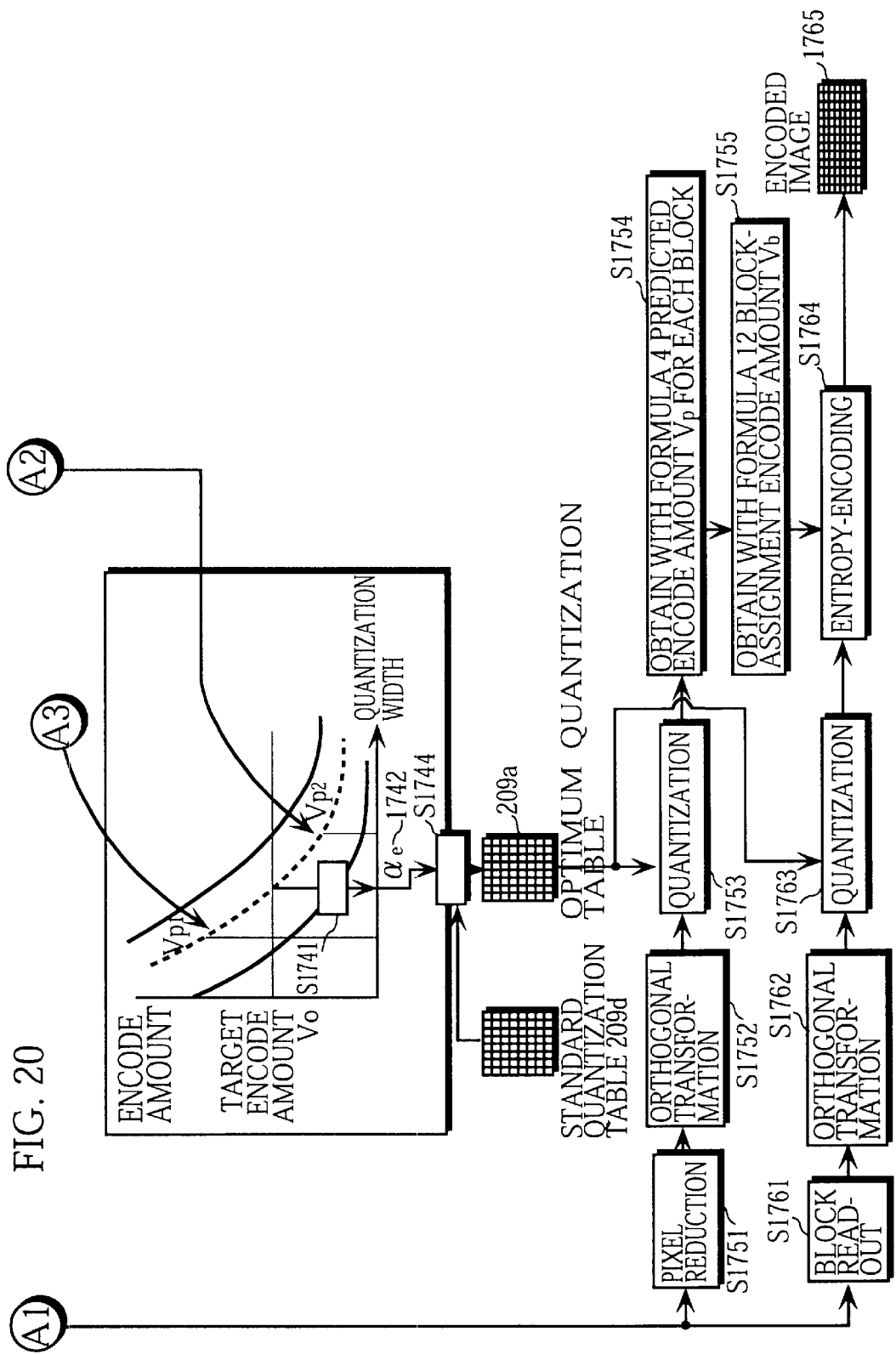
FIG. 20 shows an outline of the process performed by the image encoding apparatus shown in FIG. 1, continued from FIG. 19.

Reference numerals similarly numbered as those in FIGS. 19 and 20 designate like elements, and a recounting of their function will be omitted from the description of this embodiment. The only difference is the element 2732 replaced with the element 1732. Accordingly, only the element 2732 is described below.

The pixel reducing unit 202 performs a pixel reduction process to select pixels on a one-out-of-four basis for each block group of the target image 1731 stored in the original image buffer 107. The pixel reducing unit 202 outputs the selected pixels to the orthogonal transformation unit 205 via the data selector 221 (step S2732).

3.2 Summarized Encoding Operation

An outline of the operation of the encoding circuit shown in FIG. 28 is described below with reference to the flowchart shown in FIG. 32.

Steps similarly numbered as those in FIG. 21 designate like steps, and a recounting of their function will be omitted from the description of this embodiment. The only difference is the step S2802 replaced with the step S302. Accordingly, only the step S2802 is described below.

The pixel reducing unit 202 performs a pixel reduction process to read out pixel values. The orthogonal transformation unit 205 performs an orthogonal transformation on the read pixel values to obtain orthogonal transformation coefficients. The quantization unit 206 quantizes the orthogonal transformation coefficients using the minimum quantization table 209c and the maximum quantization table 209b to obtain two kinds of quantized orthogonal transformation coefficients. The encode amount predicting unit 207 calculates the predicted encode amount of each block using Formula 4, the quantization widths $\alpha_{e1}$ and $\alpha_{e2}$, and the two kinds of quantized orthogonal transformation coefficients, then calculates the cumulative minimum predicted encode amounts $V_{p1}$ and $V_{p2}$ for the entire image (step S2802).

3.3 Creating Quantization Tables for Encode Amount Prediction

Figure 22:
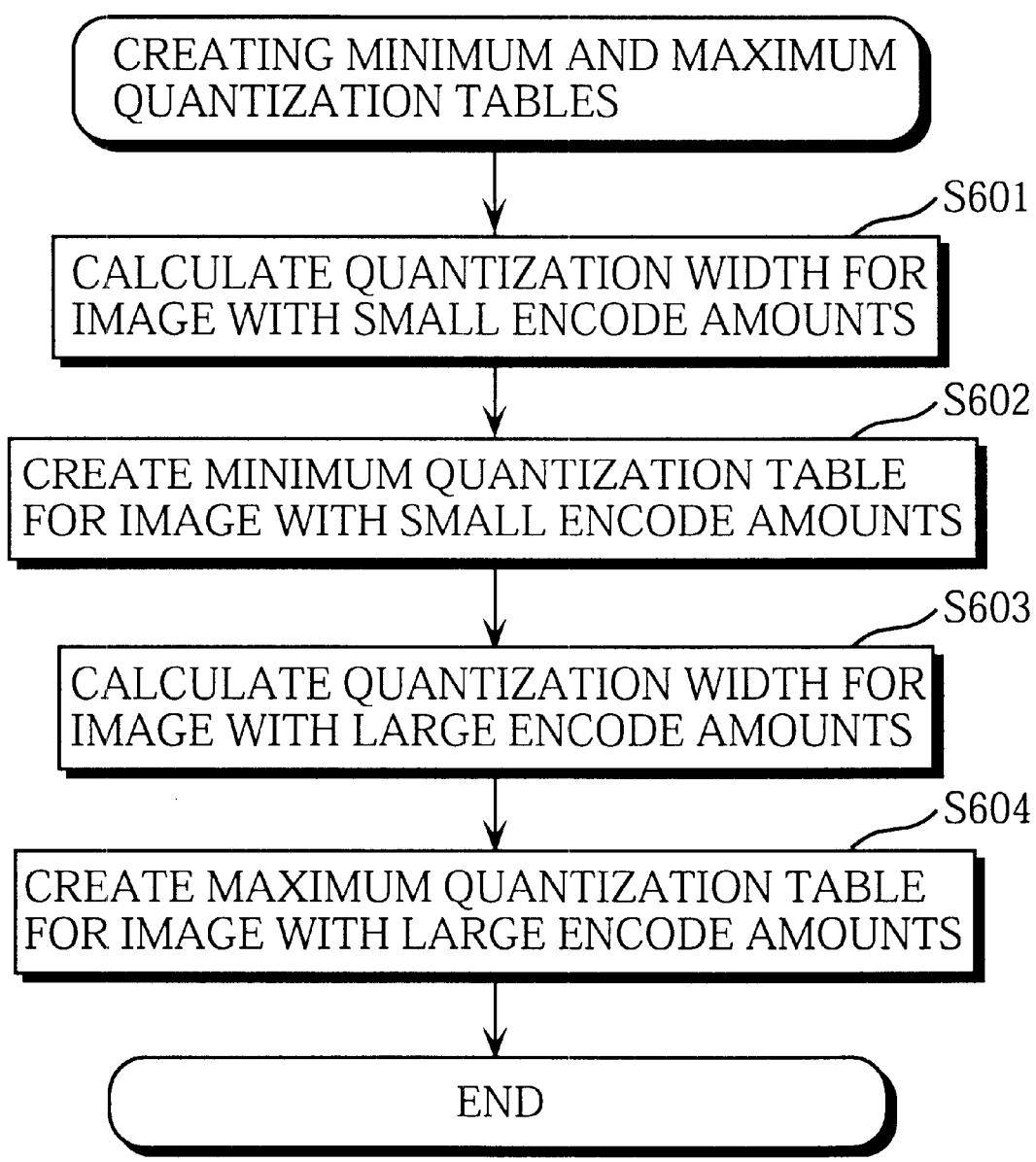
FIG. 22 is a flowchart of creating the minimum and maximum quantization tables performed by the image encoding apparatus shown in FIG. 1.

The operation of creating the minimum and maximum quantization tables in the present embodiment is the same as that described in the flowchart shown in FIG. 22, and a recounting will be omitted.

3.4 Predicting Encode Amounts for Entire Image

Figure 32:
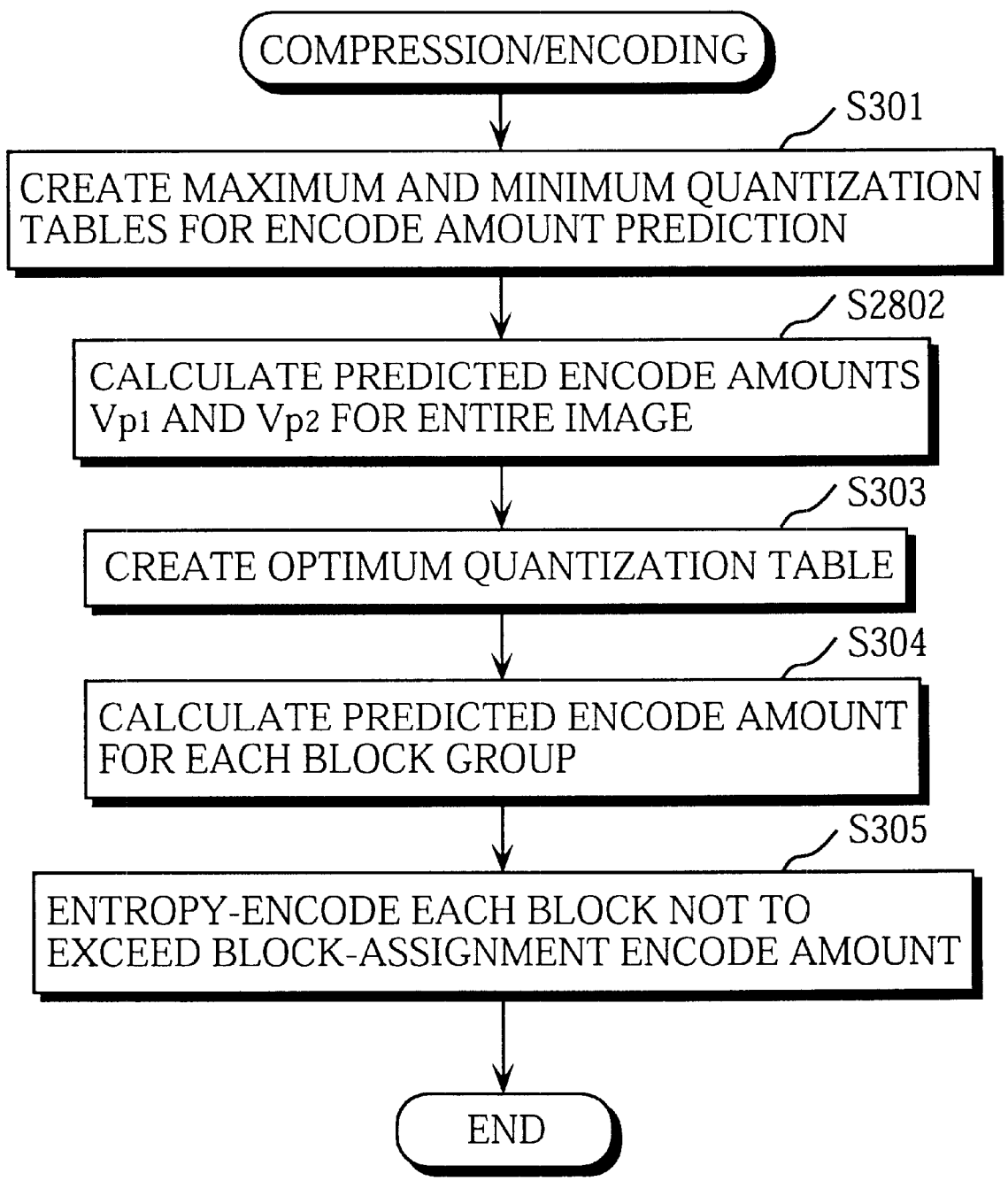
FIG. 32 is a flowchart of the outlined process performed by the image encoding apparatus shown in FIG. 27.
Figure 33:
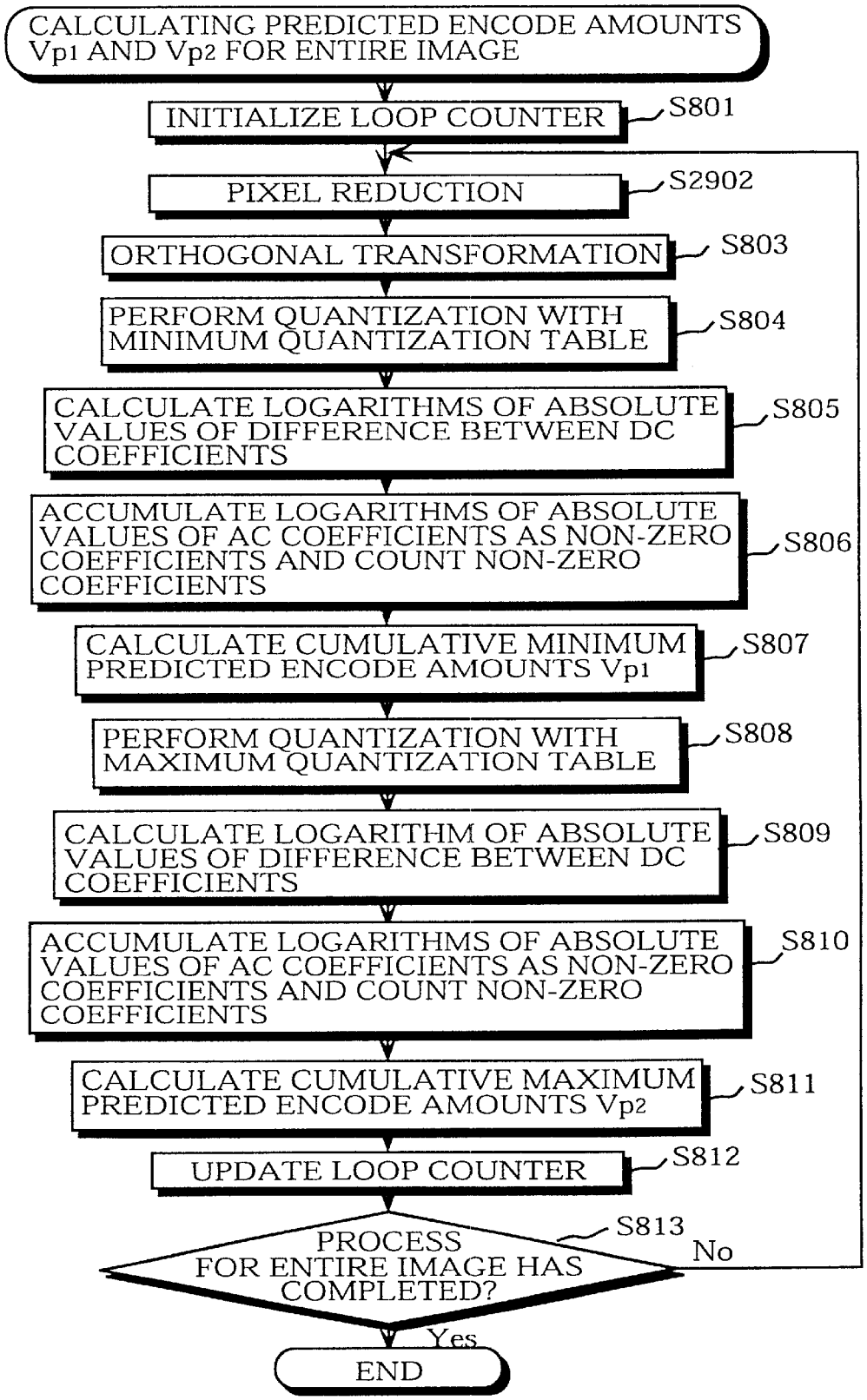
FIG. 33 is a flowchart of calculating predicted encode amounts $V_{p1}$ and $V_{p2}$ performed by the image encoding apparatus shown in FIG. 27.

The operation of predicting encode amounts for the entire image referred to in step S2802 of FIG. 32 is described in detail with reference to the flowchart shown in FIG. 33.

Figure 23:
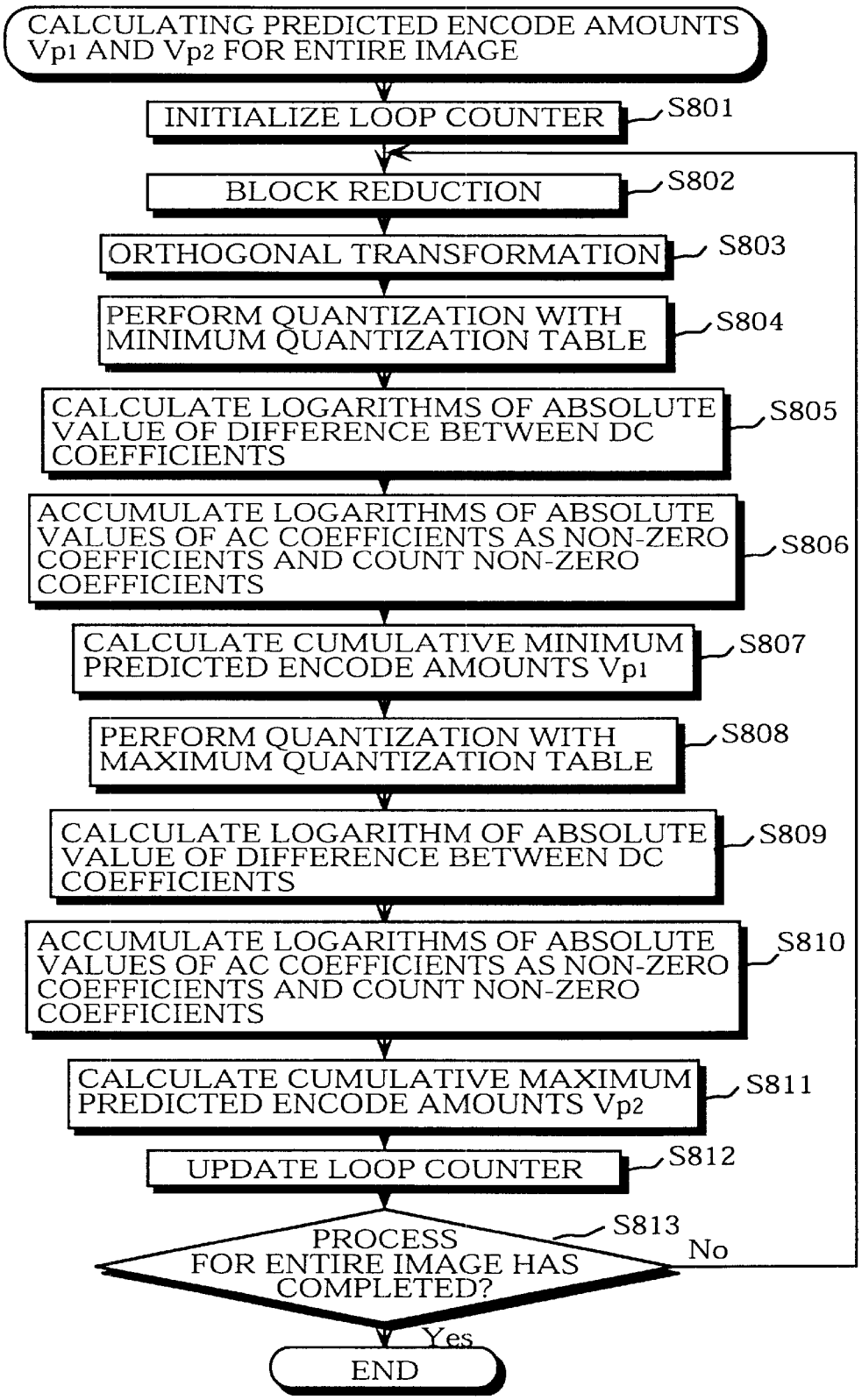
FIG. 23 is a flowchart of calculating predicted encode amounts $V_{p1}$ and $V_{p2}$ performed by the image encoding apparatus shown in FIG. 1.

Steps similarly numbered as those in FIG. 23 designate like steps, and a recounting of their function will be omitted from the description of this embodiment. The only difference is the step S2902 replaced with the step S802. Accordingly, only the step S2902 will be described below.

The pixel reducing unit 202 performs a pixel reduction process in which the pixel reducing unit 202 selects pixels from a block group corresponding to the loop counter value and reads out the pixel values (step S2902).

3.5 Predicting Encode Amounts for Each Block Group

Figure 24:
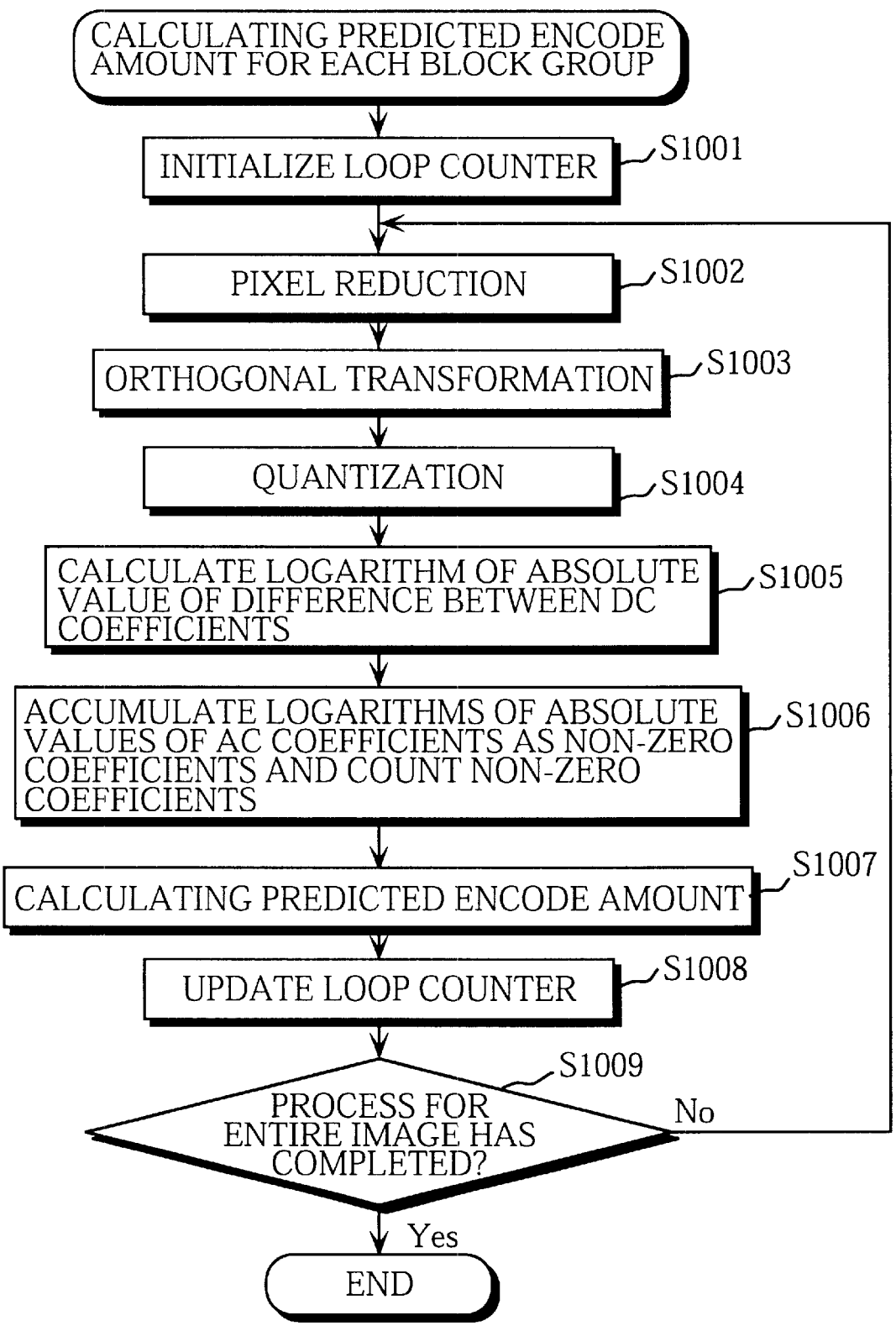
FIG. 24 is a flowchart of calculating a predicted encode amount of each block group performed by the image encoding apparatus shown in FIG. 1.

The operation of predicting encode amounts for each block group is the same as that described in the flowchart shown in FIG. 24, and a recounting will be omitted.

3.6 Encoding

The operation of encoding is the same as that described in the flowchart shown in FIG. 25, and a recounting will be omitted.

3.7 Entropy-Encoding

Figure 26:
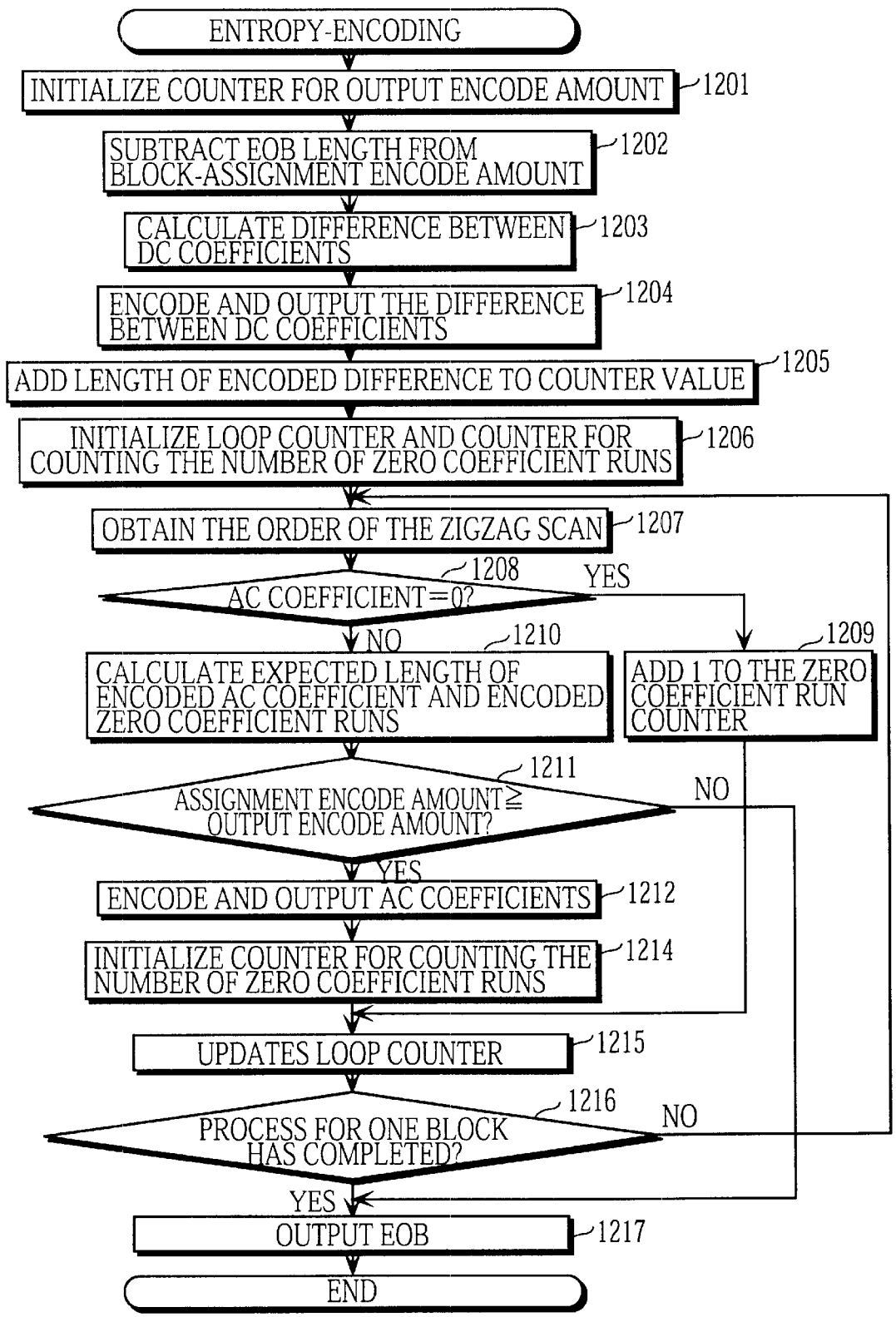
FIG. 26 is a flowchart of the entropy-encoding performed by the image encoding apparatus shown in FIG. 1.

The operation of entropy-encoding is the same as that described in the flowchart shown in FIG. 26, and a recounting will be omitted.

4. Conclusion

As described above, in the present embodiment, the encode amount is predicted from the image after the pixel reduction, and the optimum quantization table corresponding to the predicted encode amount is created. The encode amount for each block group is then predicted from the image after the pixel reduction. After this, each block is entropy-encoded. In doing so, when the generated encode amount exceeds the block-assignment encode amount, the entropy-encoding is stopped. By stopping the entropy-encoding of a block halfway, high-frequency components of the block are not encoded. With this arrangement, the image is encoded with an encode amount close to a target encode amount.

Embodiment 2 differs from Embodiment 1 in that it uses the pixel reduction method instead of the block reduction method to select the pixels used for the encode amount prediction for the entire image. This may render the error between the target encode amount and the generated encode amount a little larger than Embodiment 1. However, in this case, a process of obtaining the encode amount for the entire image after the block reduction process is not required.

Other Embodiments

It is needless to say that the present invention is not limited to the Embodiments 1 and 2 described above. That is, the present invention also includes the following embodiments. (1) In the block reduction process of Embodiments 1 and 2, blocks are selected on a one-out-of-four-blocks basis, where each group of the four blocks is composed of two-block rows and two-block columns. However, this may be performed with a different reduction rate. For example, this may be performed on a one-out-of-nine-blocks basis, where each group of the nine blocks is composed of three-block rows and three-block columns. Also, in the same process of Embodiments 1 and 2, the upper-left block is selected from each group of the four blocks. However, a block in a position other than the upper-left position may be selected.

(2) In the pixel reduction process of Embodiments 1 and 2, pixels are selected on a one-out-of-four-pixels basis, where each group of the four pixels is composed of two-pixel rows and two-pixel columns. However, this may be performed with a different reduction rate. For example, this may be performed on a one-out-of-nine-pixels basis, where each group of the nine pixels is composed of three-pixel rows and three-pixel columns. Also, in the same process of Embodiments 1 and 2, the upper-left pixel is selected from each group of the four pixels. However, a pixel in a position other than the upper-left position may be selected.

(3) In Embodiments 1 and 2, a maximum quantization width and a minimum quantization width are used to predict two kinds of encode amounts for the entire image. However, it is apparent from FIG. 12 that the relationships between the quantization width and the encodes amount of the entire image have a certain tendency. Therefore, it is possible to predict the encode amount of the entire image using one quantization width, or using three kinds of quantization widths. Here, the more kinds of the quantization widths are used, the more accurately the encode amount of the entire image is predicted.

(4) In Embodiments 1 and 2, two kinds of quantization widths are determined by referring to the quantization width correspondence table 1300. However, an equation may be used instead of the quantization width correspondence table 1300.

For example, the following equation may be used.

$$V=1/a*\alpha$$

In this equation, V represents an encode amount, $\alpha$ a quantization width, and "a" a constant.

Alternatively, the following equation may be used.

$$V=1/(a*\alpha^2+b*\alpha)$$

In this equation, V represents an encode amount, $\alpha$ a quantization width, and "a" and "b" constants.

As apparent from this, any formats may be used as far as they show relationships between the encode amount and the quantization width.

It is also possible to select a quantization width which corresponds to an encode amount closest to the target encode amount using the quantization width correspondence table 1300 or one of the above equations and encode the image using the selected quantization width. With this arrangement, an encoded image having an encode amount close to the target encode amount is generated.

(5) In Embodiments 1 and 2, the block-assignment encode amount setting unit 210 calculates the block-assignment encode amount, and the entropy-encoding unit 211 entropy-encodes the quantized orthogonal transformation coefficients not to exceed the block-assignment encode amount. However, the block-assignment encode amount setting unit 210 may not perform this calculation. Also, the entropy-encoding unit 211 may entropy-encode the quantized orthogonal transformation coefficients with out stopping the quantization of one block halfway. That means, the high-frequency components are entropy-encoded. In this case, it is expected that an encoded image having an encode amount close to the target encode amount is obtained since a quantization is performed using the optimum quantization table.

In the present case, the calculation of predicted encode amount for each block group performed in Embodiment 1 is also become unnecessary. As a result, the encode control unit 213 does not output the "pixel reduction" instruction. The pixel reducing unit 202 included in the encoding circuit 108 shown in FIG. 2 also become unnecessary. Also, the step S304 can be removed from the flowchart shown in FIG. 21 describing the process of compression/encoding. This, as a whole, reduces the circuit size, the cost, the power consumption, and the time for the encoding.

(6) it is possible to perform the encoding amount prediction with out block reductions or pixel reductions when there is enough time for the prediction process. This will reduce the error between the target encode amount and the generated encode amount, and will improve the image quality of the reproduced image.

(7) There are many types of orthogonal transformation methods that can be applied to the present invention: the discrete cosine transform which is used in JPEG, discrete sine transform, Karhunen-Loeve (KL) transform, slant transform, Walsh-Hadamard transform, wavelet transform, etc. Also, there are many types of entropy-encoding methods that can be applied to the present invention: the Huffman encoding method which is used in JPEG, arithmetic encoding method, fixed-length encoding method, etc.

(8) When each image is composed of a plurality of color components, the following processes may be performed for each color component: predicting encode amount, assigning encode amount, stopping the entropy-encoding, creating the quantization table. Also, the table showing the relationships between the quantization width and the generated encode amount may be created for each color component.

(9) The present invention also provides an image encoding method which has the same acts and effects as the image encoding apparatus described in the above Embodiments.

(10) The present invention also provides a computer-readable recording medium storing a program which allows a computer to execute the image encoding method.

(11) The present invention also provides a computer-readable recording medium storing first encode amounts and second encode amounts which are respectively obtained by encoding an image with a large encode amount and an image with a small encode amount for each of certain quantization widths and by storing the obtained encode amounts in relation to each of the certain quantization widths.

The present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An image encoding apparatus for generating encoded images which have encode amounts close to corresponding target encode amounts, the image encoding apparatus comprising:

a relationship storage means for storing relationships, for each of one or more standard images, between a group of a plurality of quantization widths and one or more groups of a plurality of encode amounts, wherein each of the one or more groups of the plurality of encode amounts is obtained by encoding each of the one or more standard images using the plurality of quantization widths respectively;

a quantization width determining means for obtaining a target encode amount and referring to the relationship storage means to obtain one or more quantization widths which correspond to one or more encode amounts which each are closest to the obtained target encode amount in each group of the one or more groups of the plurality of encode amounts; and an encoding means for obtaining an image and encoding the obtained image using the one or more quantization widths obtained by the quantization width determining means, wherein the encoding means includes:

a predicted encode amount calculating means for obtaining an image, obtaining an orthogonal transformation image by performing an orthogonal transformation on the obtained image, generating one or more quantization tables using the one or more quantization widths obtained by the quantization width determining means, generating one or more quantized orthogonal transformation images by quantizing the orthogonal transformation image using the generated one or more quantization tables, and calculating one or more predicted encode amounts for the obtained image using the generated one or more quantized transformation images;

an optimum quantization width determining means for reading the relationships from the relationship storage means, obtaining a quantization width corresponding to the target encode amount using the one or more predicted encode amounts and using the read relationships, and determining the obtained quantization width as the optimal quantization width; and an image encoding means for generating a quantization table using the optimal quantization width, and encoding the obtained image using the generated quantization table.

2. The image encoding apparatus of claim 1, wherein the relationship storage means stores a quantization width correspondence table showing the relationships between the group of the plurality of quantization widths and the one or more groups of the plurality of encode amounts, and the quantization width determining means refers to the quantization width correspondence table to obtain one or more quantization widths which correspond to one or more encode amounts which each are closest to the obtained target encode amount in each group of the one or more groups of the plurality of encode amounts.

3. The image encoding apparatus of claim 2, wherein the quantization width correspondence table includes a first group of a plurality of encode amounts and a second group of a plurality of encode amounts, wherein the plurality of encode amounts of each of the first and second groups respectively correspond to the plurality of quantization widths, wherein the first and second groups are obtained by respectively encoding a first standard image and a second standard image using the plurality of quantization widths, wherein the encoded first standard image has a large encode amount and the encoded second standard image has a small encode amount, wherein the quantization width determining means obtains two quantization widths one of which corresponds to an encode amount closest to the obtained target encode amount in the first group of the plurality of encode amounts and the other of which corresponds to an encode amount closest to the obtained target encode amount in the second group of the plurality of encode amounts, wherein the encoding means encodes the obtained image based on the obtained two quantization widths.

4. The image encoding apparatus of claim 1, wherein the relationship storage means stores one or more formulas respectively corresponding to the one or more standard images, wherein the quantization width determining means obtains the one or more formulas from the relationship storage means to calculate one or more quantization widths which correspond to one or more encode amounts closest to the obtained target encode amount.

5. The image encoding apparatus of claim 1, wherein the predicted encode amount calculating means includes:

an image obtaining means for obtaining an image;

an orthogonal transformation means for performing an orthogonal transformation on the obtained image to generate an orthogonal transformation image;

a quantization means for generating one or more quantization tables using the one or more quantization widths obtained by the quantization width determining means, and quantizing the orthogonal transformation image to generate one or more quantized orthogonal transformation images; and a predicted encode amount calculating means for calculating one or more predicted encode amounts using a predetermined formula and using the one or more quantized orthogonal transformation images.

6. The image encoding apparatus of claim 5, wherein each image to be obtained by the encoding means includes a plurality of block groups which each include a predetermined number of blocks, and the image obtaining means obtains a predetermined number of blocks from predetermined positions in each of the plurality of block groups.

7. The image encoding apparatus of claim 6, wherein each of the plurality of block groups includes four blocks which are arranged in two-block rows and two-block columns, and the image obtaining means obtains one upper-left block from each of the plurality of block groups.

8. The image encoding apparatus of claim 5, wherein each image to be obtained by the encoding means includes a plurality of block groups which each include a predetermined number of blocks, each block includes a predetermined number of pixels, and the image obtaining means obtains a predetermined number of pixels from predetermined positions in each of the plurality of block groups.

9. The image encoding apparatus of claim 8, wherein each of the plurality of block groups includes four blocks which are arranged in two-block rows and two-block columns, each block includes 16 sub-blocks which are arranged in four-sub-block rows and four-sub-block columns, and each sub-block includes four pixels which are arranged in two-pixel rows and two-pixel columns, and the image obtaining means obtains one upper-left pixel from each sub-block in each of the plurality of block groups, obtaining 64 pixels in total from each block group.

10. The image encoding apparatus of claim 5, wherein the quantization means includes:

a standard quantization table storage means for storing a standard quantization table which includes a predetermined number of elements;

a maximum quantization table generating means for reading the standard quantization table from the standard quantization table storage means, multiplying one of the one or more quantization widths by each element of the standard quantization table to generate a maximum quantization table including a predetermined number of elements, wherein the multiplied quantization width corresponds to an image having a large encode amount;

a minimum quantization table generating means for reading the standard quantization table from the standard quantization table storage means, multiplying one of the one or more quantization widths by each element of the standard quantization table to generate a minimum quantization table including a predetermined number of elements, wherein the multiplied quantization width corresponds to an image having a small encode amount;

a maximum quantization means for quantizing the orthogonal transformation image using the maximum quantization table to generate a maximum quantized orthogonal transformation image; and a minimum quantization means for quantizing the orthogonal transformation image using the minimum quantization table to generate a minimum quantized orthogonal transformation image.

11. An image encoding apparatus for generating encoded images which have encode amounts close to corresponding target encode amounts, the image encoding apparatus comprising:

a relationship storage means for storing relationships, for each of one or more standard images, between a group of a plurality of quantization widths and one or more groups of a plurality of encode amounts, wherein each of the one or more groups of the plurality of encode amounts is obtained by encoding each of the one or more standard images using the plurality of quantization widths respectively;

a quantization width determining means for obtaining a target encode amount and referring to the relationship storage means to obtain one or more quantization widths which correspond to one or more encode amounts which each are closest to the obtained target encode amount in each group of the one or more groups of the plurality of encode amounts; and an encoding means for obtaining an image and encoding the obtained image using the one or more quantization widths obtained by the quantization width determining means, wherein the encoding means includes:

a predicted encode amount calculating means for obtaining an image, obtaining an orthogonal transformation image by performing an orthogonal transformation on the obtained image, generating one or more quantization tables using the one or more quantization widths obtained by the quantization width determining means, generating one or more quantized orthogonal transformation images by quantizing the orthogonal transformation image using the generated one or more quantization tables, and calculating one or more predicted encode amounts for the obtained image using the generated one or more quantized transformation images;

an optimum quantization width determining means for reading the relationships from the relationship storage means, obtaining a quantization width corresponding to the target encode amount using the one or more predicted encode amounts and using the read relationships, and determining the obtained quantization width as the optimal quantization width; and an image encoding means for generating a quantization table using the optimal quantization width, and encoding the obtained image using the generated quantization table, wherein the predicted encode amount calculating means includes:

an image obtaining means for obtaining an image;

an orthogonal transformation means for performing an orthogonal transformation on the obtained image to generate an orthogonal transformation image;

a quantization means for generating one or more quantization tables using the one or more quantization widths obtained by the quantization width determining means, and quantizing the orthogonal transformation image to generate one or more quantized orthogonal transformation images; and a predicted encode amount calculating means for calculating one or more predicted encode amounts using a predetermined formula and using the one or more quantized orthogonal transformation images, wherein each of the one or more quantized orthogonal transformation images generated by the quantization means includes a plurality of blocks, each block includes one direct current component coefficient and (n−1) alternating current component coefficients, the predetermined formula used by the predicted encode amount calculating means is represented as:

$$V_e = \alpha_{dc} * \log_2 |S_{q0}| + \alpha_{ac} * \sum_{i=1}^{n-1} L(S_{qi}) + \alpha_{zn} * \sum_{i=1}^{n-1} d(S_{qi}) + \beta,$$

wherein $V_e$ represents a predicted encode amount of one block, n represents the number of pixels included in one block,, $S_{q0}$ represents a difference between quantized orthogonal transformation coefficients (direct current components) of the current and preceding blocks, $S_{qi}$ represents a quantized orthogonal transformation coefficient (alternating current component, where i="1" to "63"), $\alpha_{dc}$ represents a conversion coefficient,
$\alpha_{ac}$ represents a conversion coefficient,
$\alpha_{zn}$ represents a conversion coefficient,
β represents a constant,
L(X) represents a function which provides a result value "0" when X=0 and a result value of $\log_2 |X|$ when X≠0, and
d(X) represents a function which provides a result value "0" when X=0 and a result value "1" when X≠0.

12. An image encoding apparatus for generating encoded images which have encode amounts close to corresponding target encode amounts, the image encoding apparatus comprising:
a relationship storage means for storing relationships, for each of one or more standard images, between a group of a plurality of quantization widths and one or more groups of a plurality of encode amounts, wherein each of the one or more groups of the plurality of encode amounts is obtained by encoding each of the one or more standard images using the plurality of quantization widths respectively;
a quantization width determining means for obtaining a target encode amount and referring to the relationship storage means to obtain one or more quantization widths which correspond to one or more encode amounts which each are closest to the obtained target encode amount in each group of the one or more groups of the plurality of encode amounts; and
an encoding means for obtaining an image and encoding the obtained image using the one or more quantization widths obtained by the quantization width determining means,
wherein the encoding means includes:
a predicted encode amount calculating means for obtaining an image, obtaining an orthogonal transformation image by performing an orthogonal transformation on the obtained image, generating one or more quantization tables using the one or more quantization widths obtained by the quantization width determining means, generating one or more quantized orthogonal transformation images by quantizing the orthogonal transformation image using the generated one or more quantization tables, and calculating one or more predicted encode amounts for the obtained image using the generated one or more quantized transformation images;
an optimum quantization width determining means for reading the relationships from the relationship storage means, obtaining a quantization width corresponding to the target encode amount using the one or more predicted encode amounts and using the read relationships, and determining the obtained quantization width as the optimal quantization width; and
an image encoding means for generating a quantization table using the optimal quantization width, and encoding the obtained image using the generated quantization table, wherein
the relationship storage means stores a first group of a plurality of encode amounts and a second group of a plurality of encode amounts, wherein the plurality of encode amounts of each of the first and second groups respectively correspond to the plurality of quantization widths,
the quantization width determining means obtains a quantization width $\alpha_{e1}$ and a quantization width $\alpha_{e2}$,
the predicted encode amount calculating means calculates a predicated encode amount $V_{p1}$ and a predicted encode amount $V_{p2}$ respectively using the quantization width $\alpha_{e1}$ and the quantization width $\alpha_{e2}$,
the optimum quantization width determining means includes:
an encode amount obtaining means for obtaining a first encode amount $V_{b1}$ and a second encode amount $V_{a1}$ corresponding to the quantization width $\alpha_{e1}$ and obtaining a first encode amount $V_{b2}$ and a second encode amount $V_{a2}$ corresponding to the quantization width $\alpha_{e2}$; and
a quantization width calculating means for calculating an encode amount $V_q$ closest to the target encode amount using the following formula and determining a quantization width $\alpha_q$ corresponding to the calculated encode amount $V_q$ as an optimum quantization width:

$$V_q = V_a + \left\{ \frac{V_{p1} - V_{a1}}{V_{b1} - V_{a1}} + \left( \frac{V_{p2} - V_{a2}}{V_{b2} - V_{a2}} - \frac{V_{p1} - V_{a1}}{V_{b1} - V_{a1}} \right) * \frac{\alpha_q - \alpha_{e1}}{\alpha_{e2} - \alpha_{e1}} \right\} * (V_b - V_a),$$

wherein $V_q$ represents an encode amount of an image generated with an arbitrary quantization width $\alpha_q$, wherein
a second encode amount corresponding to the arbitrary quantization width $\alpha_q$ is obtained from the relationship storage means and the obtained second encode amount is regarded as $V_a$, and
a first encode amount corresponding to the arbitrary quantization width $\alpha_q$ is obtained from the relationship storage means and the obtained first encode amount is regarded as $V_b$.

13. An image encoding method for generating encoded images which have encode amounts close to corresponding target encode amounts, wherein the image encoding method is used in an image encoding apparatus including a relationship storage means for storing relationships, for each of one or more standard images, between a group of a plurality of quantization widths and one or more groups of a plurality of encode amounts, wherein each of the one or more groups of the plurality of encode amounts is obtained by encoding each of the one or more standard images using the plurality of quantization widths respectively, the image encoding method comprising:
a quantization width determining step for obtaining a target encode amount and referring to the relationship storage means to obtain one or more quantization widths which correspond to one or more encode amounts which each are closest to the obtained target encode amount in each group of the one or more groups of the plurality of encode amounts; and
an encoding step for obtaining an image and encoding the obtained image using the one or more quantization widths obtained in the quantization width determining step,
wherein the encoding step includes:
a predicted encode amount calculating step for obtaining an image, obtaining an orthogonal transformation image by performing an orthogonal transformation on the obtained image, generating one or more quantization tables using the one or more quantization widths obtained in the quantization width determining step, generating one or more quantized orthogonal transformation images by quantizing the orthogonal transformation image using the generated one or more quantization tables, and calculating one or more predicted encode amounts for the obtained image using the generated one or more quantized orthogonal transformation images;

an optimum quantization width determining step for reading the relationships from the relationship storage means, obtaining a quantization width corresponding to the target encode amount using the one or more predicted encode amounts and using the read relationships, and determining the obtained quantization width as the optimal quantization width; and an image encoding step for generating a quantization table using the optimal quantization width, and encoding the obtained image using the generated quantization table.

14. The image encoding method of claim 13, wherein the relationship storage means stores a quantization width correspondence table showing the relationships between the group of the plurality of quantization widths and the one or more groups of the plurality of encode amounts, and in the quantization width determining step, the quantization width correspondence table is referenced to obtain one or more quantization widths which correspond to one or more encode amounts which each are closest to the obtained target encode amount in each group of the one or more groups of the plurality of encode amounts.

15. The image encoding method of claim 14, wherein the quantization width correspondence table includes a first group of a plurality of encode amounts and a second group of a plurality of encode amounts, wherein the plurality of encode amounts of each of the first and second groups respectively correspond to the plurality of quantization widths, wherein the first and second groups are obtained by respectively encoding a first standard image and a second standard image using the plurality of quantization widths, wherein the encoded first standard image has a large encode amount and the encoded second standard image has a small encode amount, wherein in the quantization width determining step, two quantization widths are obtained, wherein one of the two quantization widths corresponds to an encode amount closest to the obtained target encode amount in the first group of the plurality of encode amounts and the other of the two quantization widths corresponds to an encode amount closest to the obtained target encode amount in the second group of the plurality of encode amounts, wherein in the encoding step, the obtained image is encoded based on the obtained two quantization widths.

16. The image encoding method of claim 13, wherein the relationship storage means stores one or more formulas respectively corresponding to the one or more standard images, wherein in the quantization width determining step, the one or more formulas are obtained from the relationship storage means to calculate one or more quantization widths which correspond to one or more encode amounts closest to the obtained target encode amount.

17. The image encoding method of claim 13, wherein the predicted encode amount calculating step includes:
an image obtaining step for obtaining an image;
an orthogonal transformation step for performing an orthogonal transformation on the obtained image to generate an orthogonal transformation image;

a quantization step for generating one or more quantization tables using the one or more quantization widths obtained in the quantization width determining step, and quantizing the orthogonal transformation image to generate one or more quantized orthogonal transformation images; and a predicted encode amount calculating step for calculating one or more predicted encode amounts using a predetermined formula and using the one or more quantized orthogonal transformation images.

18. The image encoding method of claim 17, wherein each image to be obtained in the encoding step includes a plurality of block groups which each include a predetermined number of blocks, and in the image obtaining step, a predetermined number of blocks are obtained from predetermined positions in each of the plurality of block groups.

19. The image encoding method of claim 18, wherein each of the plurality of block groups includes four blocks which are arranged in two-block rows and two-block columns, and in the image obtaining step, one upper-left block is obtained from each of the plurality of block groups.

20. The image encoding method of claim 17, wherein each image to be obtained in the encoding step includes a plurality of block groups which each include a predetermined number of blocks, each block includes a predetermined number of pixels, and in the image obtaining step, a predetermined number of pixels are obtained from predetermined positions in each of the plurality of block groups.

21. The image encoding method of claim 20, wherein each of the plurality of block groups includes four blocks which are arranged in two-block rows and two-block columns, each block includes 16 sub-blocks which are arranged in four-sub-block rows and four-sub-block columns, and each sub-block includes four pixels which are arranged in two-pixel rows and two-pixel columns, and in the image obtaining step, one upper-left pixel is obtained from each sub-block in each of the plurality of block groups, resulting in 64 pixels in total obtained from each block group.

22. The image encoding method of claim 17, wherein the image encoding apparatus includes:
a standard quantization table storage means for storing a standard quantization table which includes a predetermined number of elements, wherein
quantization step includes;
a maximum quantization table generating step for reading the standard quantization table from the standard quantization table storage means, multiplying one of the one or more quantization widths by each element of the standard quantization table to generate a maximum quantization table including a predetermined number of elements, wherein the multiplied quantization width corresponds to an image having a large encode amount;
a minimum quantization table generating step for reading the standard quantization table from the standard quantization table storage means, multiplying one of the one or more quantization widths by each element of the standard quantization table to generate a minimum quantization table including a predetermined number of elements, wherein the multiplied quantization width corresponds to an image having a small encode amount;

a maximum quantization step for quantizing the orthogonal transformation image using the maximum quantization table to generate a maximum quantized orthogonal transformation image; and a minimum quantization step for quantizing the orthogonal transformation image using the minimum quantization table to generate a minimum quantized orthogonal transformation image.

23. An image encoding method for generating encoded images which have encode amounts close to corresponding target encode amounts, wherein the image encoding method is used in an image encoding apparatus including a relationship storage means for storing relationships, for each of one or more standard images, between a group of a plurality of quantization widths and one or more groups of a plurality of encode amounts, wherein each of the one or more groups of the plurality of encode amounts is obtained by encoding each of the one or more standard images using the plurality of quantization widths respectively, the image encoding method comprising:

a quantization width determining step for obtaining a target encode amount and referring to the relationship storage means to obtain one or more quantization widths which correspond to one or more encode amounts which each are closest to the obtained target encode amount in each group of the one or more groups of the plurality of encode amounts; and an encoding step for obtaining an image and encoding the obtained image using the one or more quantization widths obtained in the quantization width determining step, wherein the encoding step includes:

a predicted encode amount calculating step for obtaining an image, obtaining an orthogonal transformation image by performing an orthogonal transformation on the obtained image, generating one or more quantization tables using the one or more quantization widths obtained in the quantization width determining step, generating one or more quantized orthogonal transformation images by quantizing the orthogonal transformation image using the generated one or more quantization tables, and calculating one or more predicted encode amounts for the obtained image using the generated one or more quantized orthogonal transformation images;

an optimum quantization width determining step for reading the relationships from the relationship storage means, obtaining a quantization width corresponding to the target encode amount using the one or more predicted encode amounts and using the read relationships, and determining the obtained quantization width as the optimal quantization width; and an image encoding step for generating a quantization table using the optimal quantization width, and encoding the obtained image using the generated quantization table, wherein the predicted encode amount calculating step includes:

an image obtaining step for obtaining an image;

an orthogonal transformation step for performing an orthogonal transformation on the obtained image to generate an orthogonal transformation image;

a quantization step for generating one or more quantization tables using the one or more quantization widths obtained in the quantization width determining step, and quantizing the orthogonal transformation image to generate one or more quantized orthogonal transformation images; and a predicted encode amount calculating step for calculating one or more predicted encode amounts using a predetermined formula and using the one or more quantized orthogonal transformation images, wherein each of the one or more quantized orthogonal transformation images generated in the quantization step includes a plurality of blocks, each block includes one direct current component coefficient and (n−1) alternating current component coefficients, the predetermined formula used in the predicted encode amount calculating step is represented as:

$$V_e = \alpha_{dc} * \log_2|S_{q0}| + \alpha_{ac} * \sum_{i=1}^{n-1} L(S_{qi}) + \alpha_{zn} * \sum_{i=1}^{n-1} d(S_{qi}) + \beta,$$

wherein $V_e$ represents a predicted encode amount of one block, n represents the number of pixels included in one block, $S_{q0}$ represents a difference between quantized orthogonal transformation coefficients (direct current components) of the current and preceding blocks, $S_{qi}$ represents a quantized orthogonal transformation coefficient (alternating current component, where i="1" to "63"), $\alpha_{dc}$ represents a conversion coefficient, $\alpha_{ac}$ represents a conversion coefficient, $\alpha_{zn}$ represents a conversion coefficient, $\beta$ represents a constant, L(X) represents a function which provides a result value "0" when X=0 and a result value of $\log_2 |X|$ when X≠0, and d(X) represents a function which provides a result value "0" when X=0 and a result value "1" when X≠0.

24. An image encoding method for generating encoded images which have encode amounts close to corresponding target encode amounts, wherein the image encoding method is used in an image encoding apparatus including a relationship storage means for storing relationships, for each of one or more standard images, between a group of a plurality of quantization widths and one or more groups of a plurality of encode amounts, wherein each of the one or more groups of the plurality of encode amounts is obtained by encoding each of the one or more standard images using the plurality of quantization widths respectively, the image encoding method comprising:

a quantization width determining step for obtaining a target encode amount and referring to the relationship storage means to obtain one or more quantization widths which correspond to one or more encode amounts which each are closest to the obtained target encode amount in each group of the one or more groups of the plurality of encode amounts; and an encoding step for obtaining an image and encoding the obtained image using the one or more quantization widths obtained in the quantization width determining step, wherein the encoding step includes:

a predicted encode amount calculating step for obtaining an image, obtaining an orthogonal transformation image by performing an orthogonal transformation on the obtained image, generating one or more quantization tables using the one or more quantization widths obtained in the quantization width determining step, generating one or more quantized orthogonal transformation images by quantizing the orthogonal transformation image using the generated one or more quantization tables, and calculating one or more predicted encode amounts for the obtained image using the generated one or more quantized orthogonal transformation images;

an optimum quantization width determining step for reading the relationships from the relationship storage means, obtaining a quantization width corresponding to the target encode amount using the one or more predicted encode amounts and using the read relationships, and determining the obtained quantization width as the optimal quantization width; and an image encoding step for generating a quantization table using the optimal quantization width, and encoding the obtained image using the generated quantization table, wherein the relationship storage means stores a first group of a plurality of encode amounts and a second group of a plurality of encode amounts, wherein the plurality of encode amounts of each of the first and second groups respectively correspond to the plurality of quantization widths, in the quantization width determining step, a quantization width $\alpha_{e1}$ and a quantization width $\alpha_{e2}$ are obtained, in the predicted encode amount calculating step, a predicted encode amount $V_{p1}$ and a predicted encode amount $V_{p2}$ are calculated respectively using the quantization width $\alpha_{e1}$ and the quantization width $\alpha_{e2}$, the optimum quantization width determining step include:

an encode amount obtaining step for obtaining a first encode amount $V_{b1}$ and a second encode amount $V_{a1}$ corresponding to the quantization width $\alpha_{e1}$ and obtaining a first encode amount $V_{b2}$ and a second encode amount $V_{a2}$ corresponding to the quantization width $\alpha_{e2}$; and a quantization width calculating step for calculating an encode amount $V_q$ closest to the target encode amount using the following formula and determining a quantization width $\alpha_q$ corresponding to the calculated encode amount $V_q$ as an optimum quantization width:

$$V_q = V_a + \left\{ \frac{V_{p1} - V_{a1}}{V_{b1} - V_{a1}} + \left( \frac{V_{p2} - V_{a2}}{V_{b2} - V_{a2}} - \frac{V_{p1} - V_{a1}}{V_{b1} - V_{a1}} \right) * \frac{\alpha_q - \alpha_{e1}}{\alpha_{e2} - \alpha_{e1}} \right\} * (V_b - V_a),$$

wherein $V_q$ represents an encode amount of an image generated with an arbitrary quantization width $\alpha_q$, wherein a second encode amount corresponding to the arbitrary quantization width $\alpha_q$ is obtained from the relationship storage means and the obtained second encode amount is regarded as $V_a$, and a first encode amount corresponding to the arbitrary quantization width $\alpha_q$ is obtained from the relationship storage means and the obtained first encode amount is regarded as $V_b$.

25. A computer-readable medium storing a program which allows a computer to execute an image encoding method for generating encoded images which have encode amounts close to corresponding target encode amounts, wherein the image encoding method is used in an image encoding apparatus including a relationship storage means for storing relationships, for each of one or more standard images, between a group of a plurality of quantization widths and one or more groups of a plurality of encode amounts, wherein each of the one or more groups of the plurality of encode amounts is obtained by encoding each of the one or more standard images using the plurality of quantization widths respectively, the program comprising:

a quantization width determining step for obtaining a target encode amount and referring to the relationship storage means to obtain one or more quantization widths which correspond to one or more encode amounts which each are closest to the obtained target encode amount in each group of the one or more groups of the plurality of encode amounts; and an encoding step for obtaining an image and encoding the obtained image using the one or more quantization widths obtained in the quantization width determining step, wherein the encoding step includes:

a predicted encode amount calculating step for obtaining an image, obtaining an orthogonal transformation image by performing an orthogonal transformation on the obtained image, generating one or more quantization tables using the one or more quantization widths obtained in the quantization width determining step, generating one or more quantized orthogonal transformation images by quantizing the orthogonal transformation image using the generated one or more quantization tables, and calculating one or more predicted encode amounts for the obtained image using the generated one or more quantized orthogonal transformation images;

an optimum quantization width determining step for reading the relationships from the relationship storage means, obtaining a quantization width corresponding to the target encode amount using the one or more predicted encode amounts and using the read relationships, and determining the obtained quantization width as the optimal quantization width; and an image encoding step for generating a quantization table using the optimal quantization width, and encoding the obtained image using the generated quantization table.

26. The computer-readable medium of claim 20, wherein the predicted encode amount calculating step 3 includes:

an image obtaining step for obtaining an image;

an orthogonal transformation step for performing an orthogonal transformation on the obtained image to generate an orthogonal transformation image;

a quantization step for generating one or more quantization tables using the one or more quantization widths obtained in the quantization width determining step, and quantizing the orthogonal transformation image to generate one or more quantized orthogonal transformation images; and a predicted encode amount calculating step for calculating one or more predicted encode amounts using a predetermined formula and using the one or more quantized orthogonal transformation images.

27. A computer-readable medium storing a program which allows a computer to execute an image encoding method for generating encoded images which have encode amounts close to corresponding target encode amounts, wherein the image encoding method is used in an image encoding apparatus including a relationship storage means for storing relationships, for each of one or more standard images, between a group of a plurality of quantization widths and one or more groups of a plurality of encode amounts, wherein each of the one or more groups of the plurality of encode amounts is obtained by encoding each of the one or more standard images using the plurality of quantization widths respectively, the program comprising:

a quantization width determining step for obtaining a target encode amount and referring to the relationship storage means to obtain one or more quantization widths which correspond to one or more encode amounts which each are closest to the obtained target encode amount in each group of the one or more groups of the plurality of encode amounts; and an encoding step for obtaining an image and encoding the obtained image using the one or more quantization widths obtained in the quantization width determining step, wherein the encoding step includes:
   a predicted encode amount calculating step for obtaining an image, obtaining an orthogonal transformation image by performing an orthogonal transformation on the obtained image, generating one or more quantization tables using the one or more quantization widths obtained in the quantization width determining step, generating one or more quantized orthogonal transformation images by quantizing the orthogonal transformation image using the generated one or more quantization tables, and calculating one or more predicted encode amounts for the obtained image using the generated one or more quantized orthogonal transformation images;
   an optimum quantization width determining step for reading the relationships from the relationship storage means, obtaining a quantization width corresponding to the target encode amount using the one or more predicted encode amounts and using the read relationships, and determining the obtained quantization width as the optimal quantization width; and
   an image encoding step for generating a quantization table using the optimal quantization width, and encoding the obtained image using the generated quantization table, wherein the predicted encode amount calculating step includes:
   an image obtaining step for obtaining an image;
   an orthogonal transformation step for performing an orthogonal transformation on the obtained image to generate an orthogonal transformation image;
   a quantization step for generating one or more quantization tables using the one or more quantization widths obtained in the quantization width determining step, and quantizing the orthogonal transformation image to generate one or more quantized orthogonal transformation images; and
   a predicted encode amount calculating step for calculating one or more predicted encode amounts using a predetermined formula and using the one or more quantized orthogonal transformation images, wherein each of the one or more quantized orthogonal transformation images generated in the quantization step includes a plurality of blocks, each block includes one direct current component coefficient and (n−1) alternating current component coefficients, the predetermined formula used in the predicted encode amount calculating step is represented as:

$$V_e = \alpha_{dc} * \log_2|S_{q0}| + \alpha_{ac} * \sum_{i=1}^{n-1} L(S_{qi}) + \alpha_{zn} * \sum_{i=1}^{n-1} d(S_{qi}) + \beta,$$

wherein
$V_e$ represents a predicted encode amount of one block,
n represents the number of pixels included in one block,
$S_{q0}$ represents a difference between quantized orthogonal transformation coefficients (direct current components) of the current and preceding blocks,
$S_{qi}$ represents a quantized orthogonal transformation coefficient (alternating current component, where i="1" to "63"),
$\alpha_{dc}$ represents a conversion coefficient,
$\alpha_{ac}$ represents a conversion coefficient,
$\alpha_{zn}$ represents a conversion coefficient,
$\beta$ represents a constant,
L(X) represents a function which provides a result value "0" when X=0 and a result value of $\log_2 |X|$ when X≠0, and
d(X) represents a function which provides a result value "0" when X=0 and a result value "1" when X≠0.

28. A computer-readable medium storing a program which allows a computer to execute an image encoding method for generating encoded images which have encode amounts close to corresponding target encode amounts, wherein the image encoding method is used in an image encoding apparatus including a relationship storage means for storing relationships, for each of one or more standard images, between a group of a plurality of quantization widths and one or more groups of a plurality of encode amounts, wherein each of the one or more groups of the plurality of encode amounts is obtained by encoding each of the one or more standard images using the plurality of quantization, widths respectively, the program comprising:

a quantization width determining step for obtaining a target encode amount and referring to the relationship storage means to obtain one or more quantization widths which correspond to one or more encode amounts which each are closest to the obtained target encode amount in each group of the one or more groups of the plurality of encode amounts; and an encoding step for obtaining an image and encoding the obtained image using the one or more quantization widths obtained in the quantization width determining step, wherein the encoding step includes:
   a predicted encode amount calculating step for obtaining an image, obtaining an orthogonal transformation image by performing an orthogonal transformation on the obtained image, generating one or more quantization tables using the one or more quantization widths obtained in the quantization width determining step, generating one or more quantized orthogonal transformation images by quantizing the orthogonal transformation image using the generated one or more quantization tables, and calculating one or more predicted encode amounts for the obtained image using the generated one or more quantized orthogonal transformation images;
   an optimum quantization width determining step for reading the relationships from the relationship storage means, obtaining a quantization width corresponding to the target encode amount using the one or more predicted encode amounts and using the read relationships, and determining the obtained quantization width as the optimal quantization width; and an image encoding step for generating a quantization table using the optimal quantization width, and encoding the obtained image using the generated quantization table, wherein the relationship storage means stores a first group of a plurality of encode amounts and a second group of a plurality of encode amounts, wherein the plurality of encode amounts of each of the first and second groups respectively correspond to the plurality of quantization widths, in the quantization width determining step, a quantization width $\alpha_{e1}$ and a quantization width $\alpha_{e2}$ are obtained, in the predicted encode amount calculating step, a predicted encode amount $V_{p1}$ and a predicted encode amount $V_{p2}$ are calculated respectively using the quantization width $\alpha_{e1}$ and the quantization width $\alpha_{e2}$, the optimum quantization width determining step include:

an encode amount obtaining step for obtaining a first encode amount $V_{b1}$ and a second encode amount $V_{a1}$ corresponding to the quantization width $\alpha_{e1}$ and obtaining a first encode amount $V_{b2}$ and a second encode amount $V_{a2}$ corresponding to the quantization width $\alpha_{e2}$; and a quantization width calculating step for calculating an encode amount $V_q$ closest to the target encode amount using the following formula and determining a quantization width $\alpha_q$ corresponding to the calculated encode amount $V_q$ as an optimum quantization width:

$$V_q = V_a + \left\{ \frac{V_{p1} - V_{a1}}{V_{b1} - V_{a1}} + \left( \frac{V_{p2} - V_{a2}}{V_{b2} - V_{a2}} - \frac{V_{p1} - V_{a1}}{V_{b1} - V_{a1}} \right) * \frac{\alpha_q - \alpha_{e1}}{\alpha_{e2} - \alpha_{e1}} \right\} * (V_b - V_a),$$

wherein $V_q$ represents an encode amount of an image generated with an arbitrary quantization width $\alpha_q$, wherein a second encode amount corresponding to the arbitrary quantization width $\alpha_q$ is obtained from the relationship storage means and the obtained second encode amount is regarded as $V_a$, and a first encode amount corresponding to the arbitrary quantization width $\alpha_q$ is obtained from the relationship storage means and the obtained first encode amount is regarded as $V_b$.

* * * * *

UNITED STATES PATENT AND TRADEMARK OFFICE
CERTIFICATE OF CORRECTION

PATENT NO. : 6,449,395 B1
DATED : September 10, 2002
INVENTOR(S) : Kobayashi

It is certified that error appears in the above-identified patent and that said Letters Patent is hereby corrected as shown below:

<u>Column 33,</u>
Line 4, please insert a space between "β" and "represents".

<u>Column 42,</u>
Line 38, please delete the comma after "quantization".

<u>Column 43,</u>
Line 25, please insert a hyphen after the word "obtain".

Signed and Sealed this

Twenty-third Day of November, 2004

JON W. DUDAS
*Director of the United States Patent and Trademark Office*